United States Patent
Deng et al.

(10) Patent No.: US 11,700,378 B2
(45) Date of Patent: Jul. 11, 2023

(54) HIGH LEVEL SYNTAX FOR INTER PREDICTION WITH GEOMETRIC PARTITIONING

(71) Applicants: Beijing Bytedance Network Technology Co., Ltd., Beijing (CN); Bytedance Inc., Los Angeles, CA (US)

(72) Inventors: Zhipin Deng, Beijing (CN); Li Zhang, San Diego, CA (US); Hongbin Liu, Beijing (CN); Kai Zhang, San Diego, CA (US); Jizheng Xu, San Diego, CA (US); Yang Wang, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/847,005

(22) Filed: Jun. 22, 2022

(65) Prior Publication Data
US 2022/0337844 A1    Oct. 20, 2022

Related U.S. Application Data

(63) Continuation of application No. PCT/CN2020/138784, filed on Dec. 24, 2020.

(30) Foreign Application Priority Data

Dec. 24, 2019  (WO) ................ PCT/CN2019/128091

(51) Int. Cl.
*H04N 19/176*   (2014.01)
*H04N 19/132*   (2014.01)
(Continued)

(52) U.S. Cl.
CPC ......... *H04N 19/132* (2014.11); *H04N 19/105* (2014.11); *H04N 19/137* (2014.11); *H04N 19/176* (2014.11); *H04N 19/70* (2014.11)

(58) Field of Classification Search
CPC .. H04N 19/132; H04N 19/105; H04N 19/137; H04N 19/176; H04N 19/70
See application file for complete search history.

(56) References Cited

U.S. PATENT DOCUMENTS 9,271,006 B2   2/2016  Huang et al.
10,462,439 B2  10/2019 He et al.
(Continued)

FOREIGN PATENT DOCUMENTS

| CN | 102484706 A | 5/2012 |
| CN | 102611884 A | 7/2012 |

(Continued)

OTHER PUBLICATIONS

Boyce et al. "Video Usability Information and Supplemental Enhancement Information for Coded Video Bitstreams (Draft 2)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2007, 2019.

(Continued)

*Primary Examiner* — Hesham K Abouzahra
(74) *Attorney, Agent, or Firm* — Perkins Coie LLP

(57) ABSTRACT

A method of video processing is described. The method includes determining, for a conversion between a current video block of a video and a bitstream representation of the video, an applicability of a geometric partitioning mode based on a rule; and performing the conversion based on the determining, and wherein the rule depends on a block width, a block height, and/or an aspect ratio of the current video block.

19 Claims, 33 Drawing Sheets

(51) Int. Cl.
*H04N 19/105* (2014.01)
*H04N 19/137* (2014.01)
*H04N 19/70* (2014.01)

(56) References Cited

U.S. PATENT DOCUMENTS

| | | |
|---|---|---|
| 2016/0277751 A1 | 9/2016 | Sweeney et al. |
| 2018/0041778 A1 | 2/2018 | Zhang et al. |
| 2018/0176601 A1* | 6/2018 | Jeong .................. H04N 19/50 |
| 2019/0098299 A1* | 3/2019 | Park .................. H04N 19/105 |
| 2019/0104303 A1 | 4/2019 | Xiu et al. |
| 2019/0200023 A1 | 6/2019 | Hanhart et al. |
| 2019/0238811 A1 | 8/2019 | Xiu et al. |
| 2020/0404267 A1 | 12/2020 | Liao et al. |
| 2021/0006787 A1 | 1/2021 | Zhang et al. |
| 2021/0006788 A1 | 1/2021 | Zhang et al. |
| 2021/0051324 A1 | 2/2021 | Zhang et al. |
| 2021/0092379 A1 | 3/2021 | Zhang et al. |
| 2021/0144374 A1 | 5/2021 | Esenlik et al. |

FOREIGN PATENT DOCUMENTS

| | | |
|---|---|---|
| CN | 109299060 A | 2/2019 |
| CN | 109327703 A | 2/2019 |
| CN | 109983776 A | 7/2019 |
| WO | 2010151334 A1 | 12/2010 |
| WO | 2019004364 A1 | 1/2019 |
| WO | 2019083334 A1 | 5/2019 |
| WO | 2019151284 A1 | 8/2019 |

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "Algorithm Description for Versatile Video Coding and Test Model 5 (VTM 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1002, 2019.

Chen et al. "Description of Core Experiment 4 (CE4): Inter Prediction with Geometric Partitioning," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2024, 2019.

Esenlik et al. "Non-CE4: Geometrical Partitioning for Inter Blocks." Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0489, 2019.

Gao et al. "CE4: CE4-1.1, CE4-1.2 and CE4-1.14: Geometric Merge Mode (GEO)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0068, 2019.

Gao et al. "CE4-Related: Geometric Merge Mode (GEO) Simplifications," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0107, 2019.

Gao et al. "Simplified GEO without Multiplication and Minimum Blending Mask Storage (Harmonization of JVET-P0107, JVET-P0264 and JVET-P0304)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0884, 2019.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Liao et al. "CE4-Related: Simplification of Blending Weights and Motion Field Storage in Geometric Merge Mode," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0304, 2019.

Reuze et al. "CE4-Related: Simplification of GEO Using Angles with Power-of-Two Tangents," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0264, 2019.

Reuze et al. "Simplified GEO without Multiplication and Minimum Blending Mask Storage (Harmonization of JVET-P0107, JVET-P0264 and JVET-P0304)," Joint Video Experts Team (JVET)of ITU-T SG 16 WP 3 and ISO/IEC JTC 1/SC 29/WG 11 16th Meeting: Geneva, CH, Oct. 1-11, 2019, document JVET-P0085, 2019.

Reuze et al. "CE4-related: GEO with 32 Modes ," Joint Video Experts Team (JVET) of ITU-T SG 16 WP 3 and ISO/IEC JTC 1/SC 29/WG 11 17th Meeting: Brussels, Jan. 6-17, 2020, document JVET-Q0268, 2020.

Zhou, Minhua, "CE4-related: CE4-1 Spec Text with Suggested Fixes," Joint Video Exploration Team (JVET) of ITU-T SG 16 WP 3 and ISO/IEC JTC 1/SC 29/WG 11 17th Meeting: Brussels, BE, Jan. 7-17, 2020, document JVET-Q0160, 2020.

VTM software: https://vcgit.hhi.fraunhofer.de/jvet/VVCSoftware_VTM.git.

International Search Report and Written Opinion from International Patent Application No. PCT/CN2020/132162 dated Mar. 1, 2021 (9 pages).

International Search Report and Written Opinion from International Patent Application No. PCT/CN2020/138784 dated Mar. 15, 2021 (11 pages).

Non Final Office Action from U.S. Appl. No. 17/824,304 dated Sep. 2, 2022.

Liao et al. "CE4-Related: Unification of Triangle Partition Mode and Geometric Merge Mode." Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0305, 2019.

Extended European Search Report from European Patent Application No. 20893690.6 dated Nov. 25, 2022 (14 pages).

* cited by examiner

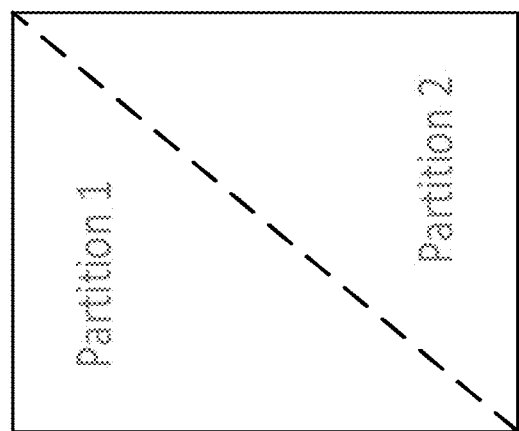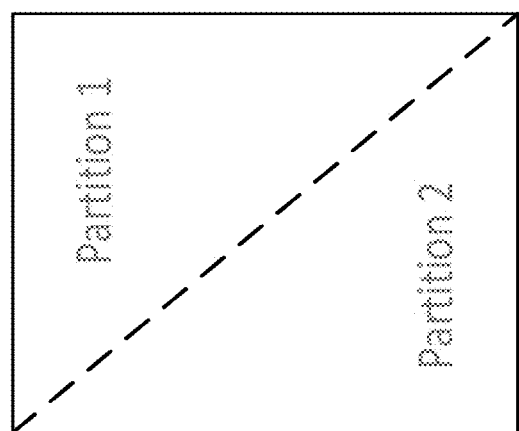
FIG. 5

1400 performing a conversion between a current video block of visual media data and a bitstream representation of the visual media data, wherein, during the conversion, a use of a geometry partition mode is selectively enabled or disabled based at least in part on a determination that that one or more dimensions of the current video block and/or a mathematical function of the one or more dimensions of the current video block achieves at least one threshold condition.

Table 8-10 – Specification of the angleIdx and distanceIdx values

| merge_gpm_partition_idx | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 | 5 | 5 |
| distanceIdx | 1 | 3 | 0 | 1 | 2 | 3 | 0 | 1 | 2 | 3 | 0 | 1 | 2 | 3 | 0 | 1 | 2 | 3 |
| merge_gpm_partition_idx | 18 | 19 | 20 | 21 | 22 | 23 | 24 | 25 | 26 | 27 | 28 | 29 | 30 | 31 | 32 | 33 | 34 | 35 |
| angleIdx | 8 | 8 | 8 | 8 | 11 | 11 | 11 | 11 | 12 | 12 | 12 | 12 | 13 | 13 | 13 | 13 | 14 | 14 |
| distanceIdx | 0 | 1 | 2 | 3 | 0 | 1 | 2 | 3 | 0 | 1 | 2 | 3 | 0 | 1 | 2 | 3 | 0 | 1 |
| merge_gpm_partition_idx | 36 | 37 | 38 | 39 | 40 | 41 | 42 | 43 | 44 | 45 | 46 | 47 | 48 | 49 | 50 | 51 | 52 | 53 |
| angleIdx | 14 | 14 | 16 | 18 | 18 | 18 | 18 | 19 | 19 | 19 | 19 | 20 | 20 | 20 | 20 | 21 | 21 | 21 |
| distanceIdx | 2 | 3 | 1 | 1 | 2 | 3 | 3 | 1 | 2 | 3 | 0 | 1 | 2 | 3 | 0 | 1 | 2 | 3 |
| merge_gpm_partition_idx | 54 | 55 | 56 | 57 | 58 | 59 | 60 | 61 | 62 | 63 | 64 | 65 | 66 | 67 | 68 | 69 | 70 | 71 |
| angleIdx | 21 | 24 | 24 | 24 | 24 | 27 | 27 | 27 | 27 | 28 | 28 | 28 | 28 | 29 | 29 | 29 | 29 | 30 |
| distanceIdx | 3 | 1 | 2 | 3 | 1 | 1 | 2 | 3 | 1 | 2 | 3 | 1 | 2 | 3 | 1 | 2 | 3 | 1 |
| merge_gpm_partition_idx | 72 | 73 | 74 | 75 | 76 | 77 | 78 | 79 | 80 | 81 | | | | | | | | |
| angleIdx | 30 | 30 | 30 | 31 | 31 | 31 | 31 | | | | | | | | | | | |
| distanceIdx | 1 | 2 | 3 | 1 | 2 | 3 | | | | | | | | | | | | |

FIG. 19

Table 8-10: Specification of the angleIdx and distanceIdx values based on the wedge_partition_idx' value

FIG. 20

Table 8-10: Specification of the angleIdx and distanceIdx values based on the wedge_partition_idx' value

| wedge_partition_idx | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| angleIdx | 0 | 0 | 1 | 1 | 1 | 1 | 1 | 1 | 2 | 2 | 2 | 2 | 3 | 3 | 3 | 3 | 4 | 4 |
| distanceIdx | 1 | 3 | 0 | 1 | 2 | 3 | 0 | 1 | 2 | 3 | 0 | 1 | 2 | 3 | 0 | 1 | 2 | 3 |

| wedge_partition_idx | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|
| angleIdx | 5 | 5 | 5 | 5 | 5 | 5 | 6 | 6 | 6 | 7 | 7 | 7 | 8 | 8 | 8 | 9 | 9 | 9 |
| distanceIdx | 0 | 1 | 2 | 3 | 0 | 1 | 2 | 3 | 0 | 1 | 2 | 3 | 0 | 1 | 2 | 3 | 0 | 1 |

| wedge_partition_idx | 36 | 37 | 38 | 39 | 40 | 41 | 42 | 43 | 44 | 45 | 46 | 47 | 48 | 49 | 50 | 51 | 52 | 53 |
|---|---|---|---|---|---|---|---|---|---|---|---|---|---|---|---|---|---|---|
| angleIdx | 0 | 0 | 1 | 1 | 1 | 1 | 2 | 3 | 0 | 1 | 2 | 3 | 0 | 1 | 2 | 3 | 0 | 1 |
| distanceIdx | 2 | 3 | 0 | 1 | 2 | 3 | | | | | | | | | | | | |

| wedge_partition_idx | 54 | 55 | 56 | 57 | 58 | 59 | 60 | 61 | 62 | 63 | 64 | 65 | 66 | 67 | 68 | 69 | 70 | 71 |
|---|---|---|---|---|---|---|---|---|---|---|---|---|---|---|---|---|---|---|
| angleIdx | 2 | 3 | 0 | 1 | 2 | 3 | 0 | 1 | 2 | 3 | 0 | 1 | 2 | 3 | 0 | 1 | 2 | 3 |
| distanceIdx | | | | | | | | | | | | | | | | | | |

| wedge_partition_idx | 72 | 73 | 74 | 75 | 76 | 77 | 78 | 79 | 80 | 81 |
|---|---|---|---|---|---|---|---|---|---|---|
| angleIdx | 3 | 1 | 2 | 3 | 1 | 2 | 3 | 1 | 2 | 3 |
| distanceIdx | | | | | | | | | | |

FIG. 21

Table 8-10: Specification of the angleIdx and distanceIdx values based on the wedge_partition_idx value

| wedge_partition_idx | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| angleIdx | 0 | 0 | 0 | 1 | 1 | 1 | 1 | 1 | 2 | 2 | 2 | 3 | 3 | 3 | 3 | 4 | 4 | 4 |
| distanceIdx | 1 | 2 | 3 | 0 | 1 | 2 | 3 | 0 | 1 | 2 | 3 | 0 | 1 | 2 | 3 | 0 | 1 | 2 |
| wedge_partition_idx | 18 | 19 | 20 | 21 | 22 | 23 | 24 | 25 | 26 | 27 | 28 | 29 | 30 | 31 | 32 | 33 | 34 | 35 |
| angleIdx | 4 | 5 | 5 | 5 | 5 | 6 | 6 | 6 | 6 | 7 | 7 | 7 | 8 | 8 | 8 | 8 | 9 | 9 |
| distanceIdx | 3 | 0 | 1 | 2 | 3 | 1 | 2 | 3 | 0 | 1 | 2 | 3 | 0 | 1 | 2 | 3 | 0 | 1 |
| wedge_partition_idx | 36 | 37 | 38 | 39 | 40 | 41 | 42 | 43 | 44 | 45 | 46 | 47 | 48 | 49 | 50 | 51 | 52 | 53 |
| angleIdx | 9 | 9 | 10 | 10 | 10 | 11 | 11 | 11 | 11 | 12 | 12 | 12 | 13 | 13 | 13 | 13 | 14 | 14 |
| distanceIdx | 2 | 3 | 1 | 2 | 3 | 0 | 1 | 2 | 3 | 0 | 1 | 2 | 3 | 0 | 1 | 2 | 3 | 0 |
| wedge_partition_idx | 54 | 55 | 56 | 57 | 58 | 59 | 60 | 61 | 62 | 63 | 64 | 65 | 66 | 67 | 68 | 69 | 70 | 71 |
| angleIdx | 15 | 15 | 15 | 15 | 16 | 16 | 16 | 17 | 17 | 17 | 18 | 18 | 18 | 19 | 19 | 19 | 20 | 20 |
| distanceIdx | 1 | 2 | 3 | 0 | 1 | 2 | 3 | 1 | 2 | 3 | 1 | 2 | 3 | 1 | 2 | 3 | 1 | 2 |
| wedge_partition_idx | 72 | 73 | 74 | 75 | 76 | 77 | 78 | 79 | 80 | 81 | | | | | | | | |
| angleIdx | 20 | 21 | 21 | 21 | 22 | 22 | 22 | 23 | 23 | 23 | | | | | | | | |
| distanceIdx | 3 | 1 | 2 | 3 | 1 | 2 | 3 | 1 | 2 | 3 | | | | | | | | |

FIG. 22

Table 8-10: Specification of the angleIdx and distanceIdx values based on the wedge_partition_idx value

| wedge_partition_idx | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| angleIdx | 0 | 0 | 1 | 1 | 1 | 1 | 2 | 2 | 2 | 2 | 3 | 3 | 3 | 3 | 3 | 3 | 4 | 4 | 4 | 4 |
| distanceIdx | 1 | 2 | 0 | 1 | 2 | 3 | 0 | 1 | 2 | 3 | 0 | 1 | 2 | 3 | 0 | 1 | 2 | 3 | | |

| wedge_partition_idx | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|
| angleIdx | 5 | 6 | 6 | 6 | 6 | 7 | 7 | 7 | 7 | 8 | 8 | 8 | 8 | 9 | 9 | 9 | 9 | 9 |
| distanceIdx | 0 | 0 | 1 | 2 | 3 | 0 | 1 | 2 | 3 | 0 | 1 | 2 | 3 | 0 | 1 | 2 | 3 | 9 |

| wedge_partition_idx | 36 | 37 | 38 | 39 | 40 | 41 | 42 | 43 | 44 | 45 | 46 | 47 | 48 | 49 | 50 | 51 | 52 | 53 |
|---|---|---|---|---|---|---|---|---|---|---|---|---|---|---|---|---|---|---|
| angleIdx | 10 | 10 | 11 | 11 | 11 | 11 | 12 | 12 | 12 | 13 | 13 | 13 | 14 | 14 | 14 | 15 | 15 | 15 |
| distanceIdx | 1 | 2 | 3 | 0 | 1 | 2 | 3 | 0 | 1 | 2 | 3 | 0 | 1 | 2 | 3 | 0 | 1 | 2 |

| wedge_partition_idx | 54 | 55 | 56 | 57 | 58 | 59 | 60 | 61 | 62 | 63 |
|---|---|---|---|---|---|---|---|---|---|---|
| angleIdx | 16 | 17 | 17 | 17 | 18 | 18 | 18 | 19 | 19 | 19 |
| distanceIdx | 3 | 1 | 2 | 3 | 1 | 2 | 3 | 1 | 2 | 3 |

FIG. 23

Table xx – Mapping table of the geo_partition_idx' values based on the geo_partition_idx value

| geo_partition_idx |  | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| geo_partition_idx' | cbHeight <= cbWidth | 50 | 18 | 37 | 47 | 54 | 9 | 1 | 14 | 15 | 19 | 43 | 20 | 48 | 60 | 49 | 51 |
|  | cbHeight > cbWidth | 36 | 1 | 0 | 5 | 37 | 6 | 8 | 3 | 9 | 2 | 4 | 7 | 10 | 43 | 11 | 13 |
| geo_partition_idx |  | 16 | 17 | 18 | 19 | 20 | 21 | 22 | 23 | 24 | 25 | 26 | 27 | 28 | 29 | 30 | 31 |
| geo_partition_idx' | cbHeight <= cbWidth | 10 | 11 | 24 | 52 | 53 | 17 | 22 | 26 | 0 | 31 | 8 | 12 | 27 | 36 | 41 | 46 |
|  | cbHeight > cbWidth | 34 | 40 | 41 | 42 | 58 | 12 | 24 | 29 | 60 | 17 | 23 | 35 | 59 | 63 | 19 | 31 |

FIG. 24

Table 36: Specification of the angleIdx and distanceIdx values based on the geo_partition_idx value.

| partition_idx | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| angleIdx | 0 | 0 | 1 | 1 | 1 | 1 | 1 | 1 | 2 | 2 | 2 | 2 | 3 | 3 | 3 | 3 | 3 | 4 |
| distanceIdx | 1 | 3 | 0 | 1 | 2 | 3 | 0 | 1 | 2 | 3 | 0 | 1 | 2 | 3 | 0 | 1 | 2 | 3 |
| partition_idx | 18 | 19 | 20 | 21 | 22 | 23 | 24 | 25 | 26 | 27 | 28 | 29 | 30 | 31 | 32 | 33 | 34 | 35 |
| angleIdx | 4 | 5 | 5 | 5 | 5 | 6 | 6 | 6 | 7 | 7 | 7 | 7 | 8 | 8 | 8 | 8 | 9 | 9 |
| distanceIdx | 0 | 1 | 2 | 3 | 0 | 1 | 2 | 3 | 0 | 1 | 2 | 3 | 0 | 1 | 2 | 3 | 0 | 1 |
| partition_idx | 36 | 37 | 38 | 39 | 40 | 41 | 42 | 43 | 44 | 45 | 46 | 47 | 48 | 49 | 50 | 51 | 52 | 53 |
| angleIdx | 9 | 10 | 10 | 10 | 10 | 11 | 11 | 11 | 11 | 12 | 12 | 12 | 12 | 13 | 13 | 13 | 13 | 14 |
| distanceIdx | 2 | 3 | 0 | 1 | 2 | 3 | 0 | 1 | 2 | 3 | 0 | 1 | 2 | 3 | 0 | 1 | 2 | 3 |
| partition_idx | 54 | 55 | 56 | 57 | 58 | 59 | 60 | 61 | 62 | 63 | 64 | 65 | 66 | 67 | 68 | 69 | 70 | 71 |
| angleIdx | 14 | 15 | 15 | 15 | 15 | 16 | 16 | 16 | 17 | 17 | 17 | 18 | 18 | 19 | 19 | 19 | 20 | 20 |
| distanceIdx | 1 | 2 | 3 | 0 | 1 | 2 | 3 | 0 | 1 | 2 | 3 | 0 | 1 | 2 | 3 | 0 | 1 | 2 |
| partition_idx | 72 | 73 | 74 | 75 | 76 | 77 | 78 | 79 | 80 | 81 | | | | | | | | |
| angleIdx | 20 | 21 | 21 | 21 | 22 | 22 | 22 | 23 | 23 | 23 | | | | | | | | |
| distanceIdx | 3 | 0 | 1 | 2 | 3 | 0 | 1 | 2 | 3 | 0 | | | | | | | | |

FIG. 25

Table 36: Specification of the angleIdx and distanceIdx values based on the geo_partition_idx value.

| geo_partition_idx | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 | 5 | 5 |
| distanceIdx | 1 | 3 | 0 | 1 | 2 | 3 | 0 | 1 | 2 | 3 | 0 | 1 | 2 | 3 | 0 | 1 | 2 | 3 |

| geo_partition_idx | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|
| angleIdx | 8 | 8 | 11 | 11 | 11 | 11 | 12 | 12 | 12 | 12 | 13 | 13 | 13 | 13 | 14 | 14 | 14 | 14 |
| distanceIdx | 1 | 3 | 0 | 1 | 2 | 3 | 0 | 1 | 2 | 3 | 0 | 1 | 2 | 3 | 0 | 1 | 2 | 3 |

| geo_partition_idx | 36 | 37 | 38 | 39 | 40 | 41 | 42 | 43 | 44 | 45 | 46 | 47 | 48 | 49 | 50 | 51 | 52 | 53 |
|---|---|---|---|---|---|---|---|---|---|---|---|---|---|---|---|---|---|---|
| angleIdx | 16 | 16 | 18 | 18 | 18 | 18 | 19 | 19 | 19 | 19 | 20 | 20 | 20 | 20 | 21 | 21 | 21 | 21 |
| distanceIdx | 1 | 3 | 0 | 1 | 2 | 3 | 0 | 1 | 2 | 3 | 0 | 1 | 2 | 3 | 0 | 1 | 2 | 3 |

| geo_partition_idx | 54 | 55 | 56 | 57 | 58 | 59 | 60 | 61 | 62 | 63 |
|---|---|---|---|---|---|---|---|---|---|---|
| angleIdx | 24 | 24 | 26 | 26 | 26 | 26 | 27 | 27 | 27 | 27 |
| distanceIdx | 1 | 3 | 0 | 1 | 2 | 3 | 0 | 1 | 2 | 3 |

FIG. 26

Table 36: Specification of the angleIdx and distanceIdx values based on the geo_partition_idx value.

FIG. 27

Table 36: Specification of the angleIdx and distanceIdx values based on the geo_partition_idx value.

| geo_partition_idx | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| angleIdx | 0 | 0 | 1 | 1 | 1 | 1 | 2 | 2 | 2 | 2 | 3 | 3 | 3 | 3 | 4 | 4 | 4 | 4 |
| distanceIdx | 1 | 3 | 0 | 1 | 2 | 3 | 0 | 1 | 2 | 3 | 0 | 1 | 2 | 3 | 0 | 1 | 2 | 3 |
| geo_partition_idx | 18 | 19 | 20 | 21 | 22 | 23 | 24 | 25 | 26 | 27 | 28 | 29 | 30 | 31 | 32 | 33 | 34 | 35 |
| angleIdx | 6 | 6 | 8 | 8 | 8 | 8 | 9 | 9 | 9 | 9 | 10 | 10 | 10 | 10 | 11 | 11 | 11 | 11 |
| distanceIdx | 1 | 3 | 0 | 1 | 2 | 3 | 0 | 1 | 2 | 3 | 0 | 1 | 2 | 3 | 0 | 1 | 2 | 3 |
| geo_partition_idx | 36 | 37 | 38 | 39 | 40 | 41 | 42 | 43 | 44 | 45 | 46 | 47 | 48 | 49 | 50 | 51 | 52 | 53 |
| angleIdx | 12 | 12 | 13 | 13 | 13 | 13 | 14 | 14 | 15 | 15 | 16 | 16 | 18 | 18 | 18 | 18 | 20 | 20 |
| distanceIdx | 1 | 3 | 1 | 2 | 3 | 1 | 2 | 3 | 1 | 2 | 3 | 1 | 2 | 3 | 0 | 1 | 2 | 3 |
| geo_partition_idx | 54 | 55 | 56 | 57 | 58 | 59 | 60 | 61 | 62 | 63 | | | | | | | | |
| angleIdx | 21 | 21 | 21 | 22 | 22 | 22 | 23 | 23 | 23 | 23 | | | | | | | | |
| distanceIdx | 1 | 2 | 3 | 1 | 2 | 3 | 1 | 2 | 3 | 1 | | | | | | | | |

FIG. 28

Table 36: Specification of the angleIdx and distanceIdx values based on the geo_partition_idx value.

| geo_partition_idx | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| angleIdx | 0 | 0 | 1 | 1 | 1 | 1 | 2 | 2 | 2 | 2 | 3 | 3 | 3 | 3 | 4 | 4 | 4 | 4 |
| distanceIdx | 1 | 3 | 0 | 1 | 2 | 3 | 0 | 1 | 2 | 3 | 0 | 1 | 2 | 3 | 0 | 1 | 2 | 3 |
| geo_partition_idx | 18 | 19 | 20 | 21 | 22 | 23 | 24 | 25 | 26 | 27 | 28 | 29 | 30 | 31 | 32 | 33 | 34 | 35 |
| angleIdx | 6 | 8 | 8 | 8 | 8 | 9 | 9 | 9 | 9 | 10 | 10 | 10 | 10 | 11 | 11 | 11 | 11 | 12 |
| distanceIdx | 3 | 0 | 1 | 2 | 3 | 0 | 1 | 2 | 3 | 0 | 1 | 2 | 3 | 0 | 1 | 2 | 3 | 0 |
| geo_partition_idx | 36 | 37 | 38 | 39 | 40 | 41 | 42 | 43 | 44 | 45 | 46 | 47 | 48 | 49 | 50 | 51 | 52 | 53 |
| angleIdx | 12 | 13 | 13 | 13 | 13 | 14 | 14 | 14 | 14 | 15 | 15 | 15 | 15 | 16 | 16 | 18 | 18 | 18 |
| distanceIdx | 1 | 2 | 3 | 1 | 3 | 1 | 3 | 1 | 3 | 1 | 3 | 1 | 3 | 1 | 3 | 1 | 3 | 1 |
| geo_partition_idx | 54 | 55 | 56 | 57 | 58 | 59 | 60 | 61 | 62 | 63 | | | | | | | | |
| angleIdx | 20 | 21 | 21 | 21 | 22 | 22 | 23 | 23 | 23 | 23 | | | | | | | | |
| distanceIdx | 2 | 3 | 1 | 2 | 2 | 3 | 1 | 2 | 3 | 3 | | | | | | | | |

FIG. 29

Table 36: Specification of the angleIdx and distanceIdx values based on the geo_partition_idx value.

| | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| geo_partition_idx | 0 | 1 | 2 | 3 | 4 | 5 | 6 | 7 | 8 | 9 | 10 | 11 | 12 | 13 | 14 | 15 | 16 | 17 |
| angleIdx | 0 | 1 | 1 | 1 | 1 | 1 | 2 | 2 | 2 | 2 | 3 | 3 | 3 | 3 | 4 | 4 | 4 | 4 |
| distanceIdx | 3 | 0 | 0 | 1 | 2 | 3 | 0 | 1 | 2 | 3 | 0 | 1 | 2 | 3 | 0 | 1 | 2 | 3 |
| geo_partition_idx | 18 | 19 | 20 | 21 | 22 | 23 | 24 | 25 | 26 | 27 | 28 | 29 | 30 | 31 | 32 | 33 | 34 | 35 |
| angleIdx | 6 | 6 | 8 | 8 | 8 | 8 | 9 | 9 | 9 | 9 | 10 | 10 | 10 | 10 | 11 | 11 | 11 | 11 |
| distanceIdx | 3 | 3 | 0 | 1 | 2 | 3 | 0 | 1 | 2 | 3 | 0 | 1 | 2 | 3 | 0 | 1 | 2 | 3 |
| geo_partition_idx | 36 | 37 | 38 | 39 | 40 | 41 | 42 | 43 | 44 | 45 | 46 | 47 | 48 | 49 | 50 | 51 | 52 | 53 |
| angleIdx | 12 | 12 | 13 | 13 | 13 | 14 | 14 | 14 | 15 | 15 | 15 | 16 | 16 | 16 | 18 | 18 | 20 | 20 |
| distanceIdx | 3 | 3 | 1 | 2 | 3 | 1 | 2 | 3 | 1 | 2 | 3 | 1 | 2 | 3 | 1 | 3 | 1 | 3 |
| geo_partition_idx | 54 | 55 | 56 | 57 | 58 | 59 | 60 | 61 | 62 | 63 | | | | | | | | |
| angleIdx | 21 | 21 | 21 | 21 | 22 | 22 | 22 | 23 | 23 | 23 | | | | | | | | |
| distanceIdx | 3 | 1 | 2 | 3 | 1 | 2 | 3 | 1 | 2 | 3 | | | | | | | | |

FIG. 30

HIGH LEVEL SYNTAX FOR INTER PREDICTION WITH GEOMETRIC PARTITIONING

CROSS REFERENCE TO RELATED APPLICATIONS

This application is a continuation of International Patent Application No. PCT/CN2020/138784, filed on Dec. 24, 2020, which claims the priority to and benefits of International Patent Application No. PCT/CN2019/128091, filed on Dec. 24, 2019. All the aforementioned patent applications are hereby incorporated by reference in their entireties.

TECHNICAL FIELD

This patent document relates to video coding and decoding techniques, devices and systems.

BACKGROUND

Currently, efforts are underway to improve the performance of current video codec technologies to provide better compression ratios or provide video coding and decoding schemes that allow for lower complexity or parallelized implementations. Industry experts have recently proposed several new video coding tools and tests are currently underway for determining their effectivity.

SUMMARY

Devices, systems and methods related to digital video coding, and specifically, to management of motion vectors are described. The described methods may be applied to existing video coding standards (e.g., High Efficiency Video Coding (HEVC) or Versatile Video Coding) and future video coding standards or video codecs.

In one representative aspect, the disclosed technology may be used to provide a method for video processing. This method includes determining, for a conversion between a current video block of a video and a bitstream representation of the video, an applicability of a geometric partitioning mode based on a rule; and performing the conversion based on the determining, and wherein the mle depends on a block width, a block height, and/or an aspect ratio of the current video block.

In another representative aspect, the disclosed technology may be used to provide another method for video processing. This method includes performing a conversion between a video unit of a video and a bitstream representation of the video, wherein the bitstream representation conforms to a format rule, wherein the format rule specifies whether to include one or more syntax elements indicative of a number of geometric partitioning modes allowed for representing the videounit in the bitstream representation.

In yet another representative aspect, the disclosed technology may be used to provide yet another method for video processing. This method includes performing a conversion between a video unit including one or more video blocks of a video and a bitstream representation of the video according to a rule, wherein the one or more video blocks are coded using one or more geometric partitioning modes, and wherein the rule specifies that the one or more geometry partitioning modes are from two sets of geometric partitioning modes are allowed for processing the one or more video blocks.

In another representative aspect, the disclosed technology may be used to provide another method for video processing. This method includes performing a conversion between a video unit including one or more video blocks of a video and a bitstream representation of the video according to a rule, wherein the one or more video blocks are classified into multiple block categories according to decoded information, and wherein the rule specifies that multiple sets of geometric partitioning modes are allowed for processing the one or more video blocks.

In another representative aspect, the disclosed technology may be used to provide another method for video processing. This method includes performing a conversion between a current video block of a video and a bitstream representation of the video according to a rule, wherein the rule specifies that a mapping between a geometric partitioning mode index for the current video block and an angle index and/or a distance index for determining partitions of the current video block is dependent on decoded information of the current video block.

In another representative aspect, the disclosed technology may be used to provide another method for video processing. This method includes performing a conversion between a current video block of a video unit of a video and a bitstream representation of the video according to a rule, wherein the rule specifies that a first number indicating a number of geometric partitioning modes, geometry partition angles, and/or geometry partition distances that are allowed for the current video block is different from a second number indicating a number of geometric partitioning modes, geometry partition angles, and/or geometry partition distances that are available for the video unit.

In another representative aspect, the disclosed technology may be used to provide another method for video processing. This method includes performing a conversion between a current video block of a video and a bitstream representation of the video, wherein a geometric partitioning mode index of the current video block is coded in the bitstream representation such that a binarization of the geometric partitioning mode index is performed according to a rule, wherein the rule specifies that a value of a maximum value during the binarization of the geometric partitioning mode index is equal to X in a case that a dimension of the current video block satisfies a certain condition, whereby X is a positive integer.

In another representative aspect, the disclosed technology may be used to provide another method for video processing. This method includes determining, for a conversion between a current video block of a video and a bitstream representation of the video, a geometry partition distance based on a table including values of geometry partitioning distances corresponding to geometry partition indices; and performing the conversion based on the determining.

In another representative aspect, the disclosed technology may be used to provide another method for video processing. This method includes performing a conversion between a current video block of a video and a bitstream representation of the video according to a rule, wherein the rule specifies that the conversion allows using a coding tool for the current video block coded using a geometric partitioning mode, and wherein the bitstream representation includes an indication and information of the coding tool and the geometric partitioning mode.

In another representative aspect, the disclosed technology may be used to provide another method for video processing. This method includes performing a conversion between a current video block of a video and a bitstream representation of the video according to a rule, wherein the rule specifies whether to or how to apply a filtering process to the current video block depends on a usage of a geometric partitioning mode in coding the current video block.

Further, in a representative aspect, an apparatus in a video system comprising a processor and a non-transitory memory with instructions thereon is disclosed. The instructions upon execution by the processor, cause the processor to implement any one or more of the disclosed methods.

Also, a computer program product stored on a non-transitory computer readable media, the computer program product including program code for carrying out any one or more of the disclosed methods is disclosed.

The above and other aspects and features of the disclosed technology are described in greater detail in the drawings, the description and the claims.

BRIEF DESCRIPTION OF THE DRAWINGS

FIG. 5 shows an example of a triangle partition based inter prediction mode.

FIG. 14 shows a flowchart of an example method for video processing.

FIGS. 19-21 show tables indicating specification of angleIdx and distanceIdx values FIG. 22 shows old Table 8-10 that is deleted from the relevant working draft and FIG. 23 shows newly suggested Table 8-10 that is accordingly changed in the relevant working draft.

FIG. 24 shows a mapping table of the geo_partition_idx' values based on the geo_partition_idx value.

FIG. 25 shows an old Table 36 that is deleted from a relevant working draft and FIGS. 26-30 show examples of a newly suggested Table 36, wherein Table 36 shows a specification of the angleIdx and distanceIdx values based on the geo_partition_idx value.

DETAILED DESCRIPTION

Video Coding in HEVC/H.265

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

2.1. Extended Merge Prediction

In VTM, the merge candidate list is constructed by including the following five types of candidates in order:
1) Spatial MVP from spatial neighbour CUs
2) Temporal MVP from collocated CUs
3) History-based MVP from an FIFO table
4) Pairwise average MVP
5) Zero MVs.

The size of merge list is signalled in slice header and the maximum allowed size of merge list is 6 in VTM. For each CU code in merge mode, an index of best merge candidate is encoded using truncated unary binarization (TU). The first bin of the merge index is coded with context and bypass coding is used for other bins.

The generation process of each category of merge candidates is provided in this session.

2.1.1. Spatial Candidates Derivation

Figure 1:
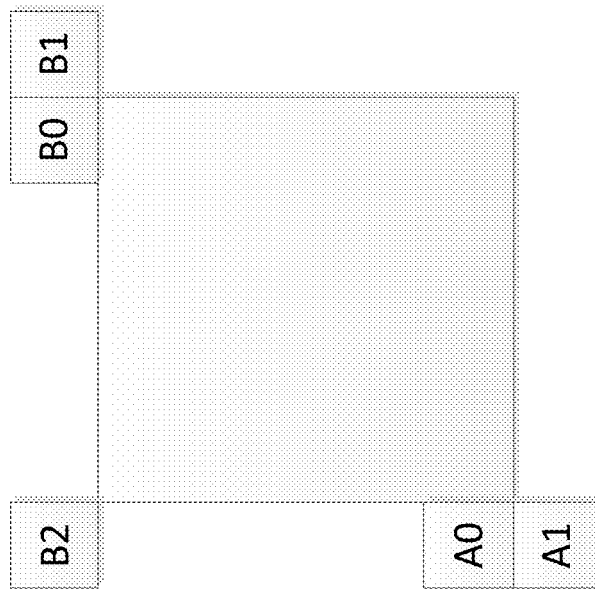
FIG. 1 shows example positions of a spatial merge candidate.
Figure 2:
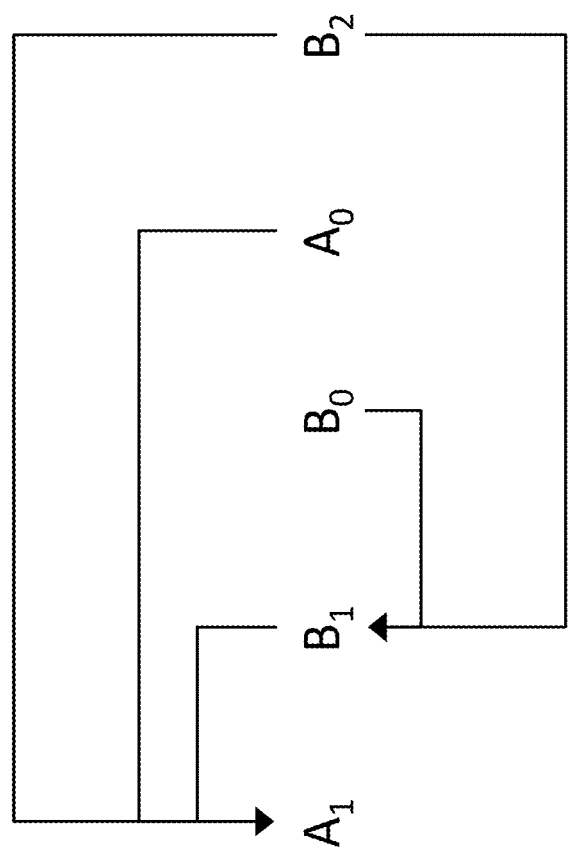
FIG. 2 shows an example of candidate pairs considered for redundancy check of spatial merge candidates.

The derivation of spatial merge candidates in VVC is same to that in HEVC. A maximum of four merge candidates are selected among candidates located in the positions depicted in FIG. 1. The order of derivation is $A_0$, $B_0$, $B_1$, $A_1$ and $B_2$. Position $B_2$ is considered only when any CU of position $A_0$, $B_0$, $B_1$, $A_1$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 2 are considered and a candidate is only added to the list if the corresponding candidate used for redundancy check has not the same motion information.

2.1.2. Temporal Candidates Derivation

Figure 3:
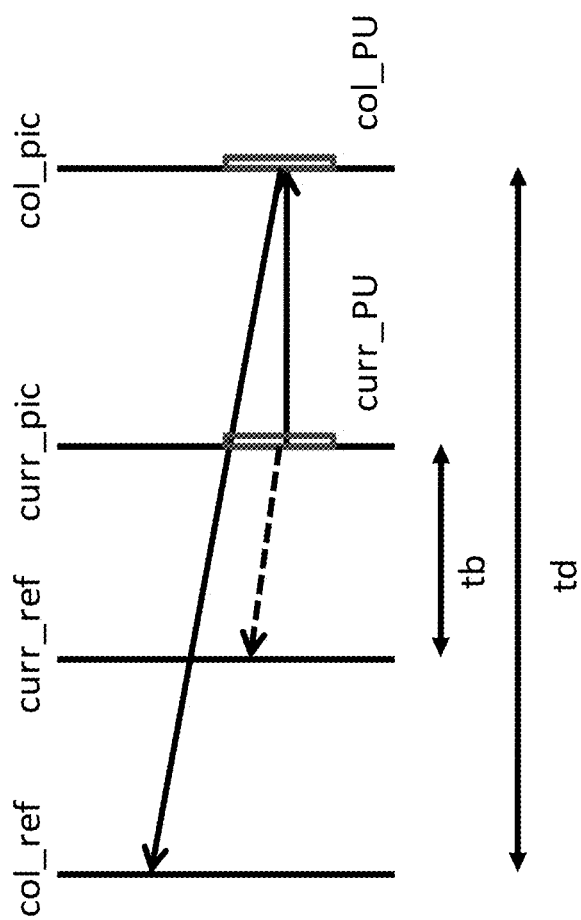
FIG. 3 shows an example of motion vector scaling for a temporal merge candidate.

In this step, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signaled in the slice header. The scaled motion vector for temporal merge candidate is obtained as illustrated by the dotted line in FIG. 3, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 4:
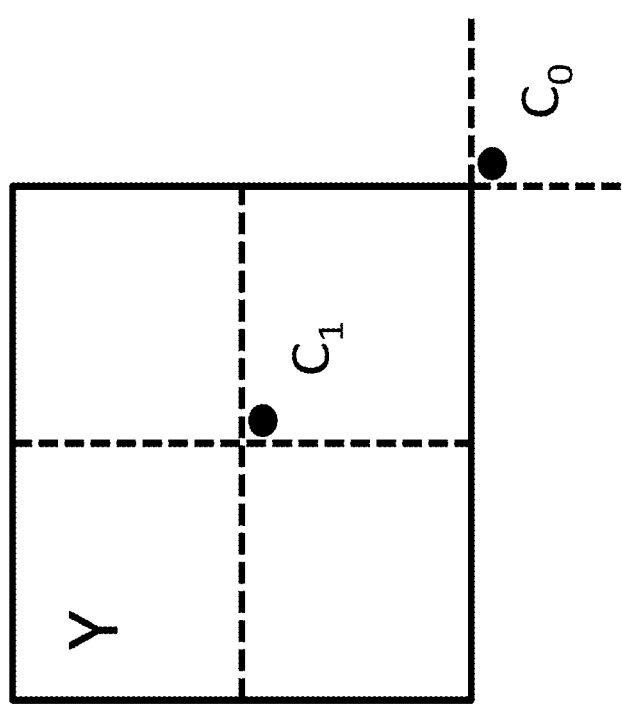
FIG. 4 shows example candidate positions for a temporal merge candidate.

The position for the temporal candidate is selected between candidates $C_0$ and $C_1$, as depicted in FIG. 4. If CU at position $C_0$ is not available, is intra coded, or is outside of the current row of CTUs, position $C_1$ is used. Otherwise, position $C_0$ is used in the derivation of the temporal merge candidate.

2.1.3. History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

In VTM the HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward.

HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:
1. Number of HMPV candidates is used for merge list generation is set as (N<=4)?M: (8−N), wherein N indicates number of existing candidates in the merge list and M indicates number of available HMVP candidates in the table.
2. Once the total number of available merge candidates reaches the maximally allowed merge candidates minus 1, the merge candidate list construction process from HMVP is terminated.

2.1.4. Pair-Wise Average Merge Candidates Derivation

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

When the merge list is not full after pair-wise average merge candidates are added, the zero MVPs are inserted in the end until the maximum merge candidate number is encountered.

2.2. Triangle Partition for Inter Prediction

In VTM, a triangle partition mode (TPM) is supported for inter prediction. The triangle partition mode is only applied to CUs that are 64 samples or larger and are coded in skip or merge mode but not in a regular merge mode, or MMVD mode, or CIIP mode or subblock merge mode. A CU-level flag is used to indicate whether the triangle partition mode is applied or not.

When this mode is used, a CU is split evenly into two triangle-shaped partitions, using either the diagonal split or the anti-diagonal split (FIG. 5). Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU. The uni-prediction motion for each partition is derived directly the merge candidate list constructed for extended merge prediction in 2.1, and the selection of a uni-prediction motion from a given merge candidate in the list is according to the procedure in 2.2.1.

If triangle partition mode is used for a current CU, then a flag indicating the direction of the triangle partition (diagonal or anti-diagonal), and two merge indices (one for each partition) are further signalled. After predicting each of the triangle partitions, the sample values along the diagonal or anti-diagonal edge are adjusted using a blending processing with adaptive weights. This is the prediction signal for the whole CU, and transform and quantization process will be applied to the whole CU as in other prediction modes. Finally, the motion field of a CU predicted using the triangle partition mode is stored in 4×4 units as in 2.2.3.

2.2.1. Uni-Prediction Candidate List Construction

Figure 6:
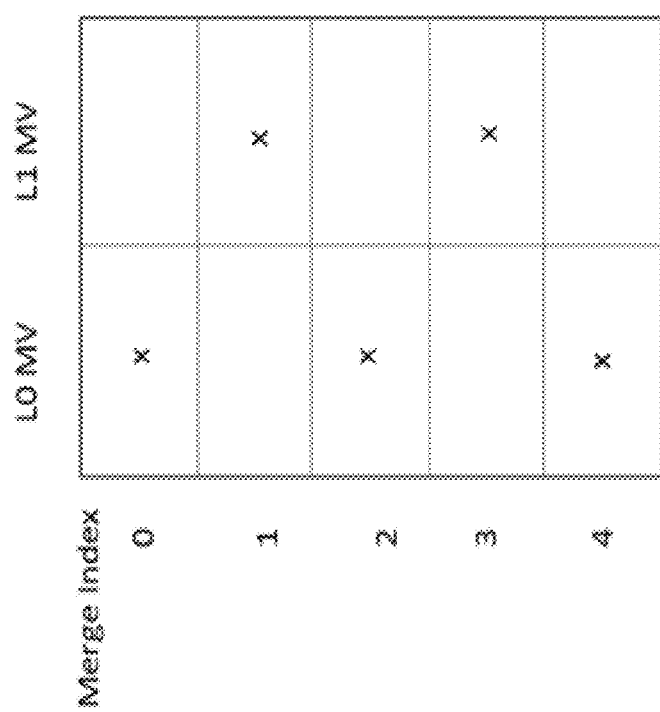
FIG. 6 shows an example of uni-prediction motion vector selection for a triangle partition mode.

Given a merge candidate index, the uni-prediction motion vector is derived from the merge candidate list constructed for extended merge prediction using the process in 2.1, as exemplified in FIG. 6. For a candidate in the list, its LX motion vector with X equal to the parity of the merge candidate index value, is used as the uni-prediction motion vector for triangle partition mode. These motion vectors are marked with "x" in FIG. 6. In case a corresponding LX motion vector does not exist, the L(1-X) motion vector of the same candidate in the extended merge prediction candidate list is used as the uni-prediction motion vector for triangle partition mode.

2.2.2. Blending Along the Triangle Partition Edge

Figures 7A, 7B:
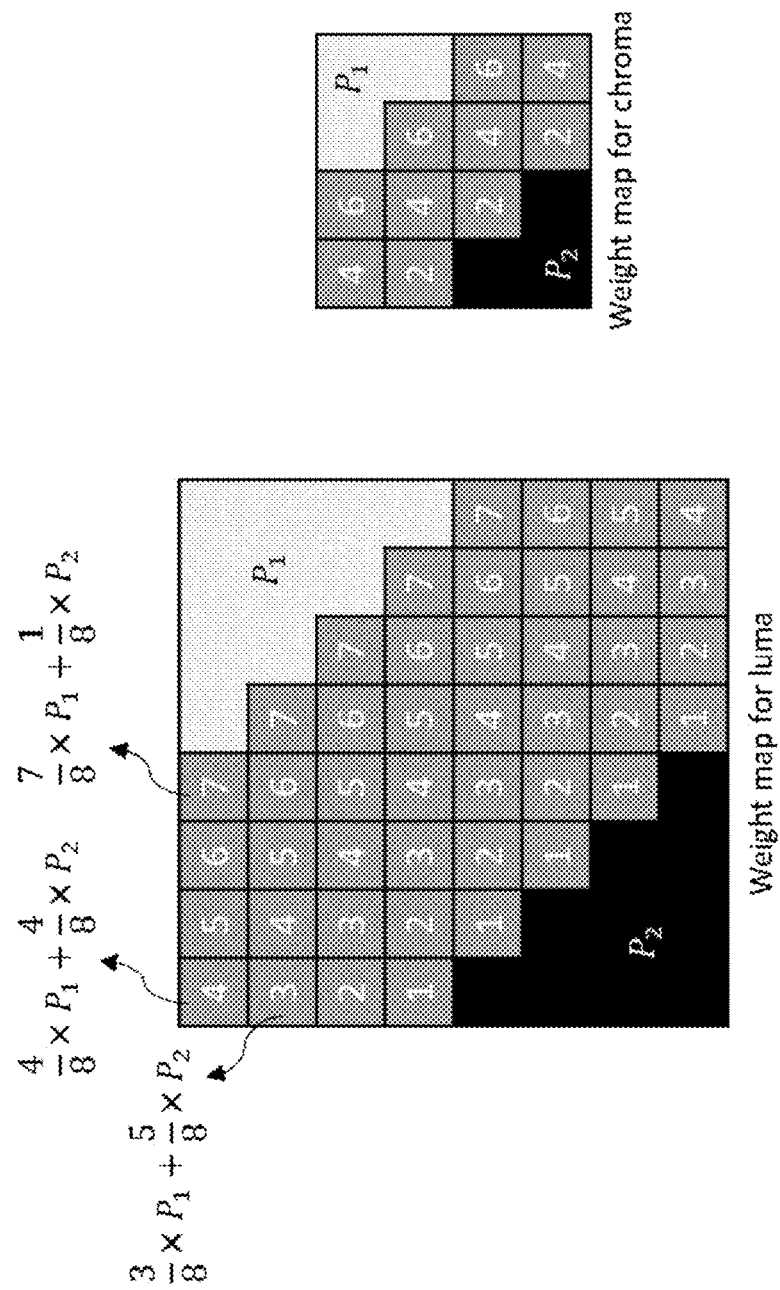
FIGS. 7A and 7B show example of weights used in a blending process for a luma block and a chroma block respectively.

After predicting each triangle partition using its own motion, blending is applied to the two prediction signals to derive samples around the diagonal or anti-diagonal edge. The following weights are used in the blending process:

{7/8, 6/8, 5/8, 4/8, 3/8, 2/8, 1/8} for luma and {6/8, 4/8, 2/8} for chroma, as shown in FIG. 7.

2.2.3. Motion Field Storage

The motion vectors of a CU coded in triangle partition mode are stored in 4×4 units. Depending on the position of each 4×4 unit, either uni-prediction or bi-prediction motion vectors are stored. Denote Mv1 and Mv2 as uni-prediction motion vectors for partition 1 and partition 2, respectively. If a 4×4 unit is located in the non-weighted area shown in the example of FIG. 7, either Mv1 or Mv2 is stored for that 4×4 unit. Otherwise, if the 4×4 unit is located in the weighted area, a bi-prediction motion vector is stored. The bi-prediction motion vector is derived from Mv1 and Mv2 according to the following process:

1) If Mv1 and Mv2 are from different reference picture lists (one from L0 and the other from L1), then Mv1 and Mv2 are simply combined to form the bi-prediction motion vector.
2) Otherwise, if Mv1 and Mv2 are from the same list, and without loss of generality, assume they are both from L0. In this case, 2.a) If the reference picture of either Mv2 (or My1) appears in L1, then that Mv2 (or Mv1) is converted to a L1 motion vector using that reference picture in L1. Then the two motion vectors are combined to form the bi-prediction motion vector; Otherwise, instead of bi-prediction motion, only uni-prediction motion Mv1 is stored.

2.3. Geometrical Partitioning (GEO) for Inter Prediction

The following description is extracted from JVET-P0884, JVET-P0107, JVET-P0304 and JVET-P0264.

Geometric merge mode (GEO) was proposed in $15^{th}$ Gothenburg JVET meeting as extension of the existing triangle prediction mode (TPM). In $16^{th}$ Geneva JVET meeting, a simpler designed GEO mode in JVET-P0884 has been selected as a CE anchor for further study. Nowadays GEO mode is being studied as a replacement of the existing TPM in VVC.

Figure 8:
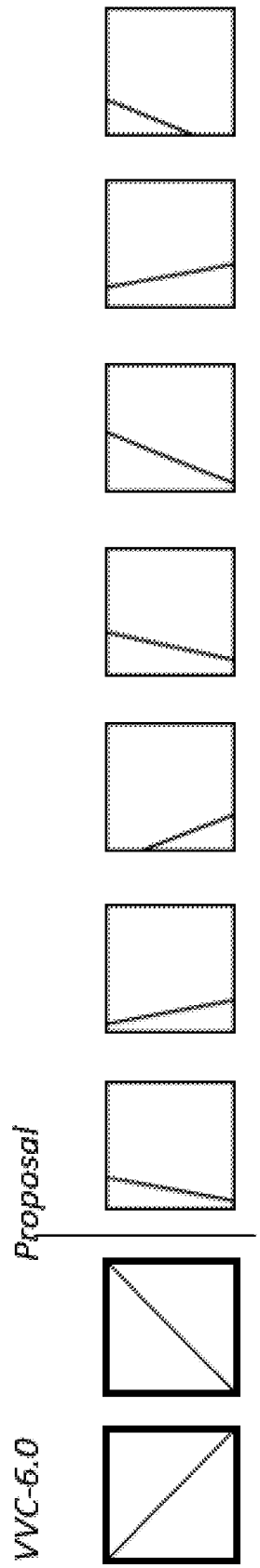
FIG. 8 shows an example of existing and proposed shapes in connection with a triangle prediction mode.

FIG. 8 illustrates TPM in VTM-6.0 and additional shapes proposed for non-rectangular inter blocks.

Figure 9:
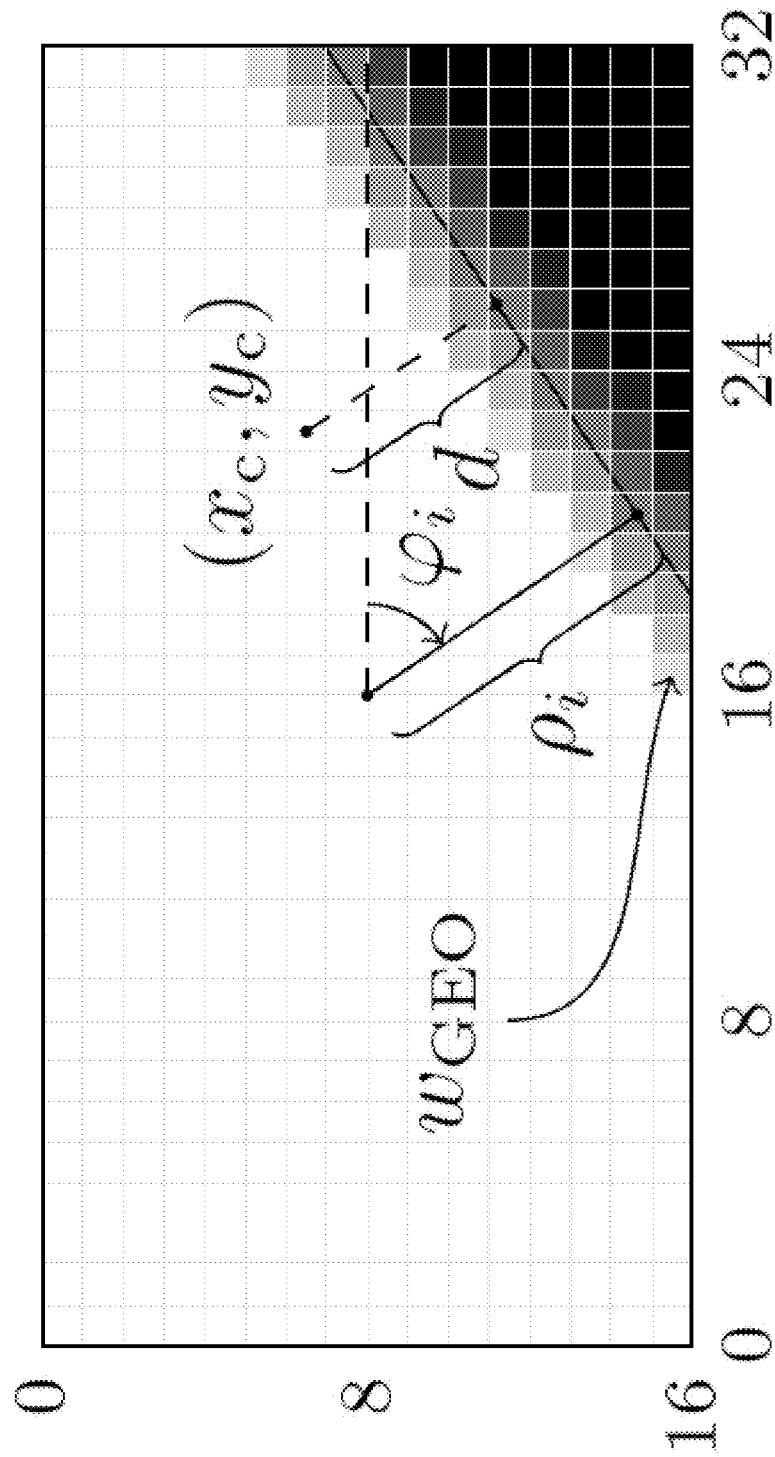
FIG. 9 shows an example of a geometric merge mode (GEO) split boundary description.

The split boundary of geometric merge mode is descripted by angle $\varphi_i$ and distance offset $\rho_i$ as shown in FIG. 9. Angle $\varphi_i$ represents a quantized angle between 0 and 360 degrees and distance offset $\rho_i$ represents a quantized offset of the largest distance $\rho_{max}$ In addition, the split directions overlapped with binary tree splits and TPM splits are excluded.

Figure 10B:
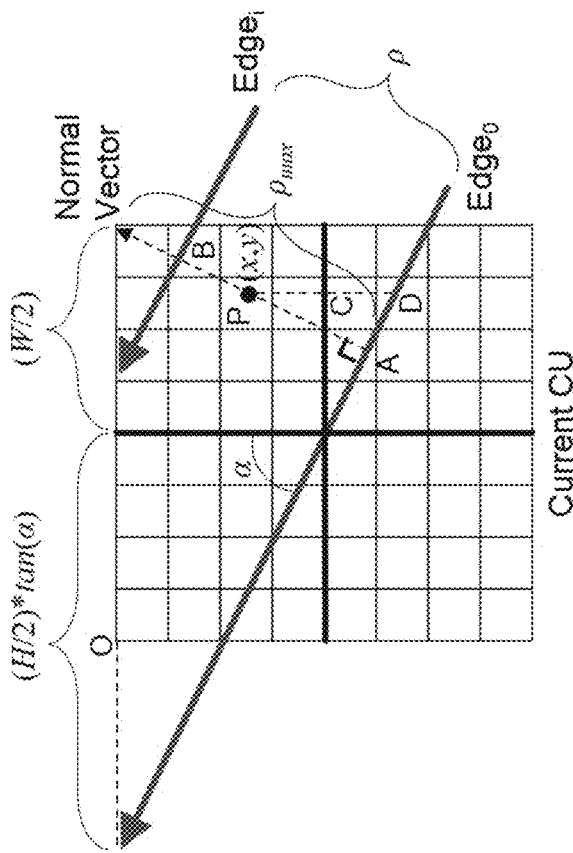
FIG. 10B shows an example of geometric relations between a given pixel position and two edges.
Figure 10A:
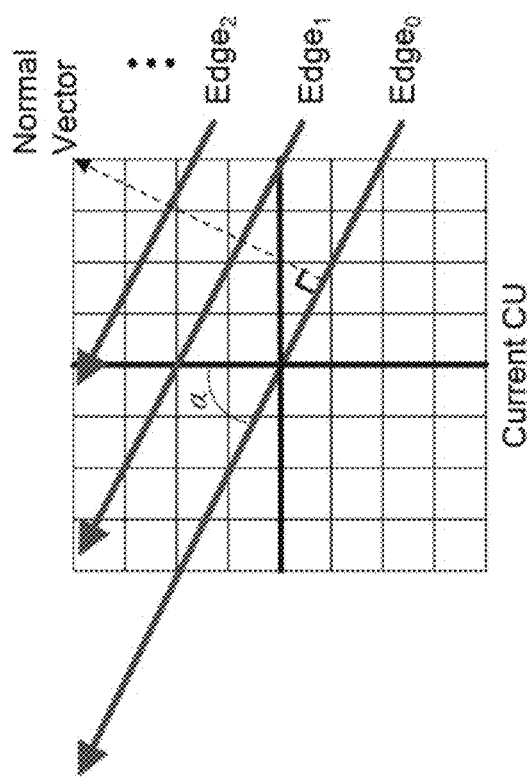
FIG. 10A shows an example illustration of edges supported in GEO.

In JVET-P0884, GEO is applied to block sizes not smaller than 8×8, and for each block size, there are 82 different partitioning manners, differentiated by 24 angles and 4 edges relative to the center of a CU. FIG. 10A shows that the 4 edges are distributed uniformly along the direction of normal vector within a CU, starting from Edge0 that passes through the CU center. Each partition mode (i.e., a pair of an angle index and an edge index) in GEO is assigned with a pixel-adaptive weight table to blend samples on the two partitioned parts, where the weight value of a sampled ranges from 0 to 8 and is determined by the L2 distance from the center position of a pixel to the edge. Basically, unit-gain constraint is followed when weight values are assigned, that is, when a small weight value is assigned to a GEO partition, a large complementary one is assigned to the other partition, summing up to 8.

The computation of the weight value of each pixel is two-fold: (a) computing the displacement from a pixel position to a given edge and (c) mapping the computed displacement to a weight value through a pre-defined look-up table. The way to compute the displacement from a pixel position (x, y) to a given edge Edgei is actually the same as computing the displacement from (x, y) to Edge0 and subtract this displacement by the distance p between Edge0 and Edgei. FIG. 10B illustrates the geometric relations among (x, y) and edges. Specifically, the displacement from (x, y) to Edgei can be formulated as follows:

$$\overline{PB} = \overline{PA} - \rho \qquad (1)$$

$$= (\overline{PC} + \overline{CD} * \sin(\alpha)) - \rho \qquad (2)$$

$$= \left(\left(\frac{H}{2} - y\right) + \left(x - \frac{W}{2}\right) * \cot(\alpha)\right) * \sin(\alpha) - \rho \qquad (3)$$

$$= \left(x - \frac{W}{2}\right) * \cos(\alpha) - \left(y - \frac{H}{2}\right) * \sin(\alpha) - \rho \qquad (4)$$

$$= x * \cos(\alpha) - y * \sin(\alpha) - \left(\rho + \frac{W}{2} * \cos(\alpha) - \frac{H}{2} * \sin(\alpha)\right) \qquad (5)$$

$$= x * \cos(\alpha) + y * \cos\left(\alpha + \frac{\pi}{2}\right) - \left(\rho + \frac{W}{2} * \cos(\alpha) + \frac{H}{2} * \cos\left(\alpha + \frac{\pi}{2}\right)\right). \qquad (6)$$

The value of p is a function of the maximum length (denoted by ρmax) of the normal vector and edge index i, that is:

$$\rho = i * (\rho_{max} - 1)/N \qquad (7)$$

$$= i * \left(\left(\frac{H}{2} * \tan(\alpha) + \frac{W}{2}\right) * \cos(\alpha) - 1\right)/N \qquad (8)$$

where N is the number of edges supported by GEO and the "1" is to prevent the last edge EdgeN-1 from falling too close to a CU corner for some angle indices. Substituting Eq. (8) from (6), we can compute the displacement from each pixel (x,y) to a given Edgei. In short, we denote $\overline{PB}$ as wIdx (x,y). The computation of ρ is needed once per CU, and the computation of wIdx (x,y) is needed once per sample, in which multiplications are involved.

2.3.1. JVET-P0884

JVET-P0884 jointed the proposal jointed the proposed simplification of JVET-P0107 slope based version 2, JVET-P0304 and JVET-P0264 test 1 on top of CE4-1.14 of the $16^{th}$ Geneva JVET meeting.

a) In the jointed contribution, the geo angles are defined slope (tangle power of 2) same as in JVET-P0107 and JVET-P0264. The slope used in this proposal is (1, ½, ¼, 4, 2). In this case, the multiplications are replaced by shift operation if the blending mask is calculated on the fly.
b) The rho calculation is replaced by offset X and offset Y as descripted in JVET-P304. In this case, only the 24 blending masks need to be stored in case of not calculate the blending mask on the fly

2.3.2. JVET-P0107 Slope Based Version 2

Based on the slope based GEO version 2, The Dis[.] look up table is illustrated in Table 1

TABLE 1

2 bits Dis[.] look up table for slope based GEO

| idx | 0 | 1 | 2 | 4 | 6 | 7 | 8 | 9 | 10 | 12 | 14 | 15 |
|---|---|---|---|---|---|---|---|---|---|---|---|---|
| Dis[idx] | 4 | 4 | 4 | 4 | 2 | 1 | 0 | −1 | −2 | −4 | −4 | −4 |
| idx | 16 | 17 | 18 | 20 | 22 | 23 | 24 | 25 | 26 | 28 | 30 | 31 |
| Dis[idx] | −4 | −4 | −4 | −4 | −2 | −1 | 0 | 1 | 2 | 4 | 4 | 4 |

With the slope based GEO version 2, the computation complexity of geo blending mask derivation is considered as multiplication (up to 2 bits shift) and addition. There is no different partitions compared to TPM. Furthermore, the rounding operation of distFromLine is removed in order to easier store the blending mask. This bugfix guarantees that sample weights are repeated in each row or column in a shifted fashion.

For example:
TPM:

---

The variable wIdx is derived as follows:
- If cIdx is equal to 0 and triangleDir is equal to 0, the following applies:
  wIdx = ( nCbW > nCbH ) ? ( Clip3( 0, 8, ( x / nCbR − y ) + 4 ) )    (8-842)
  : ( Clip3( 0, 8, ( x − y / nCbR ) + 4 ) )s
- Otherwise, if cIdx is equal to 0 and triangleDir is equal to 1, the following applies:
  wIdx = ( nCbW > nCbH ) ?( Clip3( 0, 8, ( nCbH − 1 − x / nCbR − y ) + 4 ) )    (8-843)
  ( Clip3( 0, 8, ( nCbW − 1 − x − y / nCbR ) + 4 ) )
- Otherwise, if cIdx is greater than 0 and triangleDir is equal to 0, the following applies:
  wIdx = ( nCbW > nCbH ) ? ( Clip3( 0, 4, ( x / nCbR − y ) + 2 ) )    (8-844)
  : ( Clip3( 0, 4, ( x − y / nCbR ) + 2 ) )
- Otherwise (if cIdx is greater than 0 and triangleDir is equal to 1), the following applies:
  wIdx = ( nCbW > nCbH ) ? ( Clip3( 0, 4, ( nCbH − 1 − x / nCbR − y ) + 2 ) )    (8-845)
  ( Clip3( 0, 4, ( nCbW − 1 − x − y / nCbR ) + 2 ) )

---

GEO
Angle idx is 0: ((x<<1)+1)*(4<<1)−((y<<1)+1))*(1<<1)−rho
Angle idx is 4: ((x<<1)+1)*(4<<1)−((y<<1)+1))*(4<<1)−rho
Angle idx is 6: ((x<<1)+1)*(2<<1)−((y<<1)+1))*(4<<1)−rho 2.3.3. JVET-P0264 Test 1

Figure 11:
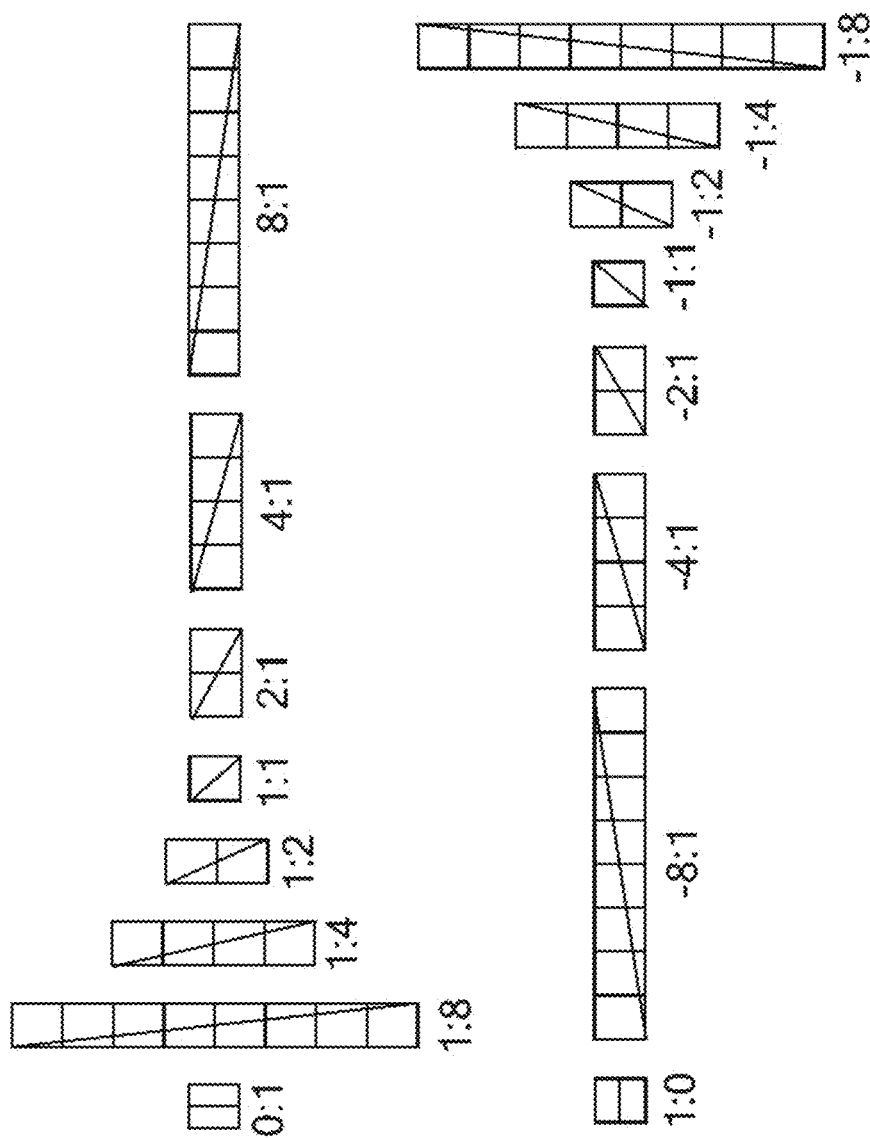
FIG. 11 shows an example of proposed angles for GEO along with their corresponding width to height ratio.

In JVET-P0264, the angles in GEO is replaced with the angles which have powers of 2 as tangent. Since the tangent of the proposed angles is a power-of-2 number, most of multiplications can be replaced by bit-shifting. Besides, the weight values for these angles can be implemented by repeating row-by-row or column-by-column with phase shift. With the proposed angles, one row or column is needed to store per block size and per partition mode. FIG. 11 shows proposed angles for GEO along with their corresponding width:height ratio.

2.3.4. JVET-P0304

In JVET-P0304, it is proposed to derive the weights and the mask for motion field storage for all blocks and partition modes from two sets of pre-defined masks, one for the blending weights derivation and the other for the masks of motion field storage. There are totally 16 masks in each set. Each mask per angle is calculated using the same equations in GEO with block width and block height set to 256 and displacement set to 0. For a block of size W×H with angle $\varphi$ and distance $\rho$, the blending weights for the luma samples are directly cropped from the pre-defined masks with offsets calculated as follows:

Variables offsetX and offsetY are calculated as follows:

$$offsetX = \begin{cases} (M-W) \gg 1 & \varphi\%16 = 8 \text{ or } (\varphi\%16 \neq 0 \text{ and } H \geq W) \\ ((M-W) \gg 1) + \varphi < 16?(\rho \times W) \gg 3 : -((\rho \times W) \gg 3) & \text{otherwise} \end{cases}$$

$$offsetY = \begin{cases} ((M-H) \gg 1) + \varphi < 16?(\rho \times H) \gg 3 : -((\rho \times H) \gg 3) & \varphi\%16 = 8 \text{ or } (\varphi\%16 \neq 0 \text{ and } H \geq W) \\ (M-H) \gg 1 & \text{otherwise} \end{cases}$$

sampleWeight$_L$[x][y]=g_sampleWeight$_L$[$\varphi$% 16][x+offsetX][y+offsetY].

where g_sampleWeight$_L$[ ] is the pre-defined masks for the blending weights.

2.4. Specification of GEO in JVET-P0884

The following specification is extracted from the provided working draft in JVET-P0884 which is on top of JVET-O2001-vE. In the below spec, GEO is also called merge wedge mode.

Merge Data Syntax

| | Descriptor |
|---|---|
| merge_data( x0,y0,cbWidth,cbHeight, chType ) { | |
|   if ( CuPredMode[ chType ][ x0 ][y0 ] = = MODE_IBC ) { | |
|     if( MaxNumIbcMergeCand> 1 ) | |
|       merge_idx[ x0 ][y0 ] | ae(v) |
|   } else { | |
|     if( MaxNumSubblockMergeCand>0 && cbWidth>=8 && cbHeight>=8 ) | |
|       merge_subblock_flag[ x0 ][y0 ] | ae(v) |
|     if( merge_subblock_flag[ x0 ][y0 ] = = 1 ) { | |
|       if( MaxNumSubblockMergeCand> 1 ) | |
|         merge_subblock_idx[ x0 ][y0 ] | ae(v) |

|  | Descriptor |
|---|---|
| ``````} else {``````   if( ( cbWidth * cbHeight )>=64 && ( (sps_ciip_enabled_flag&&``````     cu_skip_flag[ x0 ][y0 ] = = 0 && cbWidth < 128 && cbHeight < 128)||``````     ( sps_wedge_enabled_flag && MaxNumWedgeMergeCand > 1 &&``````cbWidth>=8 && cbHeight>=8&& slice_type= = B ) ) ) |  |
|      regular_merge_flag [ x0 ][y0 ] | ae(v) |
|    if ( regular_merge_flag[ x0 ][y0 ] = = 1 ){ |  |
|      if( sps_mmvd_enabled_flag) |  |
|        mmvd_merge_flag[ x0 ][y0 ] | ae(v) |
|      if( mmvd_merge_flag[ x0 ][y0 ] = = 1 ) { |  |
|        if( MaxNumMergeCand> 1 ) |  |
|          mmvd_cand_flag[ x0 ][y0 ] | ae(v) |
|        mmvd_distance_idx[ x0 ][y0 ] | ae(v) |
|        mmvd_direction_idx[ x0 ][y0 ] | ae(v) |
|      } else { |  |
|        if( MaxNumMergeCand> 1 ) |  |
|          merge_idx[ x0 ][y0 ] | ae(v) |
|      } |  |
|    } else { |  |
|      if( sps_ciip_enabled_flag && sps_wedge_enabled_flag &&``````       MaxNumWedgeMergeCand>1 && slice_type= = B &&``````       cu_skip_flag[ x0 ][y0 ] = = 0 &&``````         cbWidth>=8 && cbHeight>=8 && cbWidth < 128 && cbHeight < 128 ) { |  |
|        ciip_flag[ x0 ][y0 ] | ae(v) |
|    if( ciip_flag[ x0 ][y0 ] && MaxNumMergeCand> 1 ) |  |
|      merge_idx[ x0 ][y0 ] | ae(v) |
|    if(!ciip_flag[ x0 ][ y0 ] && MaxNumWedgeMergeCand >1 ) { |  |
|      wedge_partition_idx[ x0 ][ y0 ] | ae(v) |
|      merge_wedge_idx0[ x0 ][ y0 ] | ae(v) |
|      merge_wedge_idx1[ x0 ][ y0 ] | ae(v) |
|    } |  |
|    } |  |
|   } |  |
|  } |  |
| } |  |

The variable wedge_merge_mode[x0][y0], which specifies whether non-rectangular based motion compensation is used to generate the prediction samples of the current coding unit, when decoding a B slice, is derived as follows:

If all the following conditions are true, wedge_merge_mode[x0][y0] is set equal to 1:
   sps_wedge_enabled_flag is equal to 1.
   slice_type is equal to B.
   general_merge_flag[x0][y0] is equal to 1.
   MaxNumWedgeMergeCand is greater than or equal to 2.
   cbWidth is greater than 8 and cbHeight is greater than 8.
   regular_merge_flag[x0][y0] is equal to 0.
   merge_subblock_flag[x0][y0] is equal to 0.
   ciip_flag[x0][y0] is equal to 0.

Otherwise, wedge_merge_mode[x0][y0] is set equal to 0.
wedge_partition_idx[x0][y0] specifies the geometric splitting type of the merge geometric mode. The array indices x0, y0 specify the location (x0, y0) of the top-left luma sample of the considered coding block relative to the top-left luma sample of the picture.
merge_merge_wedge_idx0[x0][y0] specifies the first merging candidate index of the non-rectangular shape based motion compensation candidate list where x0, y0 specify the location (x0, y0) of the top-left luma sample of the considered coding block relative to the top-left luma sample of the picture.
When wedge_partition_idx0[x0][y0] is not present, it is inferred to be equal to 0.
merge_wedge_idx1[x0][y0] specifies the second merging candidate index of the wedge shape based motion compensation candidate list where x0, y0 specify the location (x0, y0) of the top-left luma sample of the considered coding block relative to the top-left luma sample of the picture.
When merge_wedge_idx1[x0][y0] is not present, it is inferred to be equal to 0.

Decoding Process for Wedge Inter Blocks
General

This process is invoked when decoding a coding unit with wedge_merge_mode[xCb][yCb] equal to 1.
Inputs to this process are:
   a luma location (xCb, yCb) specifying the top-left sample of the current coding block relative to the top-left luma sample of the current picture,
   a variable cbWidth specifying the width of the current coding block in luma samples,
   a variable cbHeight specifying the height of the current coding block in luma samples,
   the luma motion vectors in 1/16 fractional-sample accuracy mvA and mvB,
   the chroma motion vectors mvCA and mvCB,
   the reference indices refIdxA and refIdxB,
   the prediction list flags predListFlagA and predListFlagB.
Outputs of this process are:
   an (cbWidth)×(cbHeight) array $predSamples_L$ of luma prediction samples,
   an (cbWidth/SubWidthC)×(cbHeight/SubHeightC) array $predSamples_{Cb}$ of chroma prediction samples for the component Cb,
   an (cbWidth/SubWidthC)×(cbHeight/SubHeightC) array $predSamples_{Cr}$ of chroma prediction samples for the component Cr.

Let $predSamplesLA_L$ and $predSamplesLB_L$ be (cbWidth)×(cbHeight) arrays of predicted luma sample values and, $predSamplesLA_{Cb}$, $predSamplesLB_{Cb}$, $predSamplesLA_{Cr}$ and $predSamplesLB_{Cr}$ be (cbWidth/SubWidthC)×

(cbHeight/SubHeightC) arrays of predicted chroma sample values. The predSamples$_L$, predSamples$_{Cb}$ and predSamples$_{Cr}$ are derived by the following ordered steps:

1. For N being each of A and B, the following applies:

The reference picture including an ordered two-dimensional array refPicLN$_L$ of luma samples and two ordered two-dimensional arrays refPicLN$_{Cb}$ and refPicLN$_{Cr}$ of chroma samples is derived by invoking the process specified in clause 8.5.6.2 with X set equal to predListFlagN and refIdxX set equal to refIdxN as input.

The array predSamplesLN$_L$ is derived by invoking the fractional sample interpolation process specified in clause 8.5.6.3 with the luma location (xCb, yCb), the luma coding block width sbWidth set equal to cbWidth, the luma coding block height sbHeight set equal to cbHeight, the motion vector offset mvOffset set equal to (0, 0), the motion vector mvLX set equal to mvN and the reference array refPicLX$_L$ set equal to refPicLN$_L$, the variable bdofFlag set equal to FALSE, and the variable cIdx is set equal to 0 as inputs.

The array predSamplesLN$_{Cb}$ is derived by invoking the fractional sample interpolation process specified in clause 8.5.6.3 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cb}$ set equal to refPicLN$_{Cb}$, the variable bdofFlag set equal to FALSE, and the variable cIdx is set equal to 1 as inputs.

The array predSamplesLN$_{Cr}$ is derived by invoking the fractional sample interpolation process specified in clause 8.5.6.3 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cr}$ set equal to refPicLN$_{Cr}$, the variable bdofFlag set equal to FALSE, and the variable cIdx is set equal to 2 as inputs.

2. The partition angle and distance of the wedge merge mode angleIdx and distanceIdex are set according to the value of wedge_partition_idx[xCb][yCb] as specified in Table 8-10

3. The prediction samples inside the current luma coding block, predSamples$_L$[x$_L$][y$_L$] with x$_L$=0 . . . cbWidth−1 and y$_L$=0 . . . cbHeight−1, are derived by invoking the weighted sample prediction process for wedge merge mode specified in clause 8.5.7.2 with the coding block width nCbW set equal to cbWidth, the coding block height nCbH set equal to cbHeight, the sample arrays predSamplesLA$_L$ and predSamplesLB$_L$, and the variables angleIdx and distanceIdx, and cIdx equal to 0 as inputs.

4. The prediction samples inside the current chroma component Cb coding block, predSamples$_{Cb}$[x$_C$][y$_C$] with x$_C$=0 . . . cbWidth/SubWidthC−1 and y$_C$=0 . . . cbHeight/SubHeightC−1, are derived by invoking the weighted sample prediction process for wedge merge mode specified in clause 8.5.7.2 with the coding block width nCbW set equal to cbWidth/SubWidthC, the coding block height nCbH set equal to cbHeight/SubHeightC, the sample arrays predSamplesLA$_{Cb}$ and predSamplesLB$_{Cb}$, and the variables angleIdx and distanceIdx, and cIdx equal to 1 as inputs.

5. The prediction samples inside the current chroma component Cr coding block, predSamples$_{Cr}$[x$_C$][y$_C$] with x$_C$=0 . . . cbWidth/SubWidthC−1 and y$_C$=0 . . . cbHeight/SubHeightC−1, are derived by invoking the weighted sample prediction process for wedge merge mode specified in clause 8.5.7.2 with the coding block width nCbW set equal to cbWidth/SubWidthC, the coding block height nCbH set equal to cbHeight/SubHeightC, the sample arrays predSamplesLA$_{Cr}$ and predSamplesLB$_{Cr}$, and the variables angleIdx and distanceIdx, and cIdx equal to 2 as inputs.

6. The motion vector storing process for merge wedge mode specified in clause 8.5.7.3 is invoked with the luma coding block location (xCb, yCb), the luma coding block width cbWidth, the luma coding block height cbHeight, the partition direction angleIdx and distanceIdx, the luma motion vectors mvA and mvB, the reference indices refIdxA and refIdxB, and the prediction list flags predListFlagA and predListFlagB as inputs. The specification of the angleIdx and distanceIdx values based on the wedge_partition_idx value is shown in Table 8-10 as shown in FIG. 19.

Weighted Sample Prediction Process for Wedge Merge Mode

Inputs to this process are:

two variables nCbW and nCbH specifying the width and the height of the current coding block, two (nCbW)×(nCbH) arrays predSamplesLA and predSamplesLB, a variable angleIdx specifying the angle index of the wedge partition, a variable distanceIdx specizing the distance idx of the wedge partition, a variable cIdx specifying colour component index.

Output of this process is the (nCbW)×(nCbH) array pbSamples of prediction sample values.

The variable bitDepth is derived as follows:

If cIdx is equal to 0, bitDepth is set equal to BitDepth$_Y$.

If cIdx is equal to 0, nW and nH are set equal to nCbW and nCbH respectively, otherwise (cIdx is not equal to 0) nW and nH are set equal to nCbW×SubWidthC and nCbH×SubHeightC respectively.

If cIdx is equal to 0, subW and subH are both set 1, otherwise (cIdx is not equal to 0) subW and subH are set equal to SubWidthC and SubHeightC respectively.

Otherwise, bitDepth is set equal to BitDepth$_C$.

Variables shift1 and offset1 are derived as follows:

The variable shift1 is set equal to Max(5, 17−bitDepth).

The variable offset1 is set equal to 1<<(shift1−1).

The values of the following variables are set:

hwRatio is set to nH/nW displacementX is set to angleIdx displacementY is set to (displacementX+6)%24

If angleIdx>=10 && angleIdx<=20, PART1 and PART2 are set equal to A and B respectively, otherwise PART1 and PART2 are set equal to B and A respectively.

rho is set to the following value using the look-up tables denoted as Dis, specified in Table 8-12:

rho=(Dis[displacementX]<<8)+(Dis[displacementY]<<8)

If one of the following conditions is true, variable shiftHor is set equal to 0:

angleIdx % 12 is equal to 6 angleIdx % 12 is not equal to 0 and hwRatio≥1

Otherwise, shiftHor is set equal to 1.

If shiftHor is equal to 0, offsetX and offsetY are derived as follows:

offsetX=(256−nW)>>1 offsetY=(256−nH)>>1+angleIdx<12?
      (distanceIdx*nH)>>3:−((distanceIdx*nH)>>3)

Otherwise, if shiftHor is equal to 1, offsetX and offsetY are derived as follows:

offsetX=(256−nW)>>1+angleIdx<12?
(distanceIdx*nW)>>3:−((distanceIdx*nW)>>3)

offsetY=(256−nH)>>1

The prediction sample values pbSamples[x][y] with x=0 . . . nCbW−1 and y=0 . . . nCbH−1 is set according the following ordered steps:

The variable weightIdx and weightIdxAbs are calculated using the look-up table Table 8-12 as follows:

$$weightIdx = ((x*subW + offsetX) << 1) + 1) * Dis[displacementX] +$$
$$(((y*subH + offsetY) << 1) + 1)) * Dis[displacementY] - rho.$$

$$weightIdxAbs = Clip3(0, 26, abs(weightIdcx)).$$

The value of sampleWeight is derived according to according to Table 8-13 as follows:

sampleWeight=weightIdx<=0?WedgeFilter[weight-IdxAbs]:8−WedgeFilter[weightIdxAbs]

NOTE—The value of sample sampleWeight$_L$[x][y] can also be derived from sampleWeight$_L$[x-shiftX][y-shiftY]. If the angleIdx is larger than 4 and smaller than 12, or angleIdx is larger than 20 and smaller than 24, shiftX is the tangent of the split angle and shiftY is 1, otherwise shiftX is 1 of the split angle and shiftY is cotangent of the split angle. If tangent (resp. cotangent) value is infinity, shiftX is 1 (resp. 0) or shift Y is 0 (reps. 1).

The prediction sample value pbSamples[x][y] is derived as follows:

pbSamples[x][y]=Clip3(0,(1<<bitDepth)−1,(predSamplesLPART1 [x][y]*(8−sampleWeight)+ predSamplesLPART2[x][y]*sampleWeight+offset1)>> shift1)

TABLE 8-12

Look-up table Dis for derivation of wedgemetric partitioning distance.

| idx | 0 | 1 | 2 | 3 | 4 | 5 | 6 | 7 | 8 | 9 | 10 | 11 |
|---|---|---|---|---|---|---|---|---|---|---|---|---|
| Dis[idx] | 8 | 8 | 8 | 8 | 4 | 2 | 0 | −2 | −4 | −8 | −8 | −8 |
| idx | 12 | 13 | 14 | 15 | 16 | 17 | 18 | 19 | 20 | 21 | 22 | 23 |
| Dis[idx] | −8 | −8 | −8 | −8 | −4 | −2 | 0 | 2 | 4 | 8 | 8 | 8 |

TABLE 8-13

Filter weight look-up table WedgeFilter for derivation of wedge partitioning filter weights.

| idx | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| WedgeFilter[idx] | 4 | 4 | 4 | 4 | 5 | 5 | 5 | 5 | 5 | 5 | 5 | 6 | 6 | 6 |
| idx | 14 | 15 | 16 | 17 | 18 | 19 | 20 | 21 | 22 | 23 | 24 | 25 | 26 | |
| WedgeFilter[idx] | 6 | 6 | 6 | 6 | 7 | 7 | 7 | 7 | 7 | 7 | 7 | 7 | 8 | |

Motion Vector Storing Process for Wedge Merge Mode

This process is invoked when decoding a coding unit with MergeWedgeFlag[xCb][yCb] equal to 1.

Inputs to this process are:
a luma location (xCb, yCb) specifying the top-left sample of the current coding block relative to the top-left luma sample of the current picture,
a variable cbWidth specifying the width of the current coding block in luma samples,
a variable cbHeight specifying the height of the current coding block in luma samples,
the luma motion vectors in 1/16 fractional-sample accuracy mvA and mvB,
the reference indices refIdxA and refIdxB,
the prediction list flags predListFlagA and predListFlagB.

The variables numSbX and numSbY specifying the number of 4×4 blocks in the current coding block in horizontal and vertical direction are set equal to numSbX=cbWidth>>2 andnumSbY=cbHeight>>2.

The value of the following variables are set:
displacementX is set to angleIdx, displacementY is set to (displacementX+6)%24
hwRatio is set equal to nCbH/nCbW If one of the following conditions is true, variable shiftHor is set equal to 0:
angleIdx % 12 is equal to 8
angleIdx % 12 is not equal to 0 and hwRatio>1

Otherwise, shiftHor is set equal to 1.

partIdx is set to angleIdx>=10 && angleIdx<=20?1:0.

If shiftHor is equal to 0, offsetX and offsetY are derived as follows:

offsetX=(64−numSbX)>>1 offsetY=(64−numSbY)>>1+angleIdx<12?
(distanceIdx*nCbH)>>5: −((distanceIdx*nCbH)>>5)

Otherwise, if shiftHor is equal to 1, offsetX and offsetY are derived as follows:

offsetX=(64−numSbX)>>1+angleIdx<12?
(distanceIdx*nCbW)>>5: −((distanceIdx*nCbW)>>5)

offsetY=(64−numSbY)>>1

The value of the variable rho is derived according to the equation below and according to the Dis lookup table specified in Table 8-12:

rho=(Dis[displacementX]<<8)+(Dis[displacementY]>>8).

motionOffset is set equal to the following value using the look-up tables denoted as Dis, specified in Table 8-11 and Table 8-12:

motionOffset=3*Dis[displacementX]+3*Dis[displacementY].

For each 4×4 subblock at subblock index (xSbIdx, ySbIdx) with xSbIdx=0 . . . numSbX−1, and ySbIdx=0 . . . numSbY−1, the following applies:
The variable motionIdx is calculated using the look-up table Table 8-12 as following:

motionIdx=(((xSbIdx+offsetX)>>3)+1)*Dis[displacementX]+(((xSbIdx+offsetY)>>3)+1))*Dis[displacementY]−rho+motionOffset The variable sType is derived as follows:

sType=abs(motionIdx)<32?2:motionIdx<=0?partIdx:1−partIdx

Depending on the value of sType, the following assignments are made:
If sType is equal to 0, the following applies:

predFlagL0=(predListFlagA==0)?1:0 (8-853)

predFlagL1=(predListFlagA==0)?0:1 (8-854)

refIdxL0=(predListFlagA==0)?refIdxA:−1 (8-855)

refIdxL1=(predListFlagA==0)?−1:refIdxA (8-856)

mvL0[0]=(predListFlagA==0)?mvA[0]:0 (8-857)

mvL0[1]=(predListFlagA==0)?mvA[1]:0 (8-858)

mvL1[0]=(predListFlagA==0)?0:mvA[0] (8-859)

mvL1[1]=(predListFlagA==0)?0:mvA[1] (8-860)

Otherwise, if sType is equal to 1 or (sType is equal to 2 and predListFlagA+predListFlagB is not equal to 1), the following applies:

predFlagL0=(predListFlagB==0)?1:0 (8-861)

predFlagL1=(predListFlagB==0)?0:1 (8-862)

refIdxL0=(predListFlagB==0)?refIdxB:−1 (8-863)

refIdxL1=(predListFlagB==0)?−1:refIdxB (8-864)

mvL0[0]=(predListFlagB==0)?mvB[0]:0 (8-865)

mvL0[1]=(predListFlagB==0)?mvB[1]:0 (8-866)

mvL1[0]=(predListFlagB==0)?0:mvB[0] (8-867)

mvL1[1]=(predListFlagB==0)?0:mvB[1] (8-868)

Otherwise (sType is equal to 2 and predListFlagA+predListFlagB is equal to 1), the following applies:

predFlagL0=1 (8-869)

predFlagL1=1 (8-870)

refIdxL0=(predListFlagA==0)?refIdxA:refIdxB (8-871)

refIdxL1=(predListFlagA==0)?refIdxB:refIdxA (8-872)

mvL0[0]=(predListFlagA==0)?mvA[0]:mvB[0] (8-873)

mvL0[1]=(predListFlagA==0)?mvA[1]:mvB[1] (8-874)

mvL1[0]=(predListFlagA==0)?mvB[0]:mvA[0] (8-875)

mvL1[1]=(predListFlagA==0)?mvB[1]:mvA[1] (8-876)

The following assignments are made for x=0..3 and y=0..3:

MvL0[(xSbIdx<<2)+x][(ySbIdx<<2)+y]=mvL0 (8-877)

MvL1[(xSbIdx<<2)+x][(ySbIdx<<2)+y]=mvL1 (8-878)

RefIdxL0[(xSbIdx<<2)+x][(ySbIdx<<2)+y]=refIdxL0 (8-879)

RedIdxL1[(xSbIdx<<2)+x][(ySbIdx<<2)+y]=refIdxL1 (8-880)

PredFlagL0[(xSbIdx<<2)+x][(ySbIdx<<2)+y]=predFlagL0 (8-881)

PredFlagL1[(xSbIdx<<2)+x][(ySbIdx<<2)+y]=predFlagL1 (8-882)

Decoding Process for the Residual Signal of Coding Blocks Coded in Inter Prediction Mode
Inputs to this process are:
  a sample location (xTb0, yTb0) specifying the top-left sample of the current transform block relative to the top-left sample of the current picture,
  a variable nTbW specifying the width of the current transform block,
  a variable nTbH specifying the height of the current transform block,
  a variable cIdx specifying the colour component of the current block.
Output of this process is an (nTbW)×(nTbH) array resSamples.
The maximum transform block width maxTbWidth and height maxTbHeight are derived as follows:

maxTbWidth=(cIdx==0)?MaxTbSizeY:MaxTbSizeY/SubWidthC (8-883)

maxTbHeight=(cIdx==0)?MaxTbSizeY:MaxTbSizeY/SubHeightC (8-884)

The luma sample location is derived as follows:

(xTbY,yTbY)=(cIdx==0)?(xTb0,yTb0):(xTb0*SubWidthC,yTb0*SubHeightC) (8-885)

Depending on max TbSize, the following applies:
  If nTbW is greater than maxTbWidth or nTbH is greater than maxTbHeight, the following ordered steps apply.
    1. The variables newTbW and newTbH are derived as follows:

newTbW=(nTbW>maxTbWidth)?(nTbW/2):nTbW (8-886)

newTbH=(nTbH>maxTbHeight)?(nTbH/2):nTbH (8-887)

2. The decoding process for the residual signal of coding units coded in inter prediction mode as specified in this clause is invoked with the location (xTb0, yTb0), the transform block width nTbW set equal to newTbW and the height nTbH set equal to newTbH, and the variable cIdx as inputs, and the output is a modified reconstructed picture before in-loop filtering.
    3. When nTbW is greater than maxTbWidth, the decoding process for the residual signal of coding units coded in inter prediction mode as specified in this clause is invoked with the location (xTb0, yTb0) set equal to (xTb0+newTbW, yTb0), the transform block width nTbW set equal to newTbW and the height nTbH set equal to newTbH, and the variable cIdx as inputs, and the output is a modified reconstructed picture.
    4. When nTbH is greater than maxTbHeight, the decoding process for the residual signal of coding units coded in inter prediction mode as specified in this clause is invoked with the location (xTb0, yTb0) set equal to (xTb0, yTb0+newTbH), the transform block width nTbW set equal to newTbW and the height nTbH set equal to newTbH, and the variable cIdx as inputs, and the output is a modified reconstructed picture before in-loop filtering.

5. When nTbW is greater than maxTbWidth and nTbH is greater than maxTbHeight, the decoding process for the residual signal of coding units coded in inter prediction mode as specified in this clause is invoked with the location (xTb0, yTb0) set equal to (xTb0+newTbW, yTb0+newTbH), the transform block width nTbW set equal to newTbW and height nTbH set equal to newTbH, and the variable cIdx as inputs, and the output is a modified reconstructed picture before in-loop filtering.

Otherwise, if cu_sbt_flag is equal to 1, the following applies:

The variables sbtMinNumFourths, wPartIdx and hPartIdx are derived as follows:

sbtMinNumFourths=cu_sbt_quad_flag?1:2 (8-888)

wPartIdx=cu_sbt_horizontal_flag?4:sbtMinNum-
 Fourths (8-889)

hPartIdx=!cu_sbt_horizontal_flag?4:sbtMinNum-
 Fourths (8-890)

The variables xPartIdx and yPartIdx are derived as follows:

If cu_sbt_pos_flag is equal to 0, xPartIdx and yPartIdx are set equal to 0.

Otherwise (cu_sbt_pos_flag is equal to 1), the variables xPartIdx and yPartIdx are derived as follows:

xPartIdx=cu_sbt_horizontal_flag?0:(4-sbtMinNum-
 Fourths) (8-891)

yPartIdx=!cu_sbt_horizontal_flag?0:(4-sbtMinNum-
 Fourths) (8-892)

The variables xTbYSub, yTbYSub, xTb0Sub, yTb0 Sub, nTbWSub and nTbHSub are derived as follows:

xTbYSub=xTbY+(nTbW*((cIdx==0)?1:
 SubWidthC)*xPartIdx/4) (8-893)

yTbYSub=yTbY+(nTbH*((cIdx==0)?1:
 SubHeightC)*yPartIdx/4) (8-894)

xTb0Sub=xTb0+(nTbW*xPartIdx/4) (8-895)

yTb0Sub=yTb0+(nTbH*yPartIdx/4) (8-896)

nTbWSub=nTbW*wPartIdx/4 (8-897)

nTbHSub=nTbH*hPartIdx/4 (8-898)

The scaling and transformation process as specified in clause 8.7.2 is invoked with the luma location (xTbYSub, yTbYSub), the variable cIdx, nTbWSub and nTbHSub as inputs, and the output is an (nTbWSub)×(nTbHSub) array resSamplesTb.

The residual samples resSamples[x][y] with x=0 ... nTbW−1, y=0 ... nTbH−1 are set equal to 0.

The residual samples resSamples[x][y] with x=xTb0Sub ... xTb0Sub+nTbWSub−1, y= yTb0Sub ... yTb0Sub+nTbllSub−1 are derived as follows:

resSamples[x][y]=resSamplesTb[x−xT0Sub][y−
 yT0Sub] (8-899)

Otherwise, the scaling and transformation process as specified in clause 8.7.2 is invoked with the luma location (xTbY, yTbY), the variable cdx, the transform width nTbW and the transform height nTbH as inputs, and the output is an (nTbW)×(nTbH) array resSamples.

TABLE 9-77

| Syntax elements and associated binarizations | | | |
|---|---|---|---|
| Syntax structure | Syntax element | Process | Binarization Input parameters |
| merge_data( ) | regular_merge_flag[ ][ ] | FL | cMax = 1 |
| | mmvd_merge_flag[ ][ ] | FL | cMax = 1 |
| | mmvd_cand_flag[ ][ ] | FL | cMax = 1 |
| | mmvd_distance_idx[ ][ ] | TR | cMax = 7, cRiceParam = 0 |
| | mmvd_direction_idx[ ][ ] | FL | cMax = 3 |
| | ciip_flag[ ][ ] | FL | cMax = 1 |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | wedge_partition_idx[ ][ ] | TB | cMax = 82 |
| | merge_wedge_idx0[ ][ ] | TR | cMax = MaxNumWedgeMergeCand − 1, cRiceParam = 0 |
| | merge_wedge_idx1[ ][ ] | TR | cMax = MaxNumWedgeMergeCand − 2, cRiceParam = 0 |
| | merge_idx[ ][ ] | TR | cMax = MaxNumMergeCand − 1, cRiceParam = 0 |

2.5. Chroma Sample Location Type

Figure 12:
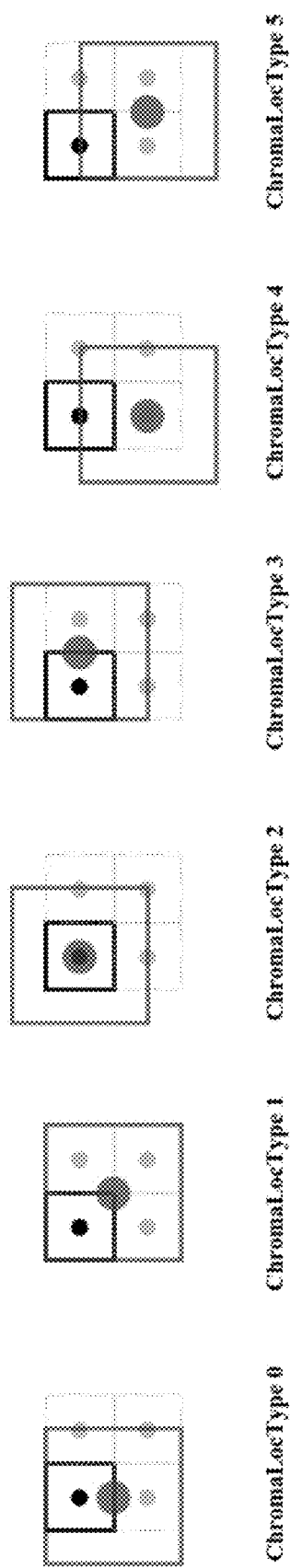
FIG. 12 shows example locations of the top-left chroma sample as a function of a ChromaLocType variable.

This paragraph of the definition of chroma sample location type is extracted from JVET-P2007-v3. FIG. 12 illustrates the indicated relative position of the top-left chroma sample when chroma_format_idc is equal to 1 (4:2:0 chroma format), and chroma_sample_loc_type_top_field or chroma_sample_loc_type_bottom_field is equal to the value of a variable ChromaLocType. The region represented by the top-left 4:2:0 chroma sample (depicted as a large red square with a large red dot at its centre) is shown relative to the region represented by the top-left luma sample (depicted as a small black square with a small black dot at its centre). The regions represented by neighbouring luma samples are depicted as small grey squares with small grey dots at their centres.

Drawbacks of Existing Implementations

There are several potential issues in the current design of GEO, which are described below.

(1) In the CE anchor of JVET-P0884, the total number of GEO modes for hardware validation is 1558, which is calculated from multiplying 19 PU shapes by 82 GEO modes. It is expressed by experts that the 1558 validation cases for the GEO coding tool is too much. It is desirable to reduce the total cases of GEO.

(2) In the CE anchor of JVET-P0884, the GEO mode is applied to block sizes no smaller than 8×8, that is W>=8 and H>=8.
  a) GEO mode may be not that necessary for large block sizes. A better tradeoff between the coding gain and complexity may be considered by reducing the allowable block sizes for GEO.
  b) The 4×N and N×4 block sizes may be beneficial for the coding gain.

Example Techniques and Embodiments

The detailed embodiments described below should be considered as examples to explain general concepts. These embodiments should not be interpreted narrowly way. Furthermore, these embodiments can be combined in any manner.

The term 'GEO' may represent a coding method that split one block into two or more sub-regions wherein at least one sub-region couldn't be generated by any of existing partitioning structure (e.g., QT/BT/TT). The term 'GEO' may indicate the triangle prediction mode (TPM), and/or geometric merge mode (GEO), and/or wedge prediction mode.

The term 'block' may represent a coding block of CU and/or PU and/or TU.

In some embodiments, the 'GEO mode index (or GEO mode)' may be the signaled GEO mode index in the coded bitstream. In some embodiments, the GEO mode index (or GEO mode) is used to derive the GEO angle index and GEO distance index in the decoding process of wedge inter blocks. In some embodiments, the GEO mode index (or GEO mode) for deriving the angle/distance index in the decoding process may also be obtained by table mapping. If not specified, the GEO mode index can mean the wedge_partition_idx that is used to derive the angle/distance index in the decoding process, such as which is defined in the Table 8-10 in the working draft of JVET-P0884-v8.

Block Size Restriction for GEO Mode

Denote the block width as W and the block height as H.

1. Whether GEO is allowed or not may be dependent on the block width and/or block height.
  a) Whether GEO is allowed or not may be dependent on the block size (such as W*H) and/or the aspect ratio of the block.
    i. For example, for a W×H block, GEO may only be enabled if W>=T1 and/or H>=T2 and/or W*H<T3 and/or W*H>T4, wherein T1, T2, T3 and T4 are constant values.
    ii. For another example, for a W×H block, GEO may only be enabled if W>=T1 and/or H>=T2 and/or W*H<=T3 and/or W*H>=T4, wherein T1, T2, T3 and T4 are constant values.
    iii. In one example, for a W×H block, GEO may only be enabled if W*H<T1||(W*H<=T2 && W/H<=T3 && H/W<=T4).
      1) In one example, T1, T2, T3 and T4 may refer to luma blocks.
      2) In one example, T1=512, T2=2048, T3=2, T4=2.
    iv. In one example, for a W×H block, GEO may only be enabled if W*H<T1||(W*H<=T2 && abs(log W−log H)<=T3).
      1) In one example, T1, T2, T3 and T4 may refer to luma blocks.
      2) In one example, T1=512, T2=2048, T3=1.
    v. In one example, for a W×H block, GEO may only be enabled if W*H<=T1 && W/H<=T2 &&H/W<=T3.
      1) In one example, T1, T2, T3 and T4 may refer to luma blocks.
      2) In one example, T1=2048, T2=2, T3=4.
    vi. In one example, for a W×H block, GEO may only be enabled if W>=Tx and H>=Ty and/or one of the above 1.a.i to 1.a.v are satisfied.
      1) In one example, Tx and Ty may refer to luma blocks.
      2) In one example, Tx=8, Ty=8.
    vii. GEO may be not allowed for blocks with block width larger than N or/and block height larger than M.
      1) In one example, N and M may refer to luma blocks.
      2) In one example, N=M=64.
      3) In one example, N=M=32.
    viii. GEO may be not allowed for blocks with block width equal to N or/and block height equal to M.
      1) In one example, N=M=4.
    ix. For example, for a W×H block, GEO may be not allowed if one and/or more than one conditions in below (1.a) to (1.f) are satisfied, where Ti(i=1 . . . 17) are constant values.
      1) The conditions (1.a) to (1.f) may be as follows.
        a) W<T1 and/or W>T2 and/or W=T3
        b) H<T4 and/or H>T5 and/or H=T6
        c) W*H<T7 and/or W*H>T8 and/or W*H=T8
        d) W/H<T9 and/or W/H>T10 and/or W/H=T11
        e) H/W<T12 and/or H/W>T13 and/or H/W=T14
        f) Abs(log W−log H)>T15 and/or Abs(log W−log H)<T16 and/or Abs(log W−log H)=T17
      2) Alternatively, GEO can only be allowed if one or more than one conditions in above (1.a) to (1.f) are satisfied.
      3) For example, for a W×H block, GEO may be not allowed if W<T1 or H<T2 or W*H>T3 or (W*H>=T4 and Abs(log W−log H)>T5).
        a) Alternatively, for a W×H block, GEO may only be allowed if W>=T1 and H>=T2 and (W*H<T4 or (W*H<=T3 and Abs(log W−log H)<=T5)).
        b) In one example, Ti(i=1 . . . 5) may refer to luma blocks.
        c) In one example, T1=8, T2=8, T3=2048, T4=512, T5=1
      4) For example, for a W×H block, GEO may be not allowed if W<T1 or H<T2 or W*H>T3 or (W*H>=T4 and (W/H>T5 or H/W>T5)).
        a) Alternatively, for a W×H block, GEO may only be allowed if W>=T1 and H>=T2 and (W*H<T4 or (W*H<=T3 and W/H<=T5 and H/W<=T5))
        b) In one example, Ti(i=1 . . . 5) may refer to luma blocks.
        c) In one example, T1=8, T2=8, T3=2048, T4=512, T5=2.
      5) For example, for a W×H block, GEO may be not allowed if W<T1 or H<T2 or W*H>T3 or H/W>T4 or W/H>T5.
        a) Alternatively, for a W×H block, GEO may only be allowed if W>=T1 and H>=T2 and W*H<=T3 and H/W<=T4 and W/H<=T5.
        b) In one example, Ti (i=1 . . . 5) may refer to luma blocks.
        c) In one example, T1=8, T2=8, T3=2048, T4=4, T5=2.

b) Whether to enable or disable GEO may depend on a function of block width and height.
   i. For example, the function may depend on the ratios of block width and/or height. For example, the function may be max(H,W)/min(H, W).
   ii. For example, the function may be the differences and/or ratios between block width and height, e.g., Abs(Log 2(cbWidth)−Log 2(cbHeight)) wherein Abs(x) returns the absolute value of x and Log 2(x) returns the log base 2 of a number x.
c) GEO may be not allowed for blocks with width to height ratio or height to width ratio greater than (in another example, no less than) X (e.g., X=2).
   i. In one example, for a W×H block, GEO may be disabled if W/H>X (e.g., X=2).
   ii. In one example, for a W×H block, GEO may be disabled if H/W>X (e.g., X=2).
d) In one example, GEO may be enabled for one color component (e.g., luma block) but disabled for another color component (e.g., chroma block) in the same coding unit/prediction unit/block
e) In one example, for one coding unit/prediction unit/block, whether to allow/disallow GEO may be dependent on the luma block's dimension.
   i. In one example, when GEO is disallowed for the luma block, it is also disabled for a chroma block.
   ii. In one example, when GEO is allowed for the luma block, it is also allowed for a chroma block.
f) Whether GEO is enabled or not may be dependent on the block width and/or block height and/or block width-to-height ratio and/or block height-to-width ratio.
   i. For example, for a W×H block, GEO may be only allowed when W>=T1 and H>=T2 and W<=T3 and H<=T4 and W/H<=T5 and H/W<=T6.
      1) In one example, T1=T2=8, T3=T4=64, T5=2, T6=4.
      2) In one example, T1=T2=8, T3=T4=64, T5=T6=4.
      3) In one example, T1=T2=8, T3=T4=32, T5=2, T6=4.
      4) In one example, T1=T2=8, T3=T4=32, T5=T6=4.
   ii. For example, for a W×H block, GEO may be only allowed when W>=T1 and H>=T2 and W<=T3 and H<=T4.
      1) In one example, T1=T2=8, T3=T4=64.
      2) In one example, T1=T2=8, T3=T4=32.
   iii. Alternatively, for a W×H block, GEO may be disabled when W<T1 or H<T2 or W>T3 or H>T4 or W/H>T5 or H/W>T6.
      1) In one example, T1=T2=8, T3=T4=64, T5=2, T6=4.
      2) In one example, T1=T2=8, T3=T4=64, T5=T6=4.
      3) In one example, T1=T2=8, T3=T4=32, T5=2, T6=4.
      4) In one example, T1=T2=8, T3=T4=32, T5=T6=4.
   iv. Alternatively, for a W×H block, GEO may be disabled when W<T1 or H<T2 or W>T3 or H>T4.
      1) In one example, T1=T2=8, T3=T4=64.
      2) In one example, T1=T2=8, T3=T4=32.
2. Whether GEO is allowed or not for a block may be dependent on the maximum transform size.
   a) In one example, GEO may be not allowed for a block with width or/and height larger than the maximum transform size.
3. Whether GEO is allowed or not for a block may be dependent on the maximum allowed CU size.
   a) In one example, GEO may be not allowed for a block with block width or/and height equal to the maximum CU size.
4. GEO may be not allowed for a certain chroma format.
   a) In one example, GEO may be not allowed for 4:0:0 chroma format.
   b) In one example, GEO may be not allowed for 4:4:4 chroma format.
   c) In one example, GEO may be not allowed for 4:2:2 chroma format.
   d) In one example, GEO may be not allowed for a certain color component (such as Cb or Cr) with a certain chroma format.
5. GEO and coding tool X may be mutually exclusive.
   a) In one example, if GEO is applied to the block, the coding tool X is disabled.
      i. Alternatively, furthermore, signaling of indication of usage of the coding tool X and/or side information of the coding tool X is skipped when GEO is applied.
      ii. Alternatively, when coding tool X is applied to a block, GEO is not applied.
         1) Alternatively, furthermore, signaling of indication of usage of GEO and/or side information of GEO is skipped when X is applied.
   b) In one example, X may refer to as adaptive color transform.
   c) In one example, X may refer to as dual tree coding mode.
   d) In one example, X may refer to as transform skip mode.
   e) In one example, X may refer to as BDPCM coding mode.
   f) In one example, X may be Sub-Block Transform (SBT).
6. Different color components may have different GEO mode index.
   a) In one example, chroma components may have a different GEO index of luma component.
   b) In one example, GEO may be not applied to chroma components.
   c) Alternatively, furthermore, different GEO mode indices may be signaled for different color components.
      i. For example, a mode index may be signaled for the luma component and a mode index may be signaled for the chroma components.
      ii. Alternatively, furthermore, mode index of a first color component may be predicted from mode index of a second color component.
7. GEO may be not allowed if the resolutions of reference pictures associated with different sub-regions in GEO are different.
   a) Alternatively, GEO may be not allowed if the resolution of one reference pictures used in GEO is different to the resolution of the current picture.
   b) Alternatively, GEO may be allowed even when the resolution of reference picture and the current picture are different.
   c) The resolution of a picture may refer to the width/height of the picture, or it may refer to a window in the picture, such as a conformance window or a scaling window in the picture.
8. When GEO is disabled or not allowed, the GEO syntax elements (such as wedge_partition_idx, merge_wedge_idx0, and merge_wedge_idx1 in the syntax table of merge data signalling) may be not signaled.
   a) When a syntax element is not signaled, it may be inferred to be a default value such as 0.
   b) When GEO is disabled or not allowed, the GEO related semantic variables (such as wedge_merge_mode) may be inferred to be a default value such as 0.

Block Size Dependent GEO Mode Selection

9. One or more syntax elements (e.g., flag) may be signaled in sequence/picture/slice/tile/brick/subpicture/other video processing unit (e.g., a VPDU) level to specify how many GEO modes are allowed for the video unit (e.g., sequence/group of pictures/picture/subpicture/slice/tile/VPDU/CTU row/CTU/CU/PU/TU).
   a) In one example, they may be signaled in SPS/VPS/APS/PPS/PH/SH/picture/subpicture/slice/tile level.
      i. Alternatively, furthermore, the syntax elements may be conditionally signaled, such as whether the GEO mode is enabled for a video processing unit (such as whether sps_geo_enabled_flag is equal to 1); and/or whether current picture type is non-Intra or B picture; and/or whether current slice type is B slice.
   b) In one example, the syntax element may indicate whether the number of allowed GEO modes in the video processing unit is equal to X (such asX=16 or 32 or 30) or not.
      i. In one example, one syntax element (e.g., one SPS flag, or one PPS flag, or one flag in picture header) may be signaled for indicating whether X (such as X=16 or 32 or 30) GEO modes are allowed for all blocks in the video unit.
         1) Alternatively, the one flag may be signaled for indicating whether X (such as X=16 or 32 or 30) GEO modes are allowed for selective blocks, such as for those with condition C satisfied.
            a) C may be illustrated as: blocks with H/W<=T (e.g., T=1 or 2 or 4 or 8).
            b) C may be illustrated as: blocks with H/W>T (e.g., T=1 or 2 or 4 or 8).
      ii. In one example, multiple syntax elements (e.g., two SPS flags) may be signaled to indicate the allowed GEO modes for each category of blocks wherein blocks are classified to multiple categories, such as according to block dimension.
         1) In one example, one is for indicating whether X (such as X=16 or 32 or 30) GEO modes are allowed for blocks with condition C. The other is for indicating whether Y (such as Y=16 or 32 or 30) GEO modes are allowed for blocks with condition D.
            a) Alternatively, furthermore, C may be blocks with H/W<=T (e.g., T=1 or 2 or 4 or 8), while D may be blocks with H/W>T (e.g., T=1 or 2 or 4 or 8).
   c) In one example, how to signal the GEO mode index for a block may be dependent on the afore-mentioned syntax elements (e.g., flag).
      i. In one example, the binarization and/or entropy coding of the GEO mode index for a block may be dependent on the syntax element and/or the block dimensions.
         1) In one example, if the number of allowed GEO modes for a block derived by the syntax element is equal to X (such as X=16 or 32 or 30), then the value of cMax for GEO mode index coding may be equal to X.
         2) In one example, if the number of allowed GEO modes for a block derived by syntax element is equal to X (such as X=16 or 32 or 30), and the block dimensions satisfy the condition C, then the value of cMax for GEO mode index coding may be equal to X.
            a) C may be illustrated as: blocks with H/W<=T (e.g., T=1 or 2 or 4 or 8).
            b) C may be illustrated as: blocks with H/W>T (e.g., T=1 or 2 or 4 or 8).
      ii. In one example, the binarization methods for GEO mode index coding may be different according to the block dimensions and/or the syntax element.
   d) In one example, the value of maximum value of merge_geo_partition_idx (e.g., wedge_partition_idx) may be dependent on the afore-mentioned syntax elements (e.g., flag) and/or the block dimensions.
      i. In one example, a bitstream constraint may be added to constrain the value the merge_geo_partition_idx (e.g., wedge_partition_idx) should be less than the maximum allowed GEO mode in the bitstream.
      ii. In one example, a bitstream constraint may be added to constrain the value the merge_geo_partition_idx (e.g., wedge_partition_idx) should be less than the maximum allowed GEO mode for blocks with block dimensions satisfy the condition C.
         a) C may be illustrated as: blocks with H/W<=T (e.g., T=1 or 2 or 4 or 8).
         b) C may be illustrated as: blocks with H/W>T (e.g., T=1 or 2 or 4 or 8).
   e) In one example, one or more constraint flags may be signaled in a video processing unit level to specify whether to constrain the usage of the X (such as X=16 or 32 or 30) modes GEO method for the video unit.
      1) In one example, a constraint flag may be signaled to constrain whether X modes GEO method is used for all blocks in a sequence.
      2) In one example, how to constrain X modes GEO method may be dependent on the block dimensions.
         a) In one example, a constraint flag may be signaled in SPS level to constrain whether X modes GEO method is used for blocks with condition C.
            i. C may be illustrated as: blocks with H/W<=T (e.g., T=1 or 2 or 4 or 8).
            ii. C may be illustrated as: blocks with H/W>T (e.g., T=1 or 2 or 4 or 8).
         b) In one example, two constraint flags may be signaled in SPS level. One is to constrain whether X modes GEO method is used for blocks with condition C. The other is to constrain whether Y modes GEO method is used for blocks with condition D.
            i. C may be blocks with H/W<=T (e.g., T=1 or 2 or 4 or 8), while D may be blocks with H/W>T (e.g., T=1 or 2 or 4 or 8).
   f) In one example, which GEO modes are allowed for a block may be dependent on the afore-mentioned syntax elements (e.g., flag).
      i. In one example, whether a subset of GEO modes or a full set of GEO modes are allowed for a block may be dependent may be on the afore-mentioned syntax elements (e.g., flag).
      ii. In one example, whether a subset of GEO angles or a full set of GEO angles are allowed for a block may be dependent may be on the afore-mentioned syntax elements (e.g., flag).
      iii. In one example, whether a subset of GEO displacements or a full set of GEO displacements are allowed for a block may be dependent on the afore-mentioned syntax elements (e.g., flag).
         1) In one example, whether the GEO modes with non-zero displacement indexes are used or not may be dependent on the afore-mentioned syntax elements (e.g., flag).

10. Multiple sets of allowed GEO modes may be utilized for processing a video unit (e.g., a picture/slice/tile/brick/CTU row/CTU).
    a) In one example, selection of a set from the multiple sets may be dependent on decoded information (e.g, block dimension/block shape of a block).

b) In one example, at least two sets among the multiple sets are with different numbers of allowed GEO modes.

c) In one example, T (such as T=2) sets among the multiple sets may be with the same number of allowed GEO modes, however, at least one GEO mode included in one set is excluded in another set.

d) In one example, T (such as T=2) sets among the multiple sets may be with the same GEO modes, however, at least one GEO mode is arranged in a different position for any two of the T sets.

e) In one example, how to signal a GEO mode index may depend on the corresponding set of allowed GEO modes, such as the number of allowed GEO modes in the set.

f) In one example, the decoded GEO mode index may be corresponding to different GEO mode (e.g., different angles or different distances).
   i. In one example, how to map the decoded GEO mode index to a GEO mode may depend on the corresponding set of a block.

g) In one example, the number of GEO modes that can be used for a block in the bitstream may be defined as a number (denoted as B) which may be smaller than A (e.g., A=81 as in the decoding process of the working draft of JVET-P0884-v8).
   a. For example, B may be a constant value for any GEO block regardless of block dimensions.
   b. For example, B may be a variable that may be changed from different blocks depending on the block dimensions.

h) In one example, the number of GEO modes that can be signaled for a block in the bitstream may be defined as a number (denoted as C) which may be smaller than A.
   c. For example, C may be a constant value for any GEO block regardless of block dimensions.
   d. For example, C may be a variable that may be changed from different blocks depending on the block dimensions.
   e. For example, B may be equal to C.
   f. For example, B or C may be equal to 30 or 40 or 45 or 50.

i) In one example, B or C may be signaled from the encoder to the decoder.

j) In one example, two sets (e.g., set A and set B) of allowed GEO modes may be defined for processing GEO-coded blocks.
   i. In one example, at least one GEO mode included in set A may be excluded in set B.
      1) In one example, at least one GEO angle derived from the GEO modes in set A may be excluded in GEO angles derived from the GEO modes in set B.
   ii. In one example, set A and set B may be with same number of allowed GEO modes, e.g., X (such as X=16 or 32 or 30) modes are used for either set.
      1) In one example, set A and set B may be with same number of allowed GEO angles, e.g., Y (such as Y<24) angles are used for either set.
      1) In one example, set A and set B may be with different number of allowed GEO modes, e.g., X1 (such as X1=16) modes used for set A, while X2 (such as X2=32) modes used for set B. In one example, set A and set B may be with different number of allowed GEO angles, e.g., Y1 angles used for set A, while Y2 angles used for set B, such as Y1≠Y2, Y1<24, Y2<24.
   iii. In one example, whether a block uses GEO modes/angles/distances from set A or set B may be dependent on block dimensions, such as whether the block dimension satisfies condition C. 1) C may be illustrated as: blocks with H/W<=T (e.g., T=1 or 2 or 4 or 8). 2) C may be illustrated as: blocks with H/W>T (e.g., T=1 or 2 or 4 or 8).
   iv. In one example, how to signal the GEO mode index for a block may be dependent on the block dimensions.
      1) In one example, the cMax value for TR coding for GEO mode index may be equal to X (such as X=16 or 32 or 30), given that the H/W<=T (e.g., T=1 or 2 or 4 or 8).

v. Suppose I denotes the total number of GEO mode sets, $Set_i$ (i=0 ... I-1) denotes the GEO mode set used for a block, $L_i$ (i=0 ... I-1) denotes the length of $Set_i$. In one example, the GEO-coded block may be classified into multiple block categories, according to decoded information (e.g., related syntax elements, block dimensions).
   1) In one example, which GEO mode set is used for a block may be dependent on the block categories, and/or syntax elements (such as the flag described in bullet 9).
   2) In one example, how many GEO modes allowed for a block may be dependent on the block categories, and/or syntax elements (such as the flag described in bullet 9).
   3) Suppose the corresponding GEO mode set for a block is denoted as GEO mode set i (e.g., $Set_i$)
      a) In one example, the number of allowable GEO modes for this block may be less than the length of $Set_i$, that is, less than $L_i$.
      b) In one example, the number of allowable GEO modes for this block may be equal to the length of $Set_i$, that is, equal to $L_i$.
      c) In one example, all allowable GEO modes for this block may be from the corresponding GEO mode set i (e.g., $Set_i$).
      d) In one example, a part of GEO modes allowed for this block may be from the corresponding GEO mode set i (e.g., $Set_i$).
      e) In one example, the allowable GEO modes for this block may include at least N (such as N<$L_i$) modes in the corresponding GEO mode set (e.g., $Set_i$).
         i. In one example, the first N (such as N=16 or 14) modes in the corresponding GEO mode set may be used.
         ii. In one example, the last N (such as N=16 or 14) modes in the corresponding GEO mode set may be used.
         iii. In one example, one out of every M (such as M=2) modes in the corresponding GEO mode set may be used.
      f) In one example, the allowable GEO modes for this block may consist of some modes in the corresponding GEO mode set and some other predefined GEO modes (such as the GEO modes with zero displacement, e.g., distance index is equal to 0).

11. How to map the GEO mode index to angle/distance index may be dependent on the decoded information (e.g., related syntax elements, block dimensions).
   a) In one example, how to map the GEO mode index to angle/distance index may be dependent on whether the block dimension satisfies condition C.
      i. C may be illustrated as: blocks with H/W<=T (e.g., T=1 or 2 or 4 or 8).
      ii. C may be illustrated as: blocks with H/W>T (e.g., T=1 or 2 or 4 or 8).
   b) Suppose I denotes the total number of allowed GEO modes for a block, J denotes the total number of allowed GEO angles for a block, K denotes the total number of allowed GEO distances for a block, $M_i$ (i= 0 . . . 1-1) denotes the coded/signaled GEO mode index for a block, $A_j$ (j=0 . . . J-1) denotes the mapped angle index for a block, $D_k$ (k=0 . . . K-1) denotes the distance index for a block.
      i. In one example, the mapped angle index $A_j$ may not rise with the value of GEO mode index $M_i$.
         1) In one example, for multiple consecutive coded/signaled GEO mode indexes $M_i$, the corresponding angle indexes $A_j$ may be not consecutive numbers, and/or not in descending order, and/or not in ascending order, and/or out-of-order.
         2) Alternatively, for multiple consecutive coded/signaled GEO mode indexes, the corresponding angle indexes $A_j$ may be consecutive numbers, and/or in descending order, and/or in ascending order.
      ii. In one example, the mapped distance index $D_k$ may not rise with the value of GEO mode index $M_i$.
         1) In one example, for multiple consecutive coded/signaled GEO mode indexes $M_i$, the corresponding distance indexes $D_k$ may be not consecutive numbers, and/or not in descending order, and/or not in ascending order, and/or out-of-order.
         2) Alternatively, for multiple consecutive coded/signaled GEO mode indexes, the corresponding distance indexes $D_k$ may be consecutive numbers, and/or in descending order, and/or in ascending order.
      iii. In one example, if the coded/signaled GEO mode index is mapped to another set of mapped GEO mode index, the mapped GEO mode index may not rise with the coded/signaled GEO mode index.
         1) In one example, for multiple consecutive coded/signaled GEO mode indexes, the corresponding mapped GEO mode indexes may be not consecutive numbers, and/or not in descending order, and/or not in ascending order, and/or out-of-order.
         2) Alternatively, for multiple consecutive coded/signaled GEO mode indexes, the corresponding mapped GEO mode indexes may be consecutive numbers, and/or in descending order, and/or in ascending order.
12. The number of allowed modes/angles/distances for a GEO block may be different from the number of probable GEO modes/angles/distances for a video unit.
   a) In one example, the maximum GEO mode index signaled for a block may be smaller than the total number of allowed GEO modes for a sequence.
   b) In one example, the number of GEO angles allowed for a block may be smaller than the total number of allowed GEO angles defined for a sequence.
   c) In one example, how many numbers of GEO modes/angles/distances allowed for a block may be dependent on the block dimensions (such as W or H or W/H or H/W).
13. The number of the GEO modes for different block dimensions (such as block height and/or block width) that can be signaled or used in the bitstream may be different. The total number of the GEO modes that may be used for deriving the angle/distance indexes as defined in JVET-P0884-v8 in the decoding process is denoted as A. The number of GEO modes that can be used for a block in the bitstream may be defined as a number, denoted as B. The number of GEO modes that can be signaled for a block in the bitstream may be defined as a number, denoted as C.
   a) In one example, B or C may be different from A.
      i. For example, B may be equal to C.
      ii. For example, B and C may be smaller than A.
   b) In one example, B or C may be defined to be different for different block categories.
      1) In one example, the block category may be classified by the ratios of block width and height.
         a. In one example, for a W×H block, B or C may be smaller than A if W/H=1 and/or 2 and/or 3 and/or 4 and/or 8.
         b. In one example, for a W×H block, B or C may be smaller than A if H/W=1 and/or 2 and/or 3 and/or 4 and/or 8.
      2) In one example, the block category may be classified by a function of block width and height, such as the block size, equal to W*H.
         a. In one example, for a W×H block, B or C may be smaller than A if W*H>T (such as T=512/1024/2048/4096).
         b. In one example, for a W×H block, B or C may be smaller than A if W*H<=T (such as T=512/1024/2048/4096).
      3) In one example, the block category may be classified by the block dimensions, e.g., W and/or H.
         a. In one example, for a W×H block, B or C may be smaller than A if W=T1 and/or H=T2 (wherein T1 and T2 are constant values).
         b. In one example, for a W×H block, B or C may be smaller than A if W>T1 and/or H>T2 (wherein T1 and T2 are constant values).
         c. In one example, for a W×H block, B or C may be smaller than A if W<T1 and/or H<T2 (wherein T1 and T2 are constant values).
      4) In one example, a set of fixed numbers $B_i$ (i=0 . . . N-1 wherein N denotes the number of block categories as defined in the above bullets) may be defined for B or C for a block category i.
         a. In one example, $B_0$ is equal to 40 or 45 or 50 for block Category 0 with block width smaller than 32 and block height smaller than 32. $B_1$ is equal to 20 or 30 or 40 block Category 1 with block width equal to 32 and block height equal to 32. $B_2$ is equal to 20 or 30 for block Category 2 with block width larger than 32 and block height larger than 32.
      5) B or C for each block category may be signaled from the encoder to the decoder.
         a. Alternatively, B or C for each block category may be predefined for the encoder and the decoder.
      6) In one example, the width and height of luma block may be used for deriving B or/and C.

14. The value of the GEO modes index signaled in the bitstream may be different from the value of the GEO mode index that is used for deriving the angle/distance index in the decoding process.
   a) In one example, a subset of GEO modes/angles/distances regarding the full set of GEO modes/angles/distances (e.g., the full set of GEO modes is defined in Table 8-10 in the working draft of JVET-P0884) may be used for a certain block category, wherein the block category may be classified by block width and/or block height, as elaborated in the above bullets.
   b) In one example, a mapping table (e.g. look-up-table) may be used to define the corresponding relationship between the signaled GEO mode index and the mapped GEO mode index (e.g., the mapped GEO mode may be used for deriving the angle index and distance indexes, such as the wedge_partition_idx in the Table 8-10 of the decoding process provided by the working draft of JVET-P0884).
   c) In one example, N mapping tables (N>1) may be defined, depending on the GEO block categories. For example, N is a constant which may be smaller than 19.
      a. In one example, the number of mapping tables may be dependent on the number of block categories.
      b. The length of those mapping tables may be different for different block categories, according to the number of GEO modes allowed for different block categories.
   d) One or more mapping tables as defined above may be signaled from the encoder to the decoder.
      a. Alternatively, the mapping tables may be predefined for the encoder and the decoder.
15. The binarization for the signalled GEO mode index may be dependent on the decoded information (e.g., block dimensions/categories).
   a) In one example, the value of maximum value (denoted as cMax) during the binarization of the signalled wedge mode index may be dependent on the block dimensions (such as the block width and/or the block height), or the block categories (as elaborated in the above bullets).
   b) In one example, if the block size satisfies the condition C, then the value of cMax for GEO mode index coding may be equal to X (such as X=16 or 32 or 30).
      i. C may be illustrated as: blocks with H/W<=T (e.g., T=1 or 2 or 4 or 8).
      ii. C may be illustrated as: blocks with H/W>T (e.g., T=1 or 2 or 4 or 8).
16. The GEO mode index may be coded with truncated rice, or truncated binary, or truncated unary, or fixed-length, or k-th order Exp-Goblomb, or limited k-th order exp-golomb binarization.
   a) Truncated binary code may be used for the binarization for the signalled GEO mode index.
      i. In one example, the signalled GEO mode index in the bitstream may be different from the derived GEO mode index that is used for deriving the angle/distance indexes as defined in JVET-P0884-v8 in the decoding process.
   b) $K^{th}$-EG coding may be used for the binarization for the signalled GEO mode index.
      i. In one example, K=0 or 1 or 2 or 3.
17. Context coding may be used to code the GEO mode index.
   a) In one example, the first X (such as X=1) bins of the GEO mode index may be coded by context coding. And other bins may be coded by by-pass coding without context modeling.

Blending Weights and Motion Storage Weights Generation

18. The blending weights and/or motion storage weights for chroma components in TPM and/or GEO mode may depend on the chroma sample location type (e.g., ChromaLocType in FIG. 12.)
   a) The type of downsampling filter used for blending weights derivation for chroma samples may be signalled at video unit level (such as SPS/NPS/PPS/Picture header/Subpicture/Slice/Slice header/Tile/Brick/CTU/VPDU level).
      a. In one example, a high-level flag may be signaled to switch between different chroma location types of content.
         i. In one example, a high-level flag may be signaled to switch between chroma location type 0 and chroma location type 2.
         ii. In one example, a flag may be signaled for specifying whether the top-left downsampled luma weights in TPM/GEO prediction mode is collocated with the top-left luma weights (i.e., chroma sample location type 0).
         iii. In one example, a flag may be signaled for specifying whether the top-left downsampled luma sample in TPM/GEO prediction mode is horizontally co-sited with the top-left luma sample but vertically shifted by 0.5 units of luma samples relatively to the top-left luma sample (i.e., chroma sample location type 2).
      b. In one example, the type of downsampling filter may be signaled for 4:2:0 chroma format and/or 4:2:2 chroma format.
      c. In one example, a flag may be signaled for specifying the type of chroma downsampling filter used for TPM/GEO prediction.
         i. In one example, the flag may be signaled for whether to use downsampling filter A or downsampling filter B for the chroma weights derivation in TPM/GEO prediction mode.
   b) The type of downsampling filter used for blending weights derivation for chroma samples may be derived at video unit level (such as SP/SNPS/PPS/Picture header/Subpicture/Slice/Slice header/Tile/Brick/CTU/PDU level).
      a. In one example, a look up table may be defined to specify the correspondence relationship between the chroma subsampling filter type and the chroma format types of content.
   c) A specified downsampling filter may be used for TPM/GEO prediction mode in case of different chroma location types.
      a. In one example, chroma weights of TPM/GEO may be subsampled from the collocated top-left luma weights in case of a certain chroma sample location type (e.g., chroma sample location type 0).
      b. In one example, in case of a certain chroma sample location type (e.g., chroma sample location type 0 or 2), a specified X-tap filter (X is a constant such as X=6 or 5) may be used for chroma weights subsampling in TPM/GEO prediction mode.

Reduced GEO Angles/Distances

19. The number of angles for a GEO block may be less than T1 (such as T1=24). Suppose the number of angles used in the decoding process is denoted as NUM_ANGLE.
   a) Alternatively, the number of GEO modes may be less than T2 (such as T2=82).
      i. In one example, the mapping of angleIdx and distanceIdx from wedge_partition_idx may be dependent on how many angles supported for GEO mode and/or how many distances supported for each angle.

b) Alternatively, the number of distances for a GEO block may be less than T3 (such as T3=4 or 3).
  i. In one example, the number of distances for one or more angles may be less than T3.
    1) For example, the number of distances for vertical and horizontal angles may be equal to X (such as X=2)

c) In one example, the number of angles, NUM_ANGLE, used in the decoding process may be equal to the max angleIdx plus 1.
  i. For example, NUM_ANGLE=24, such as the max angleIdx defined in Table 8-10 in the working draft of JVET-P0884 is equal to 23.
  ii. For another example, NUM_ANGLE<T1 (such as T1=24).

d) In one example, the calculation of displacementY, that is used in the processes of weighted sample prediction and/or motion vector storing for a GEO mode coded block, may be dependent on the total number of angles used in the decoding process.
  i. In one example, displacementY may be set to (displacementX+(NUM_ANGLE>>2)) % NUM_ANGLE.

e) In one example, the calculation of shiftHor, that is used in the processes of weighted sample prediction and/or motion vector storing for a GEO mode coded block, may be dependent on the total number of angles used in the decoding process.
  i. In one example, shiftHor may be set to 0 is one of the following conditions is true. Otherwise, shiftHor is set equal to 1.
    1) angleIdx % (NUM_ANGLE/2) is equal to (NUM_ANGLE>>2)
    2) angleIdx % (NUM_ANGLE/2) is not equal to 0 and hwRatio≥1, wherein hwRatio is set to H/W.

f) In one example, the derivation of offsetX and/or offsetY for deriving the blending weight index of a GEO block may be dependent on the number of angles and/or the value of shiftHor.
  i. In one example, if shiftHor is equal to 0, offsetY for deriving the blending weight index of a GEO block may be derived as follows:
    1) offsetY=(256−nH)>>1+angleIdx<(NUM_ANGLE/2)? (distanceIdx*nH)>>3: −((distanceIdx*nH)>>3)
  ii. In one example, if shiftHor is equal to 1, offsetX for deriving the blending weight index of a GEO block may be derived as follows:
    1) offsetX=(256−nW)>>1+angleIdx<(NUM_ANGLE/2)? (distanceIdx*nW)>>3: −((distanceIdx*nW)>>3)

g) In one example, the derivation of offsetX and/or offsetY for deriving the motion index of a GEO block may be dependent on the number of angles and/or the value of shiftHor.
  i. In one example, if shiftHor is equal to 0, offsetY for deriving the motion index of a GEO block may be derived as follows:
    1) offsetY=(64−numSbY)>>1+angleIdx<(NUM_ANGLE/2)? (distanceIdx*nCbH)>>5: −((distanceIdx*nCbH)>>5)
  ii. In one example, if shiftHor is equal to 1, offsetX for deriving the motion index of a GEO block may be derived as follows:
    1) offsetX=(64−numSbX)>>1+angleIdx<(NUM_ANGLE/2)? (distanceIdx*nCbW)>>5: −((distanceIdx*nCbW)>>5)

h) In one example, the length of the look-up table for derivation of GEO partitioning distance may be dependent on the number of angles used in the GEO block decoding process.
  i. In one example, the length of the look-up table for derivation of GEO partitioning distance, as illustrated in Table 8-12 in the working draft of JVET-P0884, may be equal to NUM_ANGLE.
    1) In one example, NUM_ANGLE<24.

i) In one example, the values of the look-up table for derivation of GEO partitioning distance may be re-designed and with the length equal to NUM_ANGLE.
  1) In one example, the re-designed look-up-table may be a subset of the Table 8-12 in the working draft of JVET-P0884.
  2) In one example, the table may be designed as below in case of NUM_ANGLE=20.

| idx | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Dis[idx] | 8 | 8 | 8 | 4 | 2 | −2 | −4 | −8 | −8 | −8 | −8 | −8 | −8 | −4 | −2 | 2 | 4 | 8 | 8 | 8 |

| idx | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Dis[idx] | 8 | 8 | 8 | 4 | 2 | 0 | −2 | −4 | −8 | −8 | −8 | −8 | −8 | −4 | −2 | 0 | 2 | 4 | 8 | 8 |

| idx | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Dis[idx] | 8 | 8 | 8 | 8 | 2 | 0 | −2 | −8 | −8 | −8 | −8 | −8 | −8 | −8 | −2 | 0 | 2 | 8 | 8 | 8 |

| idx | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Dis[idx] | 8 | 8 | 8 | 8 | 4 | 0 | −4 | −8 | −8 | −8 | −8 | −8 | −8 | −8 | −4 | 0 | 4 | 8 | 8 | 8 |

| idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Dis[idx] | 8 | 8 | 4 | 2 | 0 | −2 | −4 | −8 | −8 | −8 | −4 | −2 | 0 | 2 | 4 | 8 | j) In one example, whether PART1 and PART2 are equal to A or B, used for weighted sample prediction process for GEO mode, may be dependent on angle index T1 and angle index T2, wherein A and B indicate the two input arrays predSamplesLA and predSamplesLB for weighted sample prediction process for GEO mode, and PART1 and PART2 are the representations of A and B for the derivation of the output weighted prediction sample values of a GEO predicted block.
  i. In one example, if angleIdx>=T1 && angleIdx<=T2, PART1 and PART2 may be set equal to A and B respectively, otherwise PART1 and PART2 may be set equal to B and A respectively.
  ii. In one example, T1 and T2 may be constant values and T1<NUM_ANGLE and T2<=NUM_ANGLE.
    1) In one example, T1=10 and T2=20 in case of NUM_ANGLE=24.
    2) In one example, T1=8 and T2=16 in case of NUM_ANGLE=20.
    3) In one example, T1=8 and T2=17 in case of NUM_ANGLE=20.
    4) In one example, T1=9 and T2=16 in case of NUM_ANGLE=20.
    5) In one example, T1=7 and T2=13 in case of NUM_ANGLE=16.
  iii. In one example T1 and T2 may be calculated based on the number of angles.
k) In one example, whether the partIdx is set to 0 or 1, used in the motion vector storing process for GEO mode, may be dependent on angle index T1 and angle index T2, where the partIdx is used to derive the variable sType for assigning the motion vectors for GEO motion storage.
  i. In one example, if angleIdx>=T1 && angleIdx<=T2, partIdx may be set to 1, otherwise partIdx may be set to 0. sType=abs(motionIdx)<32 ? 2 : motionIdx<=0 ? partIdx: 1-partIdx, where the variable motionIdx is calculated using the look-up table for derivation of GEO partitioning distance (e.g., Table 8-12 in the working draft of JVET-P0884)
  ii. In one example, T1 and T2 may be constant values and T1<NUM_ANGLE and T2<=NUM_ANGLE.
    1) In one example, T1=10 and T2=20 in case of NUM_ANGLE=24.
    2) In one example, T1=8 and T2=16 in case of NUM_ANGLE=20.
    3) In one example, T1=8 and T2=17 in case of NUM_ANGLE=20.
    4) In one example, T1=9 and T2=16 in case of NUM_ANGLE=20.
    5) In one example, T1=7 and T2=13 in case of NUM_ANGLE=16.
  iii. In one example T1 and T2 may be calculated based on the number of angles.
l) In one example, the values of the look-up table for derivation of GEO/wedgemetric partitioning distance (such as Dis[i], i=0 ... NUM_ANGLE-1) may be set as below table.
  1) Alternatively, the values of the look-up table for derivation of GEO/wedgemetric partitioning distance (such as Dis[i], i=0 ... NUM_ANGLE-1) may be set as a subset of below table.
  2) In one example, the GEO/wedgemetric partitioning distance for angle index equal to 3 and/or 21 may be equal to 4.
  3) In one example, the GEO/wedgemetric partitioning distance for angle index equal to 9 and/or 15 may be equal to −4.

| idx | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Dis[idx] | 8 | 8 | 8 | 4 | 4 | 2 | 0 | −2 | −4 | −4 | −8 | −8 | −8 | −8 | −8 | −4 | −4 | −2 | 0 | 2 | 4 | 4 | 8 | 8 |

GEO Combined with Other Coding Tools

20. The coding tool X may be used to GEO-coded blocks. In this case, indications of usage/side information of X and GEO may be both signaled.
  a) In one example, X may be SBT.
  b) In one example, X may be CIIP.
  c) In one example, X may be MMVD.
  d) The GEO process may be different when coding X is used or not. For example, GEO directions/distances then can be used when coding tool X is used may be a subset of GEO directions/distances then can be used when coding tool X is not used.

21. Whether to/how to apply the filtering process may depend on the usage of GEO.
  a) In one example, the value of boundary filtering strength (e.g., bS) during the deblocking process may be dependent on whether the block is coded with GEO.
  b) In one example, if the block edge is a transform block edge and the sample p0 or q0 is in a coding block with MergeGeoFlag equal to 1, the value of b S may be set equal to T (such as T=2).
  c) In one example, the value of deblocking edges (e.g., edgeFlags) within a GEO block may be never equal to 2.
    i. In one example, the value of deblocking edges (e.g., edgeFlags) within a GEO block may be equal to 2.
    ii. In one example, given a block edge, if the sample p0 or q0 is in a coding block with MergeGeoFlag equal to 1, the value of bS may be dependent on the motion vectors, and/or reference pictures.

Additional Embodiments

Below are example embodiments, which can be applied to VVC specification. The modifications are based on the CE anchor of GEO working draft (JVET-P0884_P0885_WD (on_top_of_JVET-O2001-vE)_r2). Newly added parts are highlighted in bolded underlined text, and the deleted parts from VVC working draft are marked with double brackets (e.g., [[a]] denotes the deletion of the character "a").

5.1. An Example Embodiment #1: GEO Mode Constraint 1

7.3.8.7 Merge Data Syntax

| | Descriptor |
|---|---|
| merge_data( x0,y0,cbWidth,cbHeight,chType ) { | |
|   if ( CuPredMode[ chType ][ x0 ][y0 ] = = MODE_IBC ) { | — |
|     if( MaxNumIbcMergeCand> 1 ) | — |
|       merge_idx[ x0 ][y0 ] | - ae(v) |
|   } else { | — |
|     if( MaxNumSubblockMergeCand> 0 && cbWidth>=8 && cbHeight>=8 ) | — |
|       merge_subblock_flag[ x0 ][y0 ] | - ae(v) |
|     if(merge_subblock_flag[ x0 ][y0 ] = = 1 ) { | — |
|       if( MaxNumSubblockMergeCand> 1 ) | — |
|         merge_subblock_idx[ x0 ][y0 ] | - ae(v) |
|     } else { | — |
|       if( (cbWidth * cbHeight)>= 64 && ( (sps_ciip_enabled_flag&& cu_skip_flag[ x0 ][y0 ] = = 0 && cbWidth < 128 && cbHeight < 128)|| ( sps_wedge_enabled_flag && MaxNumWedgeMergeCand> 1 && cbWidth>=8 && cbHeight>=8 && slice_type= = B && cbWidth * cbHeight <= 2048 && cbHeight/ cbWidth <= 4 && cbWidth/ cbHeight <= 2 ) ) ) | |
|         regular_merge_flag[ x0 ][y0 ] | - ae(v) |
|       if (regular_merge_flag[ x0 ][y0 ] = = 1 ){ | — |
|         if( sps_mmvd_enabled_flag ) | — |
|           mmvd_merge_flag[ x0 ][y0 ] | - ae(v) |
|         if( mmvd_merge_flag[ x0 ][y0 ] = = 1 ) { | — |
|           if( MaxNumMergeCand> 1 ) | — |
|             mmvd_cand_flag[ x0 ][y0 ] | - ae(v) |
|           mmvd_distance_idx[ x0 ][y0 ] | - ae(v) |
|           mmvd_direction_idx[ x0 ][y0 ] | - ae(v) |
|         } else { | — |
|           if( MaxNumMergeCand> 1 ) | — |
|             merge_idx[ x0 ][y0 ] | - ae(v) |
|         } | |
|       } else { | |
|         if( sps_ciip_enabled_flag && sps_wedge_enabled_flag && MaxNumWedgeMergeCand> 1 && slice_type= = B && cu_skip_flag[ x0 ][y0 ] = = 0 && cbWidth>=8 && cbHeight>=8 && cbWidth <128 && cbHeight <128 && cbWidth * cbHeight <= 2048 && cbHeight/ cbWidth <= 4 && cbWidth/ cbHeight <= 2 ) { | — |
|           ciip_flag[ x0 ][y0 ] | - ae(v) |
|           if( ciip_flag[ x0 ][y0 ] && MaxNumMergeCand> 1 ) | — |
|             merge_idx[ x0 ][y0 ] | - ae(v) |
|           if( !ciip_flag[ x0 ][y0 ] && MaxNumWedgeMergeCand> 1 ) { | — |
|             wedge_partition_idx[ x0 ][y0 ] | - ae(v) |
|             merge_wedge_idx0[ x0 ][y0 ] | - ae(v) |
|             merge_wedge_idx1[ x0 ][y0 ] | - ae(v) |
|           } | — |
|         } | — |
|       } | — |
|     } | |
|   } | |
| } | |

5.2. An Example Embodiment #2: GEO Mode Constraint 2

7.3.8.7 Merge Data Syntax

| | Descriptor |
|---|---|
| merge_data( x0,y0,cbWidth,cbHeight,chType ) { | |
|   if ( CuPredMode[ chType ][ x0 ][y0 ] = = MODE_IBC ) { | — |
|     if( MaxNumIbcMergeCand> 1 ) | — |
|       merge_idx[ x0 ][y0 ] | - ae(v) |
|   } else { | — |
|     if( MaxNumSubblockMergeCand> 0 && cbWidth>=8 && cbHeight>=8 ) | — |
|       merge_subblock_flag[ x0 ][y0 ] | - ae(v) |
|     if( merge_subblock_flag[ x0 ][y0 ] = = 1 ) { | — |
|       if( MaxNumSubblockMergeCand> 1 ) | — |
|         merge_subblock_idx[ x0 ][y0 ] | - ae(v) |

|  | Descriptor |
|---|---|
| ``` 
        } else {
            if( ( cbWidth * cbHeight )>= 64 && ( (sps_ciip_enabled_flag&&
                cu_skip_flag[ x0 ][y0 ] = = 0 && cbWidth < 128 && cbHeight< 128)||
                ( sps_wedge_enabled_flag && MaxNumWedgeMergeCand> 1 && cbWidth>=8
&& cbHeight>=8 && slice_type= = B && (cbWidth * cbHeight<=512 || cbWidth *
cbHeight <= 2048 && ``` $_{Abs(\ Log2(\ cbWidth\ )\ -\ Log2(\ cbHeight\ )\ )<-\ 1}$ ``` ) ) ) {
                regular_merge_flag [ x0 ][y0 ] ``` | - ae(v) |
| ``` 
                if ( regular_merge_flag[ x0 ][y0 ] = = 1 ){
                    if( sps_mmvd_enabled_flag ) ``` | — |
| ``` 
                        mmvd_merge_flag[ x0 ][y0 ] ``` | - ae(v) |
| ``` 
                    if( mmvd_merge_flag[ x0 ][y0 ] = = 1 ) {
                        if( MaxNumMergeCand> 1 ) ``` | — |
| ``` 
                            mmvd_cand_flag[ x0 ][y0 ] ``` | - ae(v) |
| ``` 
                        mmvd_distance_idx[ x0 ][y0 ] ``` | - ae(v) |
| ``` 
                        mmvd_direction_idx[ x0 ][y0 ] ``` | - ae(v) |
| ``` 
                    } else {
                        if( MaxNumMergeCand> 1 ) ``` | — |
| ``` 
                            merge_idx[ x0 ][y0 ] ``` | - ae(v) |
| ``` 
                    }
                } else {
                    if( sps_ciip_enabled_flag && sps_wedge_enabled_flag &&
                        MaxNumWedgeMergeCand> 1 && slice_type= = B &&
                        cu_skip_flag[ x0 ][y0 ] = = 0 &&
                        cbWidth>=8 && cbHeight>=8 && cbWidth < 128 && cbHeight < 128 &&
( cbWidth * cbHeight<=512 || cbWidth * cbHeight <= 2048 &&
``` $Abs(\ Log2(\ cbWidth\ )\ -\ Log2(\ cbHeight\ )\ )<=\ 1)$ ``` ) {
                        ciip_flag[ x0 ][y0 ] ``` | - ae(v) |
| ``` 
                    if( ciip_flag[ x0 ][y0 ] && MaxNumMergeCand> 1 ) ``` | — |
| ``` 
                        merge_idx[ x0 ][y0 ] ``` | - ae(v) |
| ``` 
                    if( !ciip_flag[ x0 ][y0 ] &&MaxNumWedgeMergeCand > 1 ) {
                        wedge_partition_idx[ x0 ][y0 ] ``` | - ae(v) |
| ``` 
                        merge_wedge_idx0[ x0 ][y0 ] ``` | - ae(v) |
| ``` 
                        merge_wedge_idx1[ x0 ][y0 ] ``` | - ae(v) |
| ``` 
                    }
                }
            }
        }
    }
} ``` | — |

5.3. An Example Embodiment #3: Block Size Dependent GEO Mode Selection 1

8.5.7 Decoding Process for Wedge Inter Blocks
8.5.7.1 General
This process is invoked when decoding a coding unit with wedge_merge_mode[xCb][yCb] equal to 1.
Inputs to this process are:
a luma location (xCb, yCb) specifying the top-left sample of the current coding block relative to the top-left luma sample of the current picture,
a variable cbWidth specifying the width of the current coding block in luma samples,
a variable cbHeight specifying the height of the current coding block in luma samples,
the luma motion vectors in 1/16 fractional-sample accuracy mvA and mvB,
the chroma motion vectors mvCA and mvCB,
the reference indices refIdxA and refIdxB,
the prediction list flags predListFlagA and predListFlagB.
Outputs of this process are:
an (cbWidth)×(cbHeight) array $predSamples_L$ of luma prediction samples,
an (cbWidth/SubWidthC)×(cbHeight/SubHeightC) array $predSamples_{Cb}$ of chroma prediction samples for the component Cb,
an (cbWidth/SubWidthC)×(cbHeight/SubHeightC) array $predSamples_{Cr}$ of chroma prediction samples for the component Cr.
Let $predSamplesLA_L$ and $predSamplesLB_L$ be (cbWidth)×(cbHeight) arrays of predicted luma sample values and, $predSamplesLA_{Cb}$, $predSamplesLB_{Cb}$, $predSamplesLA_{Cr}$ and $predSamplesLB_{Cr}$ be (cbWidth/SubWidthC)×(cbHeight/SubHeightC) arrays of predicted chroma sample values.
The $predSamples_L$, $predSamples_{Cb}$ and $predSamples_{Cr}$ are derived by the following ordered steps:
1. For N being each of A and B, the following applies:
   The reference picture including an ordered two-dimensional array $refPicLN_L$ of luma samples and two ordered two-dimensional arrays $refPicLN_{Cb}$ and $refPicLN_{Cr}$ of chroma samples is derived by invoking the process specified in clause 8.5.6.2 with X set equal to predListFlagN and refIdxX set equal to refIdxN as input.
   The array $predSamplesLN_L$ is derived by invoking the fractional sample interpolation process specified in clause 8.5.6.3 with the luma location (xCb, yCb), the luma coding block width sbWidth set equal to cbWidth, the luma coding block height sbHeight set equal to cbHeight, the motion vector offset mvOffset set equal to (0, 0), the motion vector mvLX set equal to mvN and the reference array $refPicLX_L$ set equal to $refPicLN_L$, the variable bdofFlag set equal to FALSE, and the variable cIdx is set equal to 0 as inputs.
   The array $predSamplesLN_{Cb}$ is derived by invoking the fractional sample interpolation process specified in clause 8.5.6.3 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cb}$ set equal to refPicLN$_{Cb}$, the variable bdofFlag set equal to FALSE, and the variable cIdx is set equal to 1 as inputs.

The array predSamplesLN$_{Cr}$ is derived by invoking the fractional sample interpolation process specified in clause 8.5.6.3 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cr}$ set equal to refPicLN$_{Cr}$, the variable bdofFlag set equal to FALSE, and the variable cIdx is set equal to 2 as inputs.

2. The value of wedge_partition_idx'[xCb][yCb] are set according to the value of wedge_partition_idx[xCb][yCb] and the coding block width cbWidth and the coding block height cbHeight, as specified in Table 8-xx and Table 8-xxx.
3. The partition angle and distance of the wedge merge mode angleIdx and distanceIdex are set according to the value of wedge_partition_idx'[xCb][yCb] as specified in Table 8-10
4. The prediction samples inside the current luma coding block, predSamples$_L$[x$_L$][y$_L$] with X$_L$=0 ... cbWidth−1 and y$_L$=0 ... cbHeight−1, are derived by invoking the weighted sample prediction process for wedge merge mode specified in clause 8.5.7.2 with the coding block width nCbW set equal to cbWidth, the coding block height nCbH set equal to cbHeight, the sample arrays predSamplesLA$_L$ and predSamplesLB$_L$, and the variables angleIdx and distanceIdx, and cIdx equal to 0 as inputs.
5. The prediction samples inside the current chroma component Cb coding block, predSamples$_{Cb}$[x$_C$][y$_C$] with x$_C$=0 ... cbWidth/SubWidthC−1 and y$_C$=0 ... cbHeight/SubHeightC−1, are derived by invoking the weighted sample prediction process for wedge merge mode specified in clause 8.5.7.2 with the coding block width nCbW set equal to cbWidth/SubWidthC, the coding block height nCbH set equal to cbHeight/SubHeightC, the sample arrays predSamplesLA$_{Cb}$ and predSamplesLB$_{Cb}$, and the variables angleIdx and distanceIdx, and cIdx equal to 1 as inputs.
6. The prediction samples inside the current chroma component Cr coding block, predSamples$_{Cr}$[x$_C$][y$_C$] with x$_C$=0 ... cbWidth/SubWidthC−1 and y$_C$=0 ... cbHeight/SubHeightC−1, are derived by invoking the weighted sample prediction process for wedge merge mode specified in clause 8.5.7.2 with the coding block width nCbW set equal to cbWidth/SubWidthC, the coding block height nCbH set equal to cbHeight/SubHeightC, the sample arrays predSamplesLA$_{Cr}$ and predSamplesLB$_{Cr}$, and the variables angleIdx and distanceIdx, and cIdx equal to 2 as inputs.
7. The motion vector storing process for merge wedge mode specified in clause 8.5.7.3 is invoked with the luma coding block location (xCb, yCb), the luma coding block width cbWidth, the luma coding block height cbHeight, the partition direction angleIdx and distanceIdx, the luma motion vectors mvA and mvB, the reference indices refIdxA and refIdxB, and the prediction list flags predListFlagA and predListFlagB as inputs.

TABLE 8-xx

Mapping table of the MaxGEOMode based on the block width and block height.
(comment: below table is an example for the case that the maximum number of GEO modes allowed for a GEO block with block category (from 0 ... k) is equal to MaxGEOMode[i] (i = 0 ... k), and the block category may be decided by the block width and block height)

| Block Category | 0 | 1 | 2 | ... | k |
|---|---|---|---|---|---|
| MaxGEOMode | MaxGEOMode[0] | MaxGEOMode[1] | MaxGEOMode[2] | ... | MaxGEOMode[k] |

TABLE 8-xxx

Mapping table of the wedge_partition idx' values based on the wedge_partition_idx value.

| | | 0 | 1 | 2 | 3 | 4 | ... | |
|---|---|---|---|---|---|---|---|---|
| Block Category 0 | wedge partition idx | 0 | 1 | 2 | 3 | 4 | ... | MaxGEOMode[0] − 1 |
| | wedge partition idx' | x | y | z | u | v | ... | ww |
| Block Category 1 | wedge partition idx | 0 | 1 | 2 | 3 | 4 | ... | MaxGEOMode[1] − 1 |
| | wedge partition idx' | xx | yy | zz | uu | vv | ... | ww |
| ... | ... | ............... | | | | | | ... |
| | | ............... | | | | | | |
| Block Category k | wedge partition idx | 0 | 1 | 2 | 3 | 4 | ... | MaxGEOMode[k] − 1 |
| | wedge partition idx' | xxx | yyy | zzz | uuu | xxx | ... | www |

Figure 20:
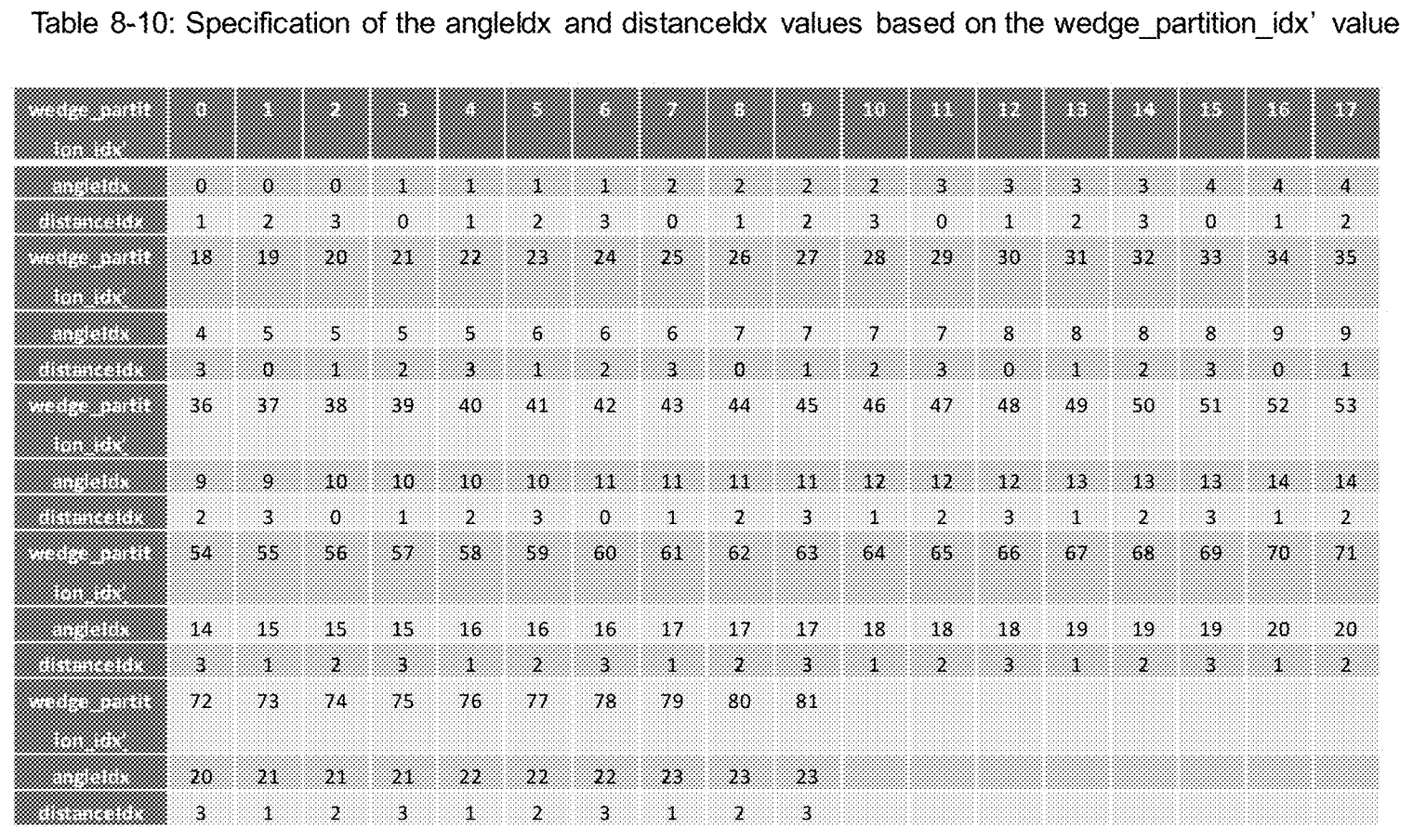

FIG. 20 shows a corresponding Table 8-10 indicating specification of the angleIdx and distanceIdx values based on the wedge_partition_idx' value.

TABLE 9-77

Syntax elements and associated binarizations

| Syntax structure | Syntax element | Binarization Process | Input parameters |
|---|---|---|---|
| merge_data( ) | regular_merge_flag[ ][ ] | FL | cMax = 1 |
| | mmvd_merge_flag[ ][ ] | FL | cMax = 1 |
| | mmvd_cand_flag[ ][ ] | FL | cMax = 1 |
| | mmvd_distance_idx[ ][ ] | TR | cMax = 7, cRiceParam = 0 |
| | mmvd_direction_idx[ ][ ] | FL | cMax = 3 |
| | ciip_flag[ ][ ] | FL | cMax = 1 |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | wedge_partition_idx[ ][ ] | TB | cMax =[[82]] MaxGEOMode[i] (comment: here MaxGEOMode[i] means the number of GEO modes allowed for a GEO block with block category i, wherein i may be decided by the block block width and block height) |
| | merge_wedge_idx0[ ][ ] | TR | cMax = MaxNumWedgeMergeCand − 1, cRiceParam = 0 |
| | merge_wedge_idx1[ ][ ] | TR | cMax = MaxNumWedgeMergeCand − 2, cRiceParam = 0 |
| | merge_idx[ ][ ] | TR | cMax = MaxNumMergeCand − 1, cRiceParam = 0 |

5.4. An Example Embodiment #4: Block Size Dependent GEO Mode Selection 2

8.5.7 Decoding Process for Wedge Inter Blocks
8.5.7.1 General
This process is invoked when decoding a coding unit with wedge_merge_mode[xCb][yCb] equal to 1. Inputs to this process are:
  a luma location (xCb, yCb) specifying the top-left sample of the current coding block relative to the top-left luma sample of the current picture,
  a variable cbWidth specifying the width of the current coding block in luma samples,
  a variable cbHeight specifying the height of the current coding block in luma samples,
  the luma motion vectors in 1/16 fractional-sample accuracy mvA and mvB,
  the chroma motion vectors mvCA and mvCB,
  the reference indices refIdxA and refIdxB,
  the prediction list flags predListFlagA and predListFlagB.
Outputs of this process are:
  an (cbWidth)×(cbHeight) array predSamples$_L$ of luma prediction samples,
  an (cbWidth/SubWidthC)×(cbHeight/SubHeightC) array predSamples$_{Cb}$ of chroma prediction samples for the component Cb,
  an (cbWidth/SubWidthC)×(cbHeight/SubHeightC) array predSamples$_{Cr}$ of chroma prediction samples for the component Cr.
Let predSamplesLA$_L$ and predSamplesLB$_L$ be (cbWidth)×(cbHeight) arrays of predicted luma sample values and, predSamplesLA$_{Cb}$, predSamplesLB$_{Cb}$, predSamplesLA$_{Cr}$ and predSamplesLB$_{Cr}$ be (cbWidth/SubWidthC)×(cbHeight/SubHeightC) arrays of predicted chroma sample values.
The predSamples$_L$, predSamples$_{Cb}$ and predSamples$_{Cr}$ are derived by the following ordered steps:
  8. For N being each of A and B, the following applies:
    The reference picture including an ordered two-dimensional array refPicLN$_L$ of luma samples and two ordered two-dimensional arrays refPicLN$_{Cb}$ and refPicLN$_{Cr}$ of chroma samples is derived by invoking the process specified in clause 8.5.6.2 with X set equal to predListFlagN and refIdxX set equal to refIdxN as input.

The array predSamplesLN$_L$ is derived by invoking the fractional sample interpolation process specified in clause 8.5.6.3 with the luma location (xCb, yCb), the luma coding block width sbWidth set equal to cbWidth, the luma coding block height sbHeight set equal to cbHeight, the motion vector offset mvOffset set equal to (0, 0), the motion vector mvLX set equal to mvN and the reference array refPicLX$_L$ set equal to refPicLN$_L$, the variable bdofFlag set equal to FALSE, and the variable cIdx is set equal to 0 as inputs.

The array predSamplesLN$_{Cb}$ is derived by invoking the fractional sample interpolation process specified in clause 8.5.6.3 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cb}$ set equal to refPicLN$_{Cb}$, the variable bdofFlag set equal to FALSE, and the variable cIdx is set equal to 1 as inputs.

The array predSamplesLN$_{Cr}$ is derived by invoking the fractional sample interpolation process specified in clause 8.5.6.3 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cr}$ set equal to refPicLN$_{Cr}$, the variable bdofFlag set equal to FALSE, and the variable cIdx is set equal to 2 as inputs.

9. The value of wedge_partition_idx'[xCb][yCb] are set according to the value of wedge_partition_idx[xCb][yCb] and the coding block width cbWidth and the coding block height cbHeight, as specified in Table 8-xx.
  10. The partition angle and distance of the wedge merge mode angleIdx and distanceIdex are set according to the value of wedge_partition_idx'[xCb][yCb] as specified in Table 8-10

11. The prediction samples inside the current luma coding block, predSamples$_L$[x$_L$][y$_L$] with X$_L$=0 . . . cbWidth−1 and y$_L$=0 . . . cbHeight−1, are derived by invoking the weighted sample prediction process for wedge merge mode specified in clause 8.5.7.2 with the coding block width nCbW set equal to cbWidth, the coding block height nCbH set equal to cbHeight, the sample arrays predSamplesLA$_L$ and predSamplesLB$_L$, and the variables angleIdx and distanceIdx, and cIdx equal to 0 as inputs.

12. The prediction samples inside the current chroma component Cb coding block, predSamples$_{Cb}$[x$_C$][y$_C$] with x$_C$=0 . . . cbWidth/SubWidthC−1 and y$_C$=0 . . . cbHeight/SubHeightC−1, are derived by invoking the weighted sample prediction process for wedge merge mode specified in clause 8.5.7.2 with the coding block width nCbW set equal to cbWidth/SubWidthC, the coding block height nCbH set equal to cbHeight/SubHeightC, the sample arrays predSamplesLA$_{Cb}$ and predSamplesLB$_{Cb}$, and the variables angleIdx and distanceIdx, and cIdx equal to 1 as inputs.

13. The prediction samples inside the current chroma component Cr coding block, predSamples$_{Cr}$[x$_C$][y$_C$] with x$_C$=0 . . . cbWidth/SubWidthC−1 and y$_C$=0 . . . cbHeight/SubHeightC−1, are derived by invoking the weighted sample prediction process for wedge merge mode specified in clause 8.5.7.2 with the coding block width nCbW set equal to cbWidth/SubWidthC, the coding block height nCbH set equal to cbHeight/SubHeightC, the sample arrays predSamplesLA$_{Cr}$ and predSamplesLB$_{Cr}$, and the variables angleIdx and distanceIdx, and cIdx equal to 2 as inputs.

14. The motion vector storing process for merge wedge mode specified in clause 8.5.7.3 is invoked with the luma coding block location (xCb, yCb), the luma coding block width cbWidth, the luma coding block height cbHeight, the partition direction angleIdx and distanceIdx, the luma motion vectors mvA and mvB, the reference indices refIdxA and refIdxB, and the prediction list flags predListFlagA and predListFlagB as inputs.

TABLE 8-xx

Mapping table of the wedge partition idx' values based on the wedge partition idx value.

(comment: below table is an example for the case that the maximum number of GEO modes allowed for a GEO block with block category (from 0. . .k) is equal to a constant Max)

| Block Category | | 0 | 1 | 2 | 3 | 4 | ... | Max − 1 |
|---|---|---|---|---|---|---|---|---|
| 0 | wedge partition idx | 0 | 1 | 2 | 3 | 4 | ... | Max − 1 |
| | wedge partition idx' | x | y | z | u | v | ... | w |
| Block Category 1 | wedge partition idx | 0 | 1 | 2 | 3 | 4 | ... | Max − 1 |
| | wedge partition idx' | xx | yy | zz | uu | vv | ... | ww |
| ... | ... | ... | ... | ... | ... | ... | ... | ... |
| | | ... | ... | ... | ... | ... | ... | ... |
| Block Category k | wedge partition idx | 0 | 1 | 2 | 3 | 4 | ... | Max − 1 |
| | wedge partition idx' | xxx | yay | zaz | uuu | xxx | ... | www |

FIG. 21 shows a corresponding Table 8-10 indicating specification of the angleIdx and distanceIdx values based on the wedge_partition_idx' value.

TABLE 9-77

Syntax elements and associated binarizations

| Syntax structure | Syntax element | Binarization | |
|---|---|---|---|
| | | Process | Input parameters |
| merge_data( ) | regular_merge_flag[ ][ ] | FL | cMax = 1 |
| | mmvd_merge_flag[ ][ ] | FL | cMax = 1 |
| | mmvd_cand_flag[ ][ ] | FL | cMax = 1 |
| | mmvd_distance_idx[ ][ ] | TR | cMax = 7, cRiceParam = 0 |
| | mmvd_direction_idx[ ][ ] | FL | cMax = 3 |
| | ciip_flag[ ][ ] | FL | cMax = 1 |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | wedge_partition_idx[ ][ ] | TB | cMax =[[82]] Max (comment: here Max means the number of GEO modes allowed for a GEO block, which is a constant) |
| | mergewedgeidx0[ ] | TR | cMax = MaxNumWedgeMergeCand − 1, cRiceParam = 0 |
| | merge_wedge_idx1[ ][ ] | TR | cMax = MaxNumWedgeMergeCand − 2, cRiceParam = 0 |
| | merge_idx[ ][ ] | TR | cMax = MaxNumMergeCand − 1, cRiceParam = 0 |

5.5. An Example Embodiment #5: 64 GEO Modes with 20 Angles Supported

In the below example, NUM ANGLE, T1 and T2 may be constant values, and Table 8-10 and Table 8-12 are changed accordingly.
FIG. 22 shows old Table 8-10 that is deleted from the relevant working draft and FIG. 23 shows newly suggested Table 8-10 that is accordingly changed in the relevant working draft. Table 8-10 is the specification of the angleIdx and distanceIdx values based on the wedge_partition_idx value. (note: Table as shown in FIG. 23 is an example of 64 modes that in case of NUM ANGLE=20, and only 2 distances allowed for angleIdx=0/5/10/15)

8.5.7.2 Weighted Sample Prediction Process for Wedge Merge Mode
Inputs to this process are:
  two variables nCbW and nCbH specifying the width and the height of the current coding block,
  two (nCbW)×(nCbH) arrays predSamplesLA and pred-SamplesLB,
  a variable angleIdx specifying the angle index of the wedge partition,
  a variable distanceIdx specizing the distance idx of the wedge partition,
  a variable cIdx specifying colour component index.
Output of this process is the (nCbW)×(nCbH) array pbSamples of prediction sample values.
The variable bitDepth is derived as follows:
  If cIdx is equal to 0, bitDepth is set equal to BitDepth$_Y$.
  If cIdx is equal to 0, nW and nH are set equal to nCbW and nCbH respectively, otherwise (cIdx is not equal to 0) nW and nH are set equal to nCbW×SubWidthC and nCbH×SubHeightC respectively.
  If cIdx is equal to 0, subW and subH are both set 1, otherwise (cIdx is not equal to 0) subW and subH are set equal to SubWidthC and SubHeightC respectively.
  Otherwise, bitDepth is set equal to BitDepth$_C$.
Variables shift1 and offset1 are derived as follows:
  The variable shift1 is set equal to Max(5, 17−bitDepth).
  The variable offset1 is set equal to 1<<(shift1−1).
The values of the following variables are set:
  hwRatio is set to nH/nW
  displacementX is set to angleIdx
  displacementY is set to (displacementX+[[6]](NUM ANGLE>>2))%[[24]] NUM ANGLE
  If angleIdx>=[[10]]T1 && angleIdx<=[[20]]T2, PART1 and PART2 are set equal to A and B respectively, otherwise PART1 and PART2 are set equal to B and A respectively.
  rho is set to the following value using the look-up tables denoted as Dis, specified in Table 8-12:

rho=(Dis[displacementX]<<8)+(Dis[displacementY]<<8)

If one of the following conditions is true, variable shiftHor is set equal to 0:

angleIdx % [[12]](NUM ANGLE/2) is equal to [[6]] (NUM ANGLE>>2)

angleIdx % [[12]](NUM ANGLE/2) is not equal to 0 and hwRatio≥1

Otherwise, shiftHor is set equal to 1.
If shiftHor is equal to 0, offsetX and offsetY are derived as follows:

offsetX=(256−nW)>>1 offsetY=(256−nH)>>1+angleIdx<[[12]] (NUM ANGLE/2)?(distanceIdx*nH)>> 3: −((distanceIdx*nH)>>3)

Otherwise, if shiftHor is equal to 1, offsetX and offsetY are derived as follows:

offsetX=(256−nW)>>1+angleIdx<[[12]] (NUM ANGLE/2)?(distanceIdx*nW)>> 3: −((distanceIdx*nW)>>3)

offsetY=(256−nH)>>1

The prediction sample values pbSamples[x][y] with x=0 . . . nCbW−1 and y=0 . . . nCbH−1 is set according the following ordered steps:
  The variable weightIdx and weightIdxAbs are calculated using the look-up table Table 8-12 as follows:

$$weightIdx = ((x*subW + offsetX)<<1)+1)*Dis[displacementX] +$$
$$(((y*subH + offsetY)<<1)+1))*Dis[displacementY] - rho.$$
$$weightIdxAbs = Clip3(0, 26, abs(weightIdcx)).$$

The value of sampleWeight is derived according to according to Table 8-13 as follows:

sampleWeight=weightIdx<=0?WedgeFilter[weightIdxAbs]: 8−WedgeFilter[weightIdxAbs]

NOTE—The value of sample sampleWeight$_L$[x][y] can also be derived from sampleWeight$_L$[x-shiftX][y-shiftY]. If the angleIdx is larger than 4 and smaller than 12, or angleIdx is larger than 20 and smaller than 24, shiftX is the tangent of the split angle and shiftY is 1, otherwise shiftX is 1 of the split angle and shiftY is cotangent of the split angle. If tangent (resp. cotangent) value is infinity, shiftX is 1 (resp. 0) or shift Y is 0 (reps. 1).

The prediction sample value pbSamples[x][y] is derived as follows:

pbSamples[x][y]=Clip3(0,(1<<bitDepth)−1,(predSamplesLPART1 [x][y]*(8−sampleWeight)+ predSamplesLPART2[x][y]*sampleWeight+ offset11)>>shift1)

TABLE 8-12

Look-up table Dis for derivation of wedgemetric partitioning distance.

| idx | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Dis[idx] | 8 | 8 | 8 | 8 | 4 | 2 | 0 | −2 | −4 | −8 | −8 | −8 | −8 | −8 | −8 | −8 | −4 | −2 | 0 | 2 | 4 | 8 | 8 | 8 |

| idx | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Dis [idx] | 8 | 8 | 8 | 4 | 2 | −2 | −4 | −8 | −8 | −8 | −8 | −8 | −8 | −4 | −2 | 2 | 4 | 8 | 8 | 8 |

| idx | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Dis[idx] | 8 | 8 | 8 | 4 | 2 | 0 | −2 | −4 | −8 | −8 | −8 | −8 | −8 | −4 | −2 | 0 | 2 | 4 | 8 | 8 |

| idx | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Dis[idx] | 8 | 8 | 8 | 8 | 2 | 0 | −2 | −8 | −8 | −8 | −8 | −8 | −8 | −8 | −2 | 0 | 2 | 8 | 8 | 8 |

| idx | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Dis[idx] | 8 | 8 | 8 | 8 | 4 | 0 | −4 | −8 | −8 | −8 | −8 | −8 | −8 | −8 | −4 | 0 | 4 | 8 | 8 | 8 |

15

| idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Dis[idx] | 8 | 8 | 4 | 2 | 0 | −2 | −4 | −8 | −8 | −8 | −4 | −2 | 0 | 2 | 4 | 8 |

TABLE 8-13

Filter weight look-up table WedgeFilter for derivation of wedge partitioning filter weights.

| idx | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|---|
| WedgeFilter[idx] | 4 | 4 | 4 | 4 | 5 | 5 | 5 | 5 | 5 | 5 | 5 | 6 | 6 | 6 | 6 | 6 | 6 | 6 | 7 | 7 | 7 | 7 | 7 | 7 | 7 | 7 | 8 |

8.5.7.3 Motion Vector Storing Process for Wedge Merge Mode

This process is invoked when decoding a coding unit with MergeWedgeFlag[xCb][yCb] equal to 1.
Inputs to this process are:
  a luma location (xCb, yCb) specifying the top-left sample of the current coding block relative to the top-left luma sample of the current picture,
  a variable cbWidth specifying the width of the current coding block in luma samples,
  a variable cbHeight specifying the height of the current coding block in luma samples,
  the luma motion vectors in 1/16 fractional-sample accuracy mvA and mvB,
  the reference indices refIdxA and refIdxB,
  the prediction list flags predListFlagA and predListFlagB.
The variables numSbX and numSbY specifying the number of 4×4 blocks in the current coding block in horizontal and vertical direction are set equal to numSbX=cbWidth>>2 and numSbY=cbHeight>>2.
The value of the following variables are set:
  displacementX is set to angleIdx, displacementY is set to (displacementX+[[6]](NUM ANGLE>>2))%[[24]] NUM ANGLE
  hwRatio is set equal to nCbH/nCbW
If one of the following conditions is true, variable shiftHor is set equal to 0:

angleIdx % [[12]](NUM ANGLE/2) is equal to [[8]] (NUM ANGLE>>2)

angleIdx % [[12]](NUM ANGLE/2) is not equal to 0 and hwRatio≥1

Otherwise, shiftHor is set equal to 1.
partIdx is set to angleIdx>=[[10]]T1 && angleIdx<=[[20]]T2? 1:0.

If shiftHor is equal to 0, offsetX and offsetY are derived as follows:

offsetX=(64−numSbX)>>1 offsetY=(64−numSbY)>>1+angleIdx<[[12]] (NUM ANGLE/2)?(distanceIdx* nCbH)>>5: −((distanceIdx*nCbH)>>5)

Otherwise, if shiftHor is equal to 1, offsetX and offsetY are derived as follows:

offsetX=(64−numSbX)>>1+angleIdx<[[12]] (NUM ANGLE/2)?(distanceIdx* nCbW)>>5: −((distanceIdx*nCbW)>>5)

offsetY=(64−numSbY)>>1

The value of the variable rho is derived according to the equation below and according to the Dis lookup table specified in Table 8-12:

rho=(Dis[displacementX]<<8)+(Dis[displacementY]<<8).

motionOffset is set equal to the following value using the look-up tables denoted as Dis, specified in Table 8-11 and Table 8-12:

motionOffset=3*Dis[displacementX]+3*Dis[displacementY].

For each 4×4 subblock at subblock index (xSbIdx, ySbIdx) with xSbIdx=0 ... numSbX−1, and ySbIdx=0 ... numSbY−1, the following applies: The variable motionIdx is calculated using the look-up table Table 8-12 as following:

$motionIdx = (((xSbIdx + offsetX) << 3) + 1) * Dis[displacementX] + (((xSbIdx + offsetY) << 3) + 1)) * Dis[displacementY] - rho + motionOffset.$ The variable sType is derived as follows:

$$sType = abs(motionIdx) < 32\ ?\ 2 : motionIdx <= 0\ ?\ partIdx : 1 - partIdx$$

Below are example embodiments, which can be applied to VVC specification. The modifications are based on the CE anchor of GEO working draft (JVET-P0884_P0885_WD (on_top_of_JVET-O2001-vE)_r2). Newly added parts are highlighted in bolded underlined text, and the deleted parts from VVC working draft are marked with double brackets (e.g., [[a]] denotes the deletion of the character "a").

An Example Embodiment: GEO Mode Constraint 7.3.9.7 Merge Data Syntax

|  | Descriptor |
|---|---|
| merge_data( x0, y0, cbWidth, cbHeight, chType ) { <br> ... <br>   if( ( cbWidth * cbHeight) >= 64 && cbWidth <= 64 && cbHeight <= 64 && <br>     ( (sps_ciip_enabled_flag && cu_skip_flag[ x0 ][ y0 ] == 0 [[ && cbWidth < 128 && cbHeight < 128 ]]) \|\| <br>     ( sps_geo_enabled_flag && MaxNumGeoMergeCand > 1 &&cb Width>=8 && cbHeight >=8 && slice_type == B ) ) ) <br>     regular_merge_flag[ x0 ][ y0 ] <br>   if ( regular_merge_flag[ x0 ][ y0 ] == 1 ){ <br> ... <br>   } else { <br>     if( sps_ciip_enabled_flag && sps_geo_enabled_flag && <br>       MaxNumGeoMergeCand > 1 && slice_type == B && <br>       cu_skip_flag[ x0 ][ y0 ] == 0 && <br>       cbWidth >= 8 && cbHeight >= 8 && cbWidth < 128 && cbHeight < 128 ) <br>     ciip_flag[ x0 ][ y0 ] <br> ... | ae(v) <br><br><br><br><br><br><br><br><br><br><br><br> ae(v) |

An Example Embodiment: GEO Mode Constraint 7.3.9.7 Merge Data Syntax

|  | Descriptor |
|---|---|
| merge_data( x0, y0, cbWidth, cbHeight, chType ) { <br> ... <br>   if( ( cbWidth * cbHeight) >= 64 && <br>     ( (sps_ciip_enabled_flag && cu_skip_flag[ x0 ][ y0 ] == 0 && cb Width < 128 && cbHeight < 128) \|\| <br>     ( sps_geo_enabled_flag && MaxNumGeoMergeCand > 1 && cbWidth>=8 && cbHeight >=8 && slice_type == B && cbWidth <= 32 && cbHeight <= 32))) <br>     regular_merge_flag[ x0 ] [ y0 ] <br>   if ( regular_merge_flag[ x0 ][ y0 ] == 1 ){ <br> ... <br>   } else { <br>     if( sps_ciip_enabled_flag && sps_geo_enabled_flag && <br>       MaxNumGeoMergeCand > 1 && slice_type == B && <br>       cu_skip_flag[ x0 ][ y0 ] == 0 && <br>       cbWidth >= 8 && cbHeight >= 8 && cbWidth <= ~~128~~ 32 && cbHeight <= ~~128~~ 32 ) <br>     ciip_flag[ x0 ][ y0 ] <br> ... | ae(v) <br><br><br><br><br><br><br><br><br><br><br> ae(v) |

An Example Embodiment: GEO Mode Constraint 7.3.9.7 Merge Data Syntax

|  | Descriptor |
|---|---|
| merge_data( x0, y0, cbWidth, cbHeight, chType ) { <br> ... <br>   if( ( cbWidth * cbHeight) >= 64 && cbWidth <= 64 && cbHeight <= 64 && <br>     ( ( sps_ciip_enabled_flag && cu_skip_flag[ x0 ][ y0 ] == 0 [[ && cbWidth < 128 && cbHeight < 128]] ) \|\| <br>     ( sps_geo_enabled_flag && MaxNumGeoMergeCand > 1 && cbWidth>=8 && cbHeight >=8 && slice_type == B && cbWidth/ cbHeight <=2 && cbHeight/cbWidth <=4 ) ) ) <br>     regular_merge_flag[ x0 ][ y0 ] <br>   if ( regular_merge_flag[ x0 ][ y0 ] == 1 ){ <br> ... <br>   } else { <br>     if( sps_ciip_enabled_flag && sps_geo_enabled_flag && <br>       MaxNumGeoMergeCand > 1 && slice_type == B && <br>       cu_skip_flag[ x0 ][ y0 ] == 0 && | ae(v) |

|  | Descriptor |
|---|---|
|       cbWidth >= 8 && cbHeight >= 8 && cbWidth < 128 && cbHeight < 128 <u>&&</u> <u>cbWidth/ cbHeight <=2 && cbHeight/cbWidth <=4</u> ) <br>           ciip_flag[ x0 ][ y0 ] <br> ... | ae(v) |

An Example Embodiment: GEO Mode Constraint
7.3.9.7 Merge Data Syntax

|  | Descriptor |
|---|---|
| merge_data( x0, y0, cbWidth, cbHeight, chType) { <br> ... <br>   if( ( cbWidth * cbHeight) >= 64 <u>&& cbWidth <= 64 && cbHeight <= 64 &&</u> <br>     ( (sps_ciip_enabled_flag && cu_skip_flag[ x0 ][ y0 ] == 0 [[ && cbWidth < 128 && cbHeight < 128 ]]) ‖ <br>     ( sps_geo_enabled_flag && MaxNumGeoMergeCand > 1 && cbWidth>=8 <br> && cbHeight >=8 && slice_type = = B <u>&& cbWidth/ cbHeight <=4 && cbHeight/cbWidth <=4</u> )) <br>       regular_merge_flag[ x0 ][ y0 ] <br>   if ( regular_merge_flag[ x0 ][ y0 ] = = 1 ){ <br> ... <br>   } else { <br>     if( sps_ciip_enabled_flag && sps_geo_enabled_flag && <br>       MaxNumGeoMergeCand > 1 && slice type = = B && <br>       cu_skip_flag[ x0 ][ y0 ] = = 0 && <br>         cbWidth >= 8 && cbHeight >= 8 && cbWidth < 128 && cbHeight < 128 <u>&&</u> <br> <u>cbWidth/ cbHeight <=4 && cbHeight/cbWidth <=4</u> ) <br>         ciip_flag[ x0 ][ y0 ] <br> ... | ae(v) <br><br><br><br><br><br> ae(v) <br><br><br><br><br><br><br> ae(v) |

An Example Embodiment: Block Size Dependent GEO Mode Selection
8.5.7 Decoding Process for Geo Inter Blocks
8.5.7.1 General This process is invoked when decoding a coding unit with MergeGeoFlag[xCb][yCb] equal to 1.
Inputs to this process are:
  a luma location (xCb, yCb) specifying the top-left sample of the current coding block relative to the top-left luma sample of the current picture,
  a variable cbWidth specifying the width of the current coding block in luma samples,
  a variable cbHeight specifying the height of the current coding block in luma samples,
  the luma motion vectors in 1/16 fractional-sample accuracy mvA and mvB,
  the chroma motion vectors mvCA and mvCB,
  the reference indices refIdxA and refIdxB,
  the prediction list flags predListFlagA and predListFlagB.
Outputs of this process are:
  an (cbWidth)×(cbHeight) array predSamples$_L$ of luma prediction samples,
  an (cbWidth/SubWidthC)×(cbHeight/SubHeightC) array predSamples$_{Cb}$ of chroma prediction samples for the component Cb,
  an (cbWidth/SubWidthC)×(cbHeight/SubHeightC) array predSamples$_{Cr}$ of chroma prediction samples for the component Cr.
Let predSamplesLA$_L$ and predSamplesLB$_L$ be (cbWidth)×(cbHeight) arrays of predicted luma sample values and, predSamplesLA$_{Cb}$, predSamplesLB$_{Cb}$, predSamplesLA$_{Cr}$ and predSamplesLB$_{Cr}$ be (cbWidth/SubWidthC)×(cbHeight/SubHeightC) arrays of predicted chroma sample values.
The predSamples$_L$, predSamples$_{Cb}$ and predSamples$_{Cr}$ are derived by the following ordered steps:

1. For N being each of A and B, the following applies:
  The reference picture consisting of an ordered two-dimensional array refPicLN$_L$ of luma samples and two ordered two-dimensional arrays refPicLN$_{Cb}$ and refPicLN$_{Cr}$ of chroma samples is derived by invoking the process specified in clause 8.5.6.2 with X set equal to predListFlagN and refIdxX set equal to refIdxN as input.
  The array predSamplesLN$_L$ is derived by invoking the fractional sample interpolation process specified in clause 8.5.6.3 with the luma location (xCb, yCb), the luma coding block width sbWidth set equal to cbWidth, the luma coding block height sbHeight set equal to cbHeight, the motion vector offset mvOffset set equal to (0, 0), the motion vector mvLX set equal to mvN and the reference array refPicLX$_L$ set equal to refPicLN$_L$, the variable bdofFlag set euqal to FALSE, the variable cIdx is set equal to 0, and RefPicScale[predListFlagN][refIdxN] as inputs.
  The array predSamplesLN$_{Cb}$ is derived by invoking the fractional sample interpolation process specified in clause 8.5.6.3 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cb}$ set equal to refPicLN$_{Cb}$, the variable bdofFlag set euqal to FALSE, the variable cIdx is set equal to 1, and RefPicScale[predListFlagN][refIdxN] as inputs.
  The array predSamplesLN$_{Cr}$ is derived by invoking the fractional sample interpolation process specified in clause 8.5.6.3 with the luma location (xCb, yCb), the coding block width sbWidth set equal to cbWidth/

SubWidthC, the coding block height sbHeight set equal to cbHeight/SubHeightC, the motion vector offset mvOffset set equal to (0, 0), the motion vector mvLX set equal to mvCN, and the reference array refPicLX$_{Cr}$ set equal to refPicLN$_{Cr}$, the variable bdofFlag set euqal to FALSE, the variable cIdx is set equal to 2, and RefPicScale[predListFlagN][refIdxN] as inputs.

2. The value of merge_geo_partition_idx'[xCb][yCb] are set according to the value of merge_geo_partition_idx [xCb][yCb] and the coding block width cbWidth and the coding block height cbHeight, as specified in Table xx.

3. The partition angle and distance of merge geo mode variable angleIdx and distanceIdx are set according to the value of merge_geo_parition_idx'[xCb][yCb] as specified in Table 36.

7. The motion vector storing process for merge geo mode specified in clause 8.5.7.3 is invoked with the luma coding block location (xCb, yCb), the luma coding block width cbWidth, the luma coding block height cbHeight, the partition direction angleIdx and distanceIdx, the luma motion vectors mvA and mvB, the reference indices refIdxA and refIdxB, and the prediction list flags predListFlagA and predListFlagB as inputs.

FIG. 24 shows a mapping table of the geo_partition_idx' values based on the geo_partition_idx value. FIG. 25 shows an old Table 36 that is deleted from the relevant working draft and FIG. 26 shows newly suggested Table 36 that is accordingly changed in the relevant working draft. Table 36 shows a specification of the angleIdx and distanceIdx values based on the geo_partition_idx value.

TABLE 123

| Syntax elements and associated binarizations | | | |
|---|---|---|---|
| merge_data( ) | regular_merge_flag[ ][ ] | FL | cMax = 1 |
| | mmvd_merge_flag[ ][ ] | FL | cMax = 1 |
| | mmvd_cand_flag[ ][ ] | FL | cMax = 1 |
| | mmvd_distance_idx[ ][ ] | TR | cMax = 7, cRiceParam = 0 |
| | mmvd_direction_idx[ ][ ] | FL | cMax = 3 |
| | ciip_flag[ ][ ] | FL | cMax = 1 |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | merge_geo_partition_idx[ ][ ] | TB | cMax = [[82]] 32 |
| | merge_geo_idx0[ ][ ] | TR | cMax = MaxNumGeoMergeCand − 1, cRiceParam = 0 |
| | merge_geo_idx1[ ][ ] | TR | cMax = MaxNumGeoMergeCand − 2, cRiceParam = 0 |
| | merge_idx[ ][ ] | TR | cMax = ( CuPredMode[ 0 ][ x0 ][ y0 ] != MODE_IBC ? MaxNumMergeCand : MaxNumIbcMergeCand ) − 1, cRiceParam = 0 |

4. The prediction samples inside the current luma coding block, predSamples$_L$[x$_L$][y$_L$] with x$_L$=0 . . . cbWidth−1 and y$_L$=0 . . . cbHeight−1, are derived by invoking the weighted sample prediction process for geo merge mode specified in clause 8.5.7.2 with the coding block width nCbW set equal to cbWidth, the coding block height nCbH set equal to cbHeight, the sample arrays predSamplesLA$_L$ and predSamplesLB$_L$, and the variables angleIdx and distanceIdx, and cIdx equal to 0 as inputs.

5. The prediction samples inside the current chroma component Cb coding block, predSamples$_{Cb}$[x$_C$][y$_C$] with x$_C$=0 . . . cbWidth/SubWidthC−1 and y$_C$=0 . . . cbHeight/SubHeightC−1, are derived by invoking the weighted sample prediction process for geo merge mode specified in clause 8.5.7.2 with the coding block width nCbW set equal to cbWidth/SubWidthC, the coding block height nCbH set equal to cbHeight/SubHeightC, the sample arrays predSamplesLA$_{Cb}$ and predSamplesLB$_{Cb}$, and the variables angleIdx and distanceIdx, and cIdx equal to 1 as inputs.

6. The prediction samples inside the current chroma component Cr coding block, predSamples$_{Cr}$[x$_C$][y$_C$] with x$_C$=0 . . . cbWidth/SubWidthC−1 and y$_C$=0 . . . cbHeight/SubHeightC−1, are derived by invoking the weighted sample prediction process for geo merge mode specified in clause 8.5.7.2 with the coding block width nCbW set equal to cbWidth/SubWidthC, the coding block height nCbH set equal to cbHeight/SubHeightC, the sample arrays predSamplesLA$_{Cr}$ and predSamplesLB$_{Cr}$, and the variables angleIdx and distanceIdx, and cIdx equal to 2 as inputs.

An Example Embodiment: Block Size Dependent GEO Mode Selection 8.5.7 Decoding process for geo inter blocks 8.5.7.1 General This process is invoked when decoding a coding unit with MergeGeoFlag[xCb][yCb] equal to 1.

Inputs to this process are:
  a luma location (xCb, yCb) specifying the top-left sample of the current coding block relative to the top-left luma sample of the current picture,
  a variable cbWidth specifying the width of the current coding block in luma samples,
  a variable cbHeight specifying the height of the current coding block in luma samples,
  the luma motion vectors in 1/16 fractional-sample accuracy mvA and mvB,
  the chroma motion vectors mvCA and mvCB,
  the reference indices refIdxA and refIdxB,
  the prediction list flags predListFlagA and predListFlagB.

Outputs of this process are:
  an (cbWidth)×(cbHeight) array predSamples$_L$ of luma prediction samples,
  an (cbWidth/SubWidthC)×(cbHeight/SubHeightC) array predSamples$_{Cb}$ of chroma prediction samples for the component Cb,
  an (cbWidth/SubWidthC)×(cbHeight/SubHeightC) array predSamples$_{Cr}$ of chroma prediction samples for the component Cr.

Let predSamplesLA$_L$ and predSamplesLB$_L$ be (cbWidth)×(cbHeight) arrays of predicted luma sample values and, predSamplesLA$_{Cb}$, predSamplesLB$_{Cb}$, predSamplesLA$_{Cr}$ and predSamplesLB$_{Cr}$ be (cbWidth/SubWidthC)×(cbHeight/SubHeightC) arrays of predicted chroma sample values.

The predSamples$_L$, predSamples$_{Cb}$ and predSamples$_{Cr}$ are derived by the following ordered steps:

1. For N being each of A and B, the following applies:

The reference picture consisting of an ordered two-dimensional array refPicLN$_L$ of luma samples and two ordered two-dimensional arrays refPicLN$_{Cb}$ and refPicLN$_{Cr}$ of chroma samples is derived by invoking the process specified in clause 8.5.6.2 with X set equal to predListFlagN and refIdxX set equal to refIdxN as input.

The array predSamplesLN$_L$ is derived by invoking the fractional sample interpolation process specified in clause 8.5.6.3 with the luma location (xCb, yCb), the luma coding block width sbWidth set equal to cbWidth, the luma coding block height sbHeight set equal to cbHeight, the motion vector offset mvOffset set equal to (0, 0), the motion vector mvLX set equal to mvN and the reference array refPicLX$_L$ set equal to refPicLN$_L$, the variable bdofFlag set euqal to FALSE, the variable cIdx is set equal to 0, and RefPicScale[predListFlagN][refIdxN] as inputs.

The array predSamplesLN$_{Cb}$ is derived by invoking the fractional sample interpolation process specified in clause 8.5.6.3 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cb}$ set equal to refPicLN$_{Cb}$, the variable bdofFlag set euqal to FALSE, the variable cIdx is set equal to 1, and RefPicScale[predListFlagN][refIdxN] as inputs.

The array predSamplesLN$_{Cr}$ is derived by invoking the fractional sample interpolation process specified in clause 8.5.6.3 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cr}$ set equal to refPicLN$_{Cr}$, the variable bdofFlag set euqal to FALSE, the variable cIdx is set equal to 2, and RefPicScale[predListFlagN][refIdxN] as inputs.

2. The partition angle and distance of merge geo mode variable angleIdx and distanceIdx are set according to the value of merge_geo_parition_idx[xCb][yCb] as specified in Table 36.

3. The prediction samples inside the current luma coding block, predSamples$_L$[x$_L$][y$_L$] with x$_L$=0 ... cbWidth−1 and y$_L$=0 ... cbHeight−1, are derived by invoking the weighted sample prediction process for geo merge mode specified in clause 8.5.7.2 with the coding block width nCbW set equal to cbWidth, the coding block height nCbH set equal to cbHeight, the sample arrays predSamplesLA$_L$ and predSamplesLB$_L$, and the variables angleIdx and distanceIdx, and cIdx equal to 0 as inputs.

4. The prediction samples inside the current chroma component Cb coding block, predSamples$_{Cb}$[x$_C$][y$_C$] with x$_C$=0 ... cbWidth/SubWidthC−1 and y$_C$=0 ... cbHeight/SubHeightC−1, are derived by invoking the weighted sample prediction process for geo merge mode specified in clause 8.5.7.2 with the coding block width nCbW set equal to cbWidth/SubWidthC, the coding block height nCbH set equal to cbHeight/SubHeightC, the sample arrays predSamplesLA$_{Cb}$ and predSamplesLB$_{Cb}$, and the variables angleIdx and distanceIdx, and cIdx equal to 1 as inputs.

5. The prediction samples inside the current chroma component Cr coding block, predSamples$_{Cr}$[x$_C$][y$_C$] with x$_C$=0 ... cbWidth/SubWidthC−1 and y$_C$=0 ... cbHeight/SubHeightC−1, are derived by invoking the weighted sample prediction process for geo merge mode specified in clause 8.5.7.2 with the coding block width nCbW set equal to cbWidth/SubWidthC, the coding block height nCbH set equal to cbHeight/SubHeightC, the sample arrays predSamplesLA$_{Cr}$ and predSamplesLB$_{Cr}$, and the variables angleIdx and distanceIdx, and cIdx equal to 2 as inputs.

6. The motion vector storing process for merge geo mode specified in clause 8.5.7.3 is invoked with the luma coding block location (xCb, yCb), the luma coding block width cbWidth, the luma coding block height cbHeight, the partition direction angleIdx and distanceIdx, the luma motion vectors mvA and mvB, the reference indices refIdxA and refIdxB, and the prediction list flags predListFlagA and predListFlagB as inputs.

FIG. 26 shows an old Table 36 that is deleted from the relevant working draft and FIG. 28 shows newly suggested Table 36 that is accordingly changed in the relevant working draft. Table 36 shows a specification of the angleIdx and distanceIdx values based on the geo_partition_idx value. In Table 36 as shown in FIG. 28, hwRatio=cbHeight>cbWidth ? 1:0

| geo_partition_idx | 0 | 0 | 1 | 1 | 2 | 2 | 3 | 3 | 4 | 4 | 5 | 5 | 6 | 6 | 7 | 7 | 8 | 8 |
|---|---|---|---|---|---|---|---|---|---|---|---|---|---|---|---|---|---|---|
| hwRatio | 0 | 1 | 0 | 1 | 0 | 1 | 0 | 1 | 0 | 1 | 0 | 1 | 0 | 1 | 0 | 1 | 0 | 1 |
| angleIdx | 18 | 12 | 6 | 0 | 12 | 0 | 16 | 1 | 20 | 12 | 2 | 2 | 0 | 2 | 4 | 1 | 4 | 2 |
| distanceIdx | 1 | 1 | 1 | 3 | 3 | 1 | 1 | 3 | 3 | 3 | 3 | 0 | 3 | 2 | 0 | 1 | 1 | 3 |
| geo_partition_idx | 9 | 9 | 10 | 10 | 11 | 11 | 12 | 12 | 13 | 13 | 14 | 14 | 15 | 15 | 16 | 16 | 17 | 17 |
| hwRatio | 0 | 1 | 0 | 1 | 0 | 1 | 0 | 1 | 0 | 1 | 0 | 1 | 0 | 1 | 0 | 1 | 0 | 1 |
| angleIdx | 6 | 1 | 14 | 1 | 8 | 2 | 16 | 3 | 22 | 14 | 16 | 3 | 18 | 3 | 3 | 11 | 3 | 13 |
| distanceIdx | 3 | 0 | 3 | 2 | 0 | 1 | 2 | 0 | 3 | 3 | 3 | 1 | 3 | 3 | 0 | 2 | 1 | 3 |
| geo_partition_idx | 18 | 18 | 19 | 19 | 20 | 20 | 21 | 21 | 22 | 22 | 23 | 23 | 24 | 24 | 25 | 25 | 26 | 26 |
| whRatio | 0 | 1 | 0 | 1 | 0 | 1 | 0 | 1 | 0 | 1 | 0 | 1 | 0 | 1 | 0 | 1 | 0 | 1 |
| angleIdx | 9 | 14 | 20 | 14 | 20 | 22 | 4 | 3 | 8 | 9 | 9 | 10 | 0 | 22 | 10 | 4 | 2 | 8 |
| distanceIdx | 0 | 1 | 1 | 2 | 2 | 1 | 3 | 2 | 2 | 0 | 2 | 1 | 1 | 3 | 3 | 3 | 2 | 3 |
| geo_partition_idx | 27 | 27 | 28 | 28 | 29 | 29 | 30 | 30 | 31 | 31 | | | | | | | | |
| hwRatio | 0 | 1 | 0 | 1 | 0 | 1 | 0 | 1 | 0 | 1 | | | | | | | | |
| angleIdx | 3 | 11 | 9 | 22 | 12 | 23 | 14 | 6 | 15 | 10 | | | | | | | | |
| distancIdx | 2 | 3 | 3 | 2 | 1 | 3 | 1 | 3 | 3 | 3 | | | | | | | | |

TABLE 123

Syntax elements and associated binarizations

| | | | |
|---|---|---|---|
| merge_data( ) | regular_merge_flag[ ][ ] | FL | cMax = 1 |
| | mmvd_merge_flag[ ][ ] | FL | cMax = 1 |
| | mmvd_cand_flag[ ][ ] | FL | cMax = 1 |
| | mmvd_distance_idx[ ][ ] | TR | cMax = 7, cRiceParam = 0 |
| | mmvd_direction_idx[ ][ ] | FL | cMax = 3 |
| | ciip_flag[ ][ ] | FL | cMax = 1 |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | merge_geo_partition_idx[ ][ ] | TB | cMax = [[82]] 32 |
| | merge_geo_idx0[ ][ ] | TR | cMax = MaxNumGeoMergeCand − 1, cRiceParam = 0 |
| | merge_geo_idx1[ ][ ] | TR | cMax = MaxNumGeoMergeCand − 2, cRiceParam = 0 |
| | merge_idx[ ][ ] | TR | cMax = ( CuPredMode[ 0 ][ x0 ][ y0 ] != MODE_IBC ? MaxNumMergeCand : MaxNumIbcMergeCand ) − 1, cRiceParam = 0 |

An Example Embodiment: Block Size Dependent GEO Mode Selection 7.3.2.3 Sequence Parameter Set RBSP Syntax

| | Descriptor |
|---|---|
| seq_parameter_set_rbsp( ) { | |
|   sps_decoding_parameter_set_id | u(4) |
|   sps_video_parameter_set_id | u(4) |
|   .. | |
|   sps_ciip_enabled_flag | u(1) |
|   if( sps_mmvd_enabled_flag) | |
|     sps_fpel_mmvd_enabled_flag | u(1) |
|   sps_geo_enabled_flag | u(1) |
|   <u>if( sps_geo_enabled_flag )</u> | |
|     <u>sps_16_modes_geo_enabled_flag</u> | <u>u(1)</u> |
|   sps_lmcs_enabled_flag | u(1) |
|   sps_lfnst_enabled_flag | u(1) |
|   ... | |
|   rbsp_trailing_bits( ) | |
| } | | sps_16_modes_geo_enabled_flag equal to 1 specifies that 16 modes geo is used.

sps_16_modes_geo_enabled_flag equal to 0 specifies that 32 modes geo is used.

7.4.10.7 Merge Data Semantics merge_geo_partition_idx[x0][y0] specifies the geometric splitting direction of the merge geometric mode. The array indices x0, y0 specify the location (x0, y0) of the top-left luma sample of the considered coding block relative to the top-left luma sample of the picture.

When merge_geo_partition_idx[x0][y0] is not present, it is inferred to be equal to 0.

It is constraint that the maximum value of merge_geo_partition_idx should be less than sps_16_modes_geo_enabled_flag ? 16:32.

8.5.7 Decoding Process for Geo Inter Blocks 8.5.7.1 General

This process is invoked when decoding a coding unit with MergeGeoFlag[xCb][yCb] equal to 1.

Inputs to this process are:
- a luma location (xCb, yCb) specifying the top-left sample of the current coding block relative to the top-left luma sample of the current picture,
- a variable cbWidth specifying the width of the current coding block in luma samples,
- a variable cbHeight specifying the height of the current coding block in luma samples,
- the luma motion vectors in 1/16 fractional-sample accuracy mvA and mvB,
- the chroma motion vectors mvCA and mvCB,
- the reference indices refIdxA and refIdxB,
- the prediction list flags predListFlagA and predListFlagB.

Outputs of this process are:
- an (cbWidth)×(cbHeight) array predSamples$_L$ of luma prediction samples,
- an (cbWidth/SubWidthC)×(cbHeight/SubHeightC) array predSamples$_{Cb}$ of chroma prediction samples for the component Cb,
- an (cbWidth/SubWidthC)×(cbHeight/SubHeightC) array predSamples$_{Cr}$ of chroma prediction samples for the component Cr.

Let predSamplesLA$_L$ and predSamplesLB$_L$ be (cbWidth)×(cbHeight) arrays of predicted luma sample values and, predSamplesLA$_{Cb}$, predSamplesLB$_{Cb}$, predSamplesLA$_{Cr}$ and predSamplesLB$_{Cr}$ be (cbWidth/SubWidthC)×(cbHeight/SubHeightC) arrays of predicted chroma sample values.

The predSamples$_L$, predSamples$_{Cb}$ and predSamples$_{Cr}$ are derived by the following ordered steps:

1. For N being each of A and B, the following applies:
   The reference picture consisting of an ordered two-dimensional array refPicLN$_L$ of luma samples and two ordered two-dimensional arrays refPicLN$_{Cb}$ and refPicLN$_{Cr}$ of chroma samples is derived by invoking the process specified in clause 8.5.6.2 with X set equal to predListFlagN and refIdxX set equal to refIdxN as input.
   The array predSamplesLN$_L$ is derived by invoking the fractional sample interpolation process specified in clause 8.5.6.3 with the luma location (xCb, yCb), the luma coding block width sbWidth set equal to cbWidth, the luma coding block height sbHeight set equal to cbHeight, the motion vector offset mvOffset set equal to (0, 0), the motion vector mvLX set equal to mvN and the reference array refPicLX$_L$ set equal to refPicLN$_L$, the variable bdofFlag set euqal to FALSE, the variable cIdx is set equal to 0, and RefPicScale[predListFlagN][refIdxN] as inputs.
   The array predSamplesLN$_{Cb}$ is derived by invoking the fractional sample interpolation process specified in clause 8.5.6.3 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cb}$ set equal to refPicLN$_{Cb}$, the variable bdofFlag set euqal to FALSE, the variable cIdx is set equal to 1, and RefPicScale[predListFlagN][refIdxN] as inputs.
   The array predSamplesLN$_{Cr}$ is derived by invoking the fractional sample interpolation process specified in clause 8.5.6.3 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cr}$ set equal to refPicLN$_{Cr}$, the variable bdofFlag set euqal to FALSE, the variable cIdx is set equal to 2, and RefPicScale[predListFlagN][refIdxN] as inputs.

2. The value of merge_geo_partition_idx'[xCb][yCb] are set according to the value of merge_geo_partition_idx[xCb][yCb] and the coding block width cbWidth and the coding block height cbHeight, as specified in Table xx.

3. The partition angle and distance of merge geo mode variable angleIdx and distanceIdx are set according to the value of merge_geo_parition_idx'[xCb][yCb] as specified in Table 36.

4. The prediction samples inside the current luma coding block, predSamples$_L$[x$_L$][y$_L$] with x$_L$=0 ... cbWidth−1 and y$_L$=0 ... cbHeight−1, are derived by invoking the weighted sample prediction process for geo merge mode specified in clause 8.5.7.2 with the coding block width nCbW set equal to cbWidth, the coding block height nCbH set equal to cbHeight, the sample arrays predSamplesLA$_L$ and predSamplesLB$_L$, and the variables angleIdx and distanceIdx, and cIdx equal to 0 as inputs.

5. The prediction samples inside the current chroma component Cb coding block, predSamples$_{Cb}$[x$_C$][y$_C$] with x$_C$=0 ... cbWidth/SubWidthC−1 and y$_C$=0 ... cbHeight/SubHeightC−1, are derived by invoking the weighted sample prediction process for geo merge mode specified in clause 8.5.7.2 with the coding block width nCbW set equal to cbWidth/SubWidthC, the coding block height nCbH set equal to cbHeight/SubHeightC, the sample arrays predSamplesLA$_{Cb}$ and predSamplesLB$_{Cb}$, and the variables angleIdx and distanceIdx, and cIdx equal to 1 as inputs.

6. The prediction samples inside the current chroma component Cr coding block, predSamples$_{Cr}$[x$_C$][y$_C$] with x$_C$=0 ... cbWidth/SubWidthC−1 and y$_C$=0 ... cbHeight/SubHeightC−1, are derived by invoking the weighted sample prediction process for geo merge mode specified in clause 8.5.7.2 with the coding block width nCbW set equal to cbWidth/SubWidthC, the coding block height nCbH set equal to cbHeight/SubHeightC, the sample arrays predSamplesLA$_{Cr}$ and predSamplesLB$_{Cr}$, and the variables angleIdx and distanceIdx, and cIdx equal to 2 as inputs.

7. The motion vector storing process for merge geo mode specified in clause 8.5.7.3 is invoked with the luma coding block location (xCb, yCb), the luma coding block width cbWidth, the luma coding block height cbHeight, the partition direction angleIdx and distanceIdx, the luma motion vectors mvA and mvB, the reference indices refIdxA and refIdxB, and the prediction list flags predListFlagA and predListFlagB as inputs.

FIG. 24 shows a mapping table of the geo_partition_idx' values based on the geo_partition_idx value.

FIG. 25 shows an old Table 36 that is deleted from the relevant working draft and FIG. 28 shows newly suggested Table 36 that is accordingly changed in the relevant working draft. Table 36 shows a specification of the angleIdx and distanceIdx values based on the geo_partition_idx value.

TABLE 123

| Syntax elements and associated binarizations | | |
|---|---|---|
| merge_data( ) regular_merge_flag[ ][ ] | FL | cMax = 1 |
| mmvd_merge_flag[ ][ ] | FL | cMax = 1 |
| mmvd_cand_flag[ ][ ] | FL | cMax = 1 |
| mmvd_distance_idx[ ][ ] | TR | cMax = 7, cRiceParam = 0 |
| mmvd_direction_idx[ ][ ] | FL | cMax = 3 |
| ciip_flag[ ][ ] | FL | cMax = 1 |
| merge_subblock_flag[ ][ ] | FL | cMax = 1 |
| merge_subblock_idx[ ][ ] | TR | cMax = MaxNumSubblockMergeCand − 1, cRiceParam = 0 |
| merge_geo_partition_idx[ ][ ] | TB | cMax = ~~82~~ (sps_16_modes_geo_enabled_flag ? 16 : 32) |
| merge_geo_idx0[ ][ ] | TR | cMax = MaxNumGeoMergeCand − 1, cRiceParam = 0 |
| merge_geo_idx1[ ][ ] | TR | cMax = MaxNumGeoMergeCand − 2, cRiceParam = 0 |
| merge_idx[ ][ ] | TR | cMax = ( CuPredMode[ 0 ][ x0 ][ y0 ] != MODE_IBC ? MaxNumMergeCand : MaxNumIbcMergeCand ) − 1, cRiceParam = 0 |

An Example Embodiment: Block Size Dependent GEO Mode Selection 7.3.2.3 Sequence Parameter Set RBSP Syntax

| | Descriptor |
|---|---|
| seq_parameter_set_rbsp( ) { | |
| sps_decoding_parameter_set_id | u(4) |
| sps_video_parameter_set_id | u(4) |
| .. | |
| sps_ciip_enabled_flag | u(1) |
| if( sps_mmvd_enabled_flag ) | |
| sps_fpel_mmvd_enabled_flag | u(1) |
| sps_geo_enabled_flag | u(1) |
| if( sps_geo_enabled_flag ) | |
| sps_16_modes_geo_enabled_flag | u(1) |
| sps_lmcs_enabled_flag | u(1) |
| sps_lfnst_enabled_flag | u(1) |
| ... | |
| rbsp_trailing_bits( ) | |
| } | | sps_16_modes_geo_enabled_flag equal to 1 specifies that 16 modes geo is used for specified blocks.

sps_16_modes_geo_enabled_flag equal to 0 specifies that 32 modes geo is used for specified blocks.

7.4.10.7 Merge Data Semantics merge_geo_partition_idx[x0][y0] specifies the geometric splitting direction of the merge geometric mode. The array indices x0, y0 specify the location (x0, y0) of the top-left luma sample of the considered coding block relative to the top-left luma sample of the picture.

When merge_geo_partition_idx[x0][y0] is not present, it is inferred to be equal to 0.

It is constraint that the maximum value of merge_geo_partition_idx should be less than (sps 16 modes geo enabled flag && cbWidth>=cbHeight)? 16:32.

8.5.7 Decoding Process for Geo Inter Blocks 8.5.7.1 General

This process is invoked when decoding a coding unit with MergeGeoFlag[xCb][yCb] equal to 1.

Inputs to this process are:
- a luma location (xCb, yCb) specifying the top-left sample of the current coding block relative to the top-left luma sample of the current picture,
- a variable cbWidth specifying the width of the current coding block in luma samples,
- a variable cbHeight specifying the height of the current coding block in luma samples,
- the luma motion vectors in 1/16 fractional-sample accuracy mvA and mvB,
- the chroma motion vectors mvCA and mvCB,
- the reference indices refIdxA and refIdxB,
- the prediction list flags predListFlagA and predListFlagB.

Outputs of this process are:
- an (cbWidth)×(cbHeight) array predSamples$_L$ of luma prediction samples,
- an (cbWidth/SubWidthC)×(cbHeight/SubHeightC) array predSamples$_{Cb}$ of chroma prediction samples for the component Cb,
- an (cbWidth/SubWidthC)×(cbHeight/SubHeightC) array predSamples$_{Cr}$ of chroma prediction samples for the component Cr.

Let predSamplesLA$_L$ and predSamplesLB$_L$ be (cbWidth)×(cbHeight) arrays of predicted luma sample values and, predSamplesLA$_{Cb}$, predSamplesLB$_{Cb}$, predSamplesLA$_{Cr}$ and predSamplesLB$_{Cr}$ be (cbWidth/SubWidthC)×(cbHeight/SubHeightC) arrays of predicted chroma sample values.

The predSamples$_L$, predSamples$_{Cb}$ and predSamples$_{Cr}$ are derived by the following ordered steps:

1. For N being each of A and B, the following applies:
   - The reference picture consisting of an ordered two-dimensional array refPicLN$_L$ of luma samples and two ordered two-dimensional arrays refPicLN$_{Cb}$ and refPicLN$_{Cr}$ of chroma samples is derived by invoking the process specified in clause 8.5.6.2 with X set equal to predListFlagN and refIdxX set equal to refIdxN as input.
   - The array predSamplesLN$_L$ is derived by invoking the fractional sample interpolation process specified in clause 8.5.6.3 with the luma location (xCb, yCb), the luma coding block width sbWidth set equal to cbWidth, the luma coding block height sbHeight set equal to cbHeight, the motion vector offset mvOffset set equal to (0, 0), the motion vector mvLX set equal to mvN and the reference array refPicLX$_L$ set equal to refPicLN$_L$, the variable bdofFlag set euqal to FALSE, the variable cIdx is set equal to 0, and RefPicScale[predListFlagN][refIdxN] as inputs.
   - The array predSamplesLN$_{Cb}$ is derived by invoking the fractional sample interpolation process specified in clause 8.5.6.3 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cb}$ set equal to refPicLN$_{Cb}$, the variable bdofFlag set euqal to FALSE, the variable cIdx is set equal to 1, and RefPicScale[predListFlagN][refIdxN] as inputs.
   - The array predSamplesLN$_{Cr}$ is derived by invoking the fractional sample interpolation process specified in clause 8.5.6.3 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cr}$ set equal to refPicLN$_{Cr}$, the variable bdofFlag set euqal to FALSE, the variable cIdx is set equal to 2, and RefPicScale[predListFlagN][refIdxN] as inputs.

2. The value of merge_geo_partition_idx'[xCb][yCb] are set according to the value of merge_geo_partition_idx [xCb][yCb] and the coding block width cbWidth and the coding block height cbHeight, as specified in Table xx.

3. The partition angle and distance of merge geo mode variable angleIdx and distanceIdx are set according to the value of merge_geo_parition_idx'[xCb][yCb] as specified in Table 36.

4. The prediction samples inside the current luma coding block, predSamples$_L$[x$_L$][y$_L$] with x$_L$=0 ... cbWidth−1 and y$_L$=0 ... cbHeight−1, are derived by invoking the weighted sample prediction process for geo merge mode specified in clause 8.5.7.2 with the coding block width nCbW set equal to cbWidth, the coding block height nCbH set equal to cbHeight, the sample arrays predSamplesLA$_L$ and predSamplesLB$_L$, and the variables angleIdx and distanceIdx, and cIdx equal to 0 as inputs.

5. The prediction samples inside the current chroma component Cb coding block, predSamples$_{Cb}$[x$_C$][y$_C$] with x$_C$=0 ... cbWidth/SubWidthC−1 and y$_C$=0 ... cbHeight/SubHeightC−1, are derived by invoking the weighted sample prediction process for geo merge mode specified in clause 8.5.7.2 with the coding block width nCbW set equal to cbWidth/SubWidthC, the coding block height nCbH set equal to cbHeight/SubHeightC, the sample arrays predSamplesLA$_{Cb}$ and predSamplesLB$_{Cb}$, and the variables angleIdx and distanceIdx, and cIdx equal to 1 as inputs.

6. The prediction samples inside the current chroma component Cr coding block, predSamples$_{Cr}$[x$_C$][y$_C$] with x$_C$=0 ... cbWidth/SubWidthC−1 and y$_C$=0 ... cbHeight/SubHeightC−1, are derived by invoking the weighted sample prediction process for geo merge mode specified in clause 8.5.7.2 with the coding block width nCbW set equal to cbWidth/SubWidthC, the coding block height nCbH set equal to cbHeight/SubHeightC, the sample arrays predSamplesLA$_{Cr}$ and predSamplesLB$_{Cr}$, and the variables angleIdx and distanceIdx, and cIdx equal to 2 as inputs.

7. The motion vector storing process for merge geo mode specified in clause 8.5.7.3 is invoked with the luma coding block location (xCb, yCb), the luma coding block width cbWidth, the luma coding block height cbHeight, the partition direction angleIdx and distanceIdx, the luma motion vectors mvA and mvB, the reference indices refIdxA and refIdxB, and the prediction list flags predListFlagA and predListFlagB as inputs.

FIG. 24 shows a mapping table of the geo_partition_idx' values based on the geo_partition_idx value. FIG. 25 shows an old Table 36 that is deleted from the relevant working draft and FIG. 29 shows newly suggested Table 36 that is accordingly changed in the relevant working draft. Table 36 shows a specification of the angleIdx and distanceIdx values based on the geo_partition_idx value.

TABLE 123

| Syntax elements and associated binarizations | | |
|---|---|---|
| merge_data( ) regular_merge_flag[ ][ ] | FL | cMax = 1 |
| mmvd_merge_flag[ ][ ] | FL | cMax = 1 |
| mmvd_cand_flag[ ][ ] | FL | cMax = 1 |
| mmvd_distance_idx[ ][ ] | TR | cMax = 7, cRiceParam = 0 |
| mmvd_direction_idx[ ][ ] | FL | cMax = 3 |
| ciip_flag[ ][ ] | FL | cMax = 1 |
| merge_subblock_flag[ ][ ] | FL | cMax = 1 |
| merge_subblock_idx[ ][ ] | TR | cMax = MaxNumSubblockMergeCand − 1, cRiceParam = 0 |
| merge_geo_partition_idx[ ][ ] | TB | cMax = [[82]] (sps_16_modes_geo_enabled_flag&&cbWidth>=cbHeight ? 16 : 32) |
| merge_geo_idx0[ ][ ] | TR | cMax = MaxNumGeoMergeCand − 1, cRiceParam = 0 |
| merge_geo_idx1[ ][ ] | TR | cMax = MaxNumGeoMergeCand − 2, cRiceParam = 0 |
| merge_idx[ ][ ] | TR | cMax = ( CuPredMode[ 0 ][ x0 ][ y0 ] = MODE_IBC ? MaxNumMergeCand : MaxNumIbcMergeCand ) − 1, cRiceParam = 0 |

An Example Embodiment: Block Size Dependent GEO Mode Selection 7.3.2.3 Sequence Parameter Set RBSP Syntax

| | Descriptor |
|---|---|
| seq_parameter_set_rbsp( ) { | |
| sps_decoding_parameter_set_id | u(4) |
| sps_video_parameter_set_id | u(4) |
| .. | |
| sps_ciip_enabled_flag | u(1) |
| if( sps_mmvd_enabled_flag ) | |
| sps_fpel_mmvd_enabled_flag | u(1) |
| sps_geo_enabled_flag | u(1) |
| if( sps_geo_enabled_flag ) | |
| sps_16_modes_geo_enabled_flag | u(1) |
| sps_lmcs_enabled_flag | u(1) |
| sps_lfnst_enabled_flag | u(1) |
| ... | |
| rbsp_trailing_bits( ) | |
| } | | sps 16 modes geo enabled flag equal to 1 specifies that 16 modes geo is used for specified blocks.

sps 16 modes geo enabled flag equal to 0 specifies that 32 modes geo is used for specified blocks.

7.4.10.7 Merge Data Semantics merge_geo_partition_idx[x0][y0] specifies the geometric splitting direction of the merge geometric mode. The array indices x0, y0 specify the location (x, y0) of the top-left luma sample of the considered coding block relative to the top-left luma sample of the picture.

When merge_geo_partition_idx[x0][y0] is not present, it is inferred to be equal to 0.

It is constraint that the maximum value of merge_geo_partition_idx should be less than (sps 16 modes geo enabled flag && cbWidth>=cbHeight)? 16:32.

8.5.7 Decoding Process for Geo Inter Blocks 8.5.7.1 General

This process is invoked when decoding a coding unit with MergeGeoFlag[xCb][yCb] equal to 1.

Inputs to this process are:
- a luma location (xCb, yCb) specifying the top-left sample of the current coding block relative to the top-left luma sample of the current picture,
- a variable cbWidth specifying the width of the current coding block in luma samples,
- a variable cbHeight specifying the height of the current coding block in luma samples,
- the luma motion vectors in 1/16 fractional-sample accuracy mvA and mvB,
- the chroma motion vectors mvCA and mvCB,
- the reference indices refIdxA and refIdxB,
- the prediction list flags predListFlagA and predListFlagB.

Outputs of this process are:
- an (cbWidth)×(cbHeight) array predSamples$_L$ of luma prediction samples,
- an (cbWidth/SubWidthC)×(cbHeight/SubHeightC) array predSamples$_{Cb}$ of chroma prediction samples for the component Cb,
- an (cbWidth/SubWidthC)×(cbHeight/SubHeightC) array predSamples$_{Cr}$ of chroma prediction samples for the component Cr.

Let predSamplesLA$_L$ and predSamplesLB$_L$ be (cbWidth)×(cbHeight) arrays of predicted luma sample values and, predSamplesLA$_{Cb}$, predSamplesLB$_{Cb}$, predSamplesLA$_{Cr}$ and predSamplesLB$_{Cr}$ be (cbWidth/SubWidthC)×(cbHeight/SubHeightC) arrays of predicted chroma sample values.

The predSamples$_L$, predSamples$_{Cb}$ and predSamples$_{Cr}$ are derived by the following ordered steps:

8. For N being each of A and B, the following applies:

The reference picture consisting of an ordered two-dimensional array refPicLN$_L$ of luma samples and two ordered two-dimensional arrays refPicLN$_{Cb}$ and refPicLN$_{Cr}$ of chroma samples is derived by invoking the process specified in clause 8.5.6.2 with X set equal to predListFlagN and refIdxX set equal to refIdxN as input.

The array predSamplesLN$_L$ is derived by invoking the fractional sample interpolation process specified in clause 8.5.6.3 with the luma location (xCb, yCb), the luma coding block width sbWidth set equal to cbWidth, the luma coding block height sbHeight set equal to cbHeight, the motion vector offset mvOffset set equal to (0, 0), the motion vector mvLX set equal to mvN and the reference array refPicLX$_L$ set equal to refPicLN$_L$, the variable bdofFlag set euqal to FALSE, the variable cIdx is set equal to 0, and RefPicScale[predListFlagN][refIdxN] as inputs.

The array predSamplesLN$_{Cb}$ is derived by invoking the fractional sample interpolation process specified in clause 8.5.6.3 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cb}$ set equal to refPicLN$_{Cb}$, the variable bdofFlag set euqal to FALSE, the variable cIdx is set equal to 1, and RefPicScale[predListFlagN][refIdxN] as inputs.

The array predSamplesLN$_{Cr}$ is derived by invoking the fractional sample interpolation process specified in clause 8.5.6.3 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cr}$ set equal to refPicLN$_{Cr}$, the variable bdofFlag set euqal to FALSE, the variable cIdx is set equal to 2, and RefPicScale[predListFlagN][refIdxN] as inputs.

9. If sps 16 modes geo enabled flag is equal to 1 and cbWidth is greater than or equal to cbHeight and merge_geo_partition_idx[xCb][yCb] is larger than X (for example, X=13), the value of merge_geo_partition_idx'[xCb][yCb] are set according to follows, If merge_geo_partition_idx[xCb][yCb] is equal to XX (for example, XX=14), merge_geo_partition_idx[xCb][yCb] is set to YY (for example, YY=10).

If merge_geo_partition_idx[xCb][yCb] is equal to XXX (for example, XX=15), merge_geo_partition_idx[xCb][yCb] is set to YYY (for example, YYY=24).

Otherwise, The value of merge_geo_partition_idx'[xCb][yCb] are set according to the value of merge_geo_partition_idx[xCb][yCb] and the coding block width cbWidth and the coding block height cbHeight, as specified in Table xx.

10. The partition angle and distance of merge geo mode variable angleIdx and distanceIdx are set according to the value of merge_geo_parition_idx'[xCb][yCb] as specified in Table 36.

11. The prediction samples inside the current luma coding block, predSamples$_L$[x$_L$][y$_L$] with x$_L$=0 . . . cbWidth-1 and y$_L$=0 . . . cbHeight-1, are derived by invoking the weighted sample prediction process for geo merge mode specified in clause 8.5.7.2 with the coding block width nCbW set equal to cbWidth, the coding block height nCbH set equal to cbHeight, the sample arrays predSamplesLA$_L$ and predSamplesLB$_L$, and the variables angleIdx and distanceIdx, and cIdx equal to 0 as inputs.

12. The prediction samples inside the current chroma component Cb coding block, predSamples$_{Cb}$[x$_C$][y$_C$] with x$_C$=0 . . . cbWidth/SubWidthC-1 and y$_C$=0 . . . cbHeight/SubHeightC-1, are derived by invoking the weighted sample prediction process for geo merge mode specified in clause 8.5.7.2 with the coding block width nCbW set equal to cbWidth/SubWidthC, the coding block height nCbH set equal to cbHeight/SubHeightC, the sample arrays predSamplesLA$_{Cb}$ and predSamplesLB$_{Cb}$, and the variables angleIdx and distanceIdx, and cIdx equal to 1 as inputs.

13. The prediction samples inside the current chroma component Cr coding block, predSamples$_{Cr}$[x$_C$][y$_C$] with x$_C$=0 . . . cbWidth/SubWidthC-1 and y$_C$=0 . . . cbHeight/SubHeightC-1, are derived by invoking the weighted sample prediction process for geo merge mode specified in clause 8.5.7.2 with the coding block width nCbW set equal to cbWidth/SubWidthC, the coding block height nCbH set equal to cbHeight/SubHeightC, the sample arrays predSamplesLA$_{Cr}$ and predSamplesLB$_{Cr}$, and the variables angleIdx and distanceIdx, and cIdx equal to 2 as inputs.

14. The motion vector storing process for merge geo mode specified in clause 8.5.7.3 is invoked with the luma coding block location (xCb, yCb), the luma coding block width cbWidth, the luma coding block height cbHeight, the partition direction angleIdx and distanceIdx, the luma motion vectors mvA and mvB, the reference indices refIdxA and refIdxB, and the prediction list flags predListFlagA and predListFlagB as inputs.

FIG. 24 shows a mapping table of the geo_partition_idx' values based on the geo_partition_idx value. FIG. 25 shows an old Table 36 that is deleted from the relevant working draft and FIG. 30 shows newly suggested Table 36 that is accordingly changed in the relevant working draft. Table 36 shows a specification of the angleIdx and distanceIdx values based on the geo_partition_idx value.

TABLE 123

| Syntax elements andassociatedbinarizations | | | |
|---|---|---|---|
| merge_data( ) | regular_merge_flag[ ][ ] | FL | cMax = 1 |
| | mmvd_merge_flag[ ][ ] | FL | cMax = 1 |
| | mmvd_cand_flag[ ][ ] | FL | cMax = 1 |
| | mmvd_distance_idx[ ][ ] | TR | cMax = 7, cRiceParam = 0 |
| | mmvd_direction_idx[ ][ ] | FL | cMax = 3 |
| | ciip_flag[ ][ ] | FL | cMax = 1 |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | merge_geo_partition idx[ ][ ] | TB | cMax = ~~82~~ (sps_16_modes_geo_enabled_flag&& cbWidth >= cbHeight ? 16 : 32) |
| | merge_geo_idx0[ ][ ] | TR | cMax = MaxNumGeoMergeCand − 1, cRiceParam = 0 |
| | merge_geo_idx1[ ][ ] | TR | cMax = MaxNumGeoMergeCand − 2, cRiceParam = 0 |
| | merge_idx[ ][ ] | TR | cMax = ( CuPredMode[ 0 ][ x0 ][ y0 ] = MODE_IBC ? MaxNumMergeCand : MaxNumIbcMergeCand ) − 1, cRiceParam = 0 |

Example Implementations of the Disclosed Technology

Figure 13A:
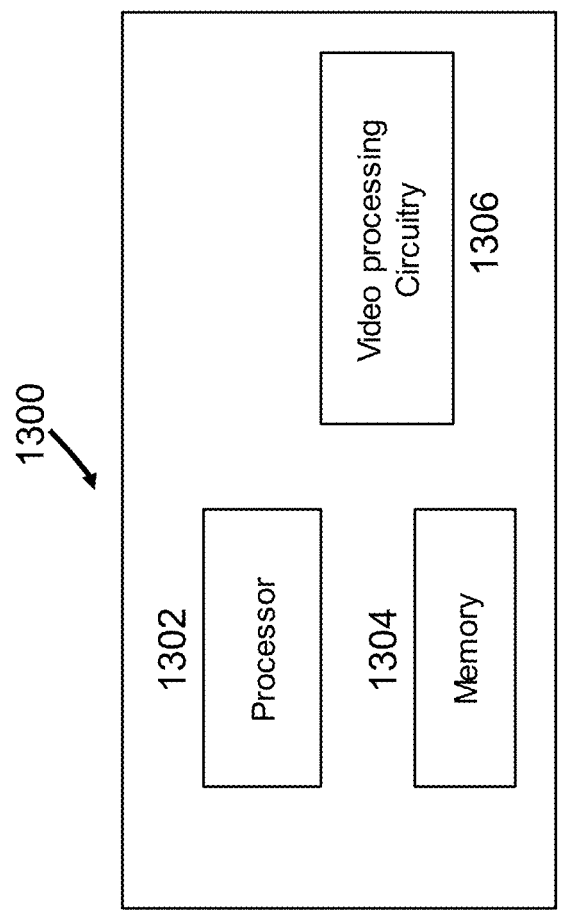
FIG. 13A is a block diagram of an example of a hardware platform for implementing a visual media decoding or a visual media encoding technique described in the present document.

FIG. 13A is a block diagram of a video processing apparatus 1300. The apparatus 1300 may be used to implement one or more of the methods described herein. The apparatus 1300 may be embodied in a smartphone, tablet, computer, Internet of Things (IoT) receiver, and so on. The apparatus 1300 may include one or more processors 1302, one or more memories 1304 and video processing hardware 1306. The processor(s) 1302 may be configured to implement one or more methods described in the present document. The memory (memories) 1304 may be used for storing data and code used for implementing the methods and techniques described herein. The video processing hardware 1306 may be used to implement, in hardware circuitry, some techniques described in the present document, and may be partly or completely be a part of the processors 1302 (e.g., graphics processor core GPU or other signal processing circuitry).

Figure 13B:
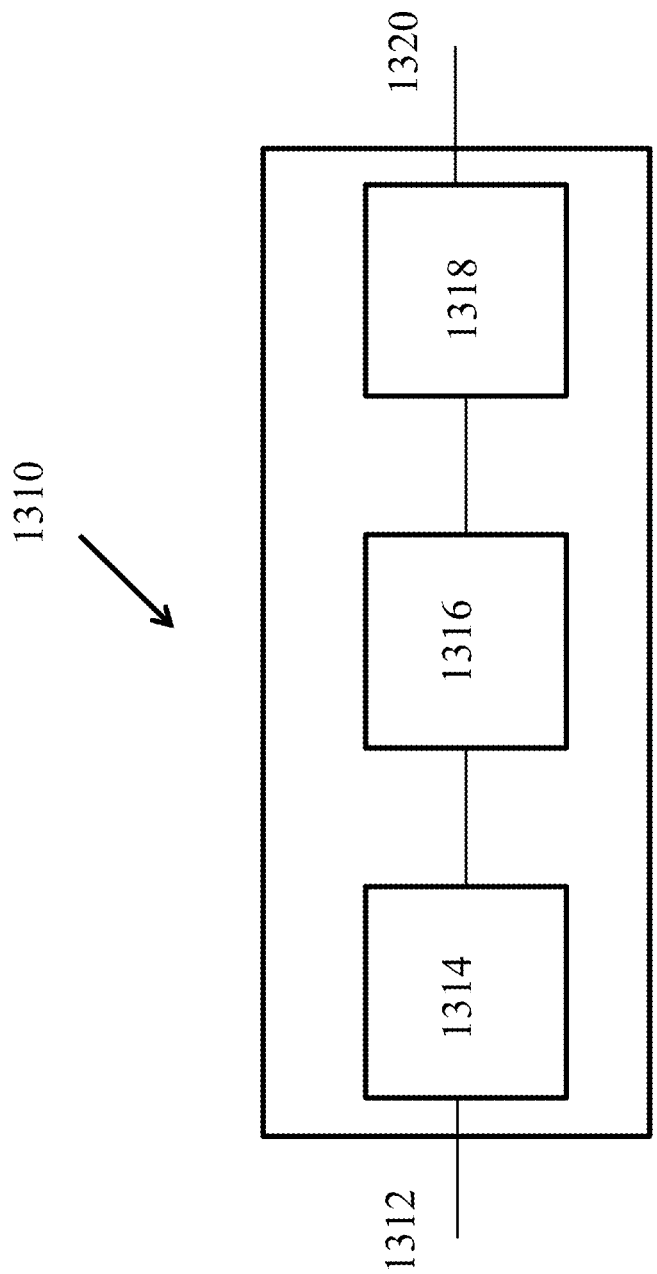
FIG. 13B is a block diagram for an example of a video processing system.

FIG. 13B is a block diagram of an example video processing system in which disclosed techniques may be implemented.

FIG. 13B is a block diagram showing an example video processing system 1310 in which various techniques disclosed herein may be implemented. Various implementations may include some or all of the components of the system 1310. The system 1310 may include input 1312 for receiving video content. The video content may be received in a raw or uncompressed format, e.g., 8 or 10 bit multi-component pixel values, or may be in a compressed or encoded format. The input 1312 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1310 may include a coding component 1314 that may implement the various coding or encoding methods described in the present document. The coding component 1314 may reduce the average bitrate of video from the input 1312 to the output of the coding component 1314 to produce a coded representation of the video. The coding techniques are therefore sometimes called video compression or video transcoding techniques. The output of the coding component 1314 may be either stored, or transmitted via a communication connected, as represented by the component 1316. The stored or communicated bitstream (or coded) representation of the video received at the input 1312 may be used by the component 1318 for generating pixel values or displayable video that is sent to a display interface 1320. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

FIG. 14 is a flowchart for an example method 1400 of video processing. The method 1400 includes, at 1402, performing a conversion between a current video block of visual media data and a bitstream representation of the visual media data, wherein, during the conversion, a use of a geometry partition mode is selectively enabled or disabled based at least in part on a determination that one or more dimensions of the current video block and/or a mathematical function of the one or more dimensions of the current video block achieves at least one threshold condition.

Figure 15:
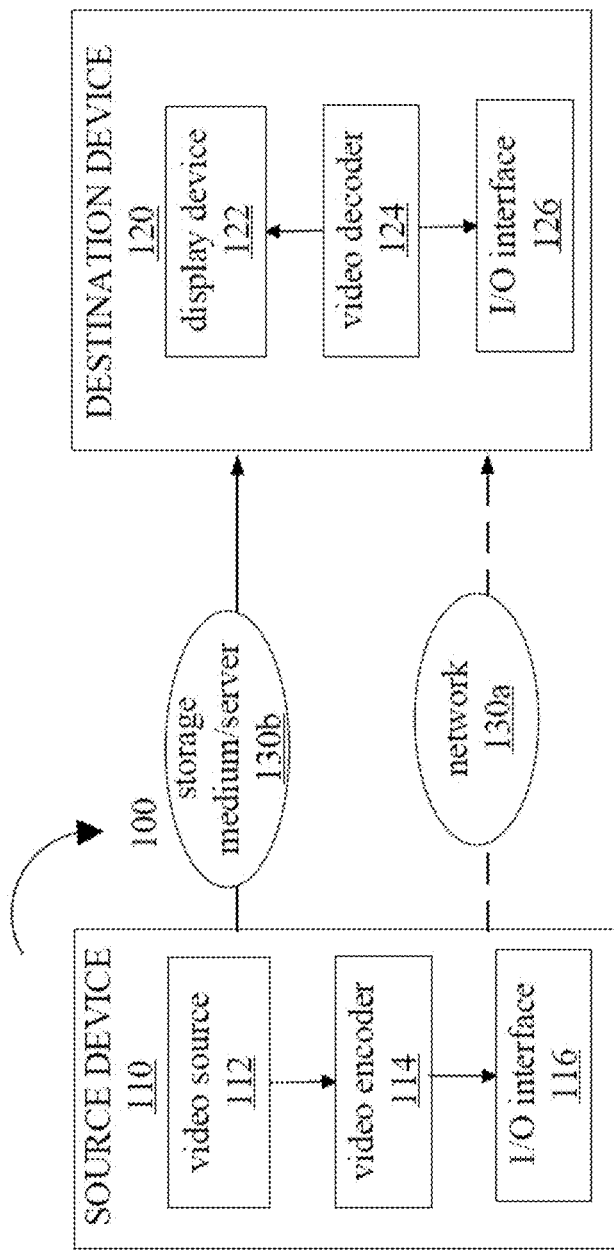
FIG. 15 is a block diagram that illustrates a video coding system in accordance with some embodiments of the present disclosure.

FIG. 15 is a block diagram that illustrates an example video coding system 100 that may utilize the techniques of this disclosure.

As shown in FIG. 15, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture.

The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 16:
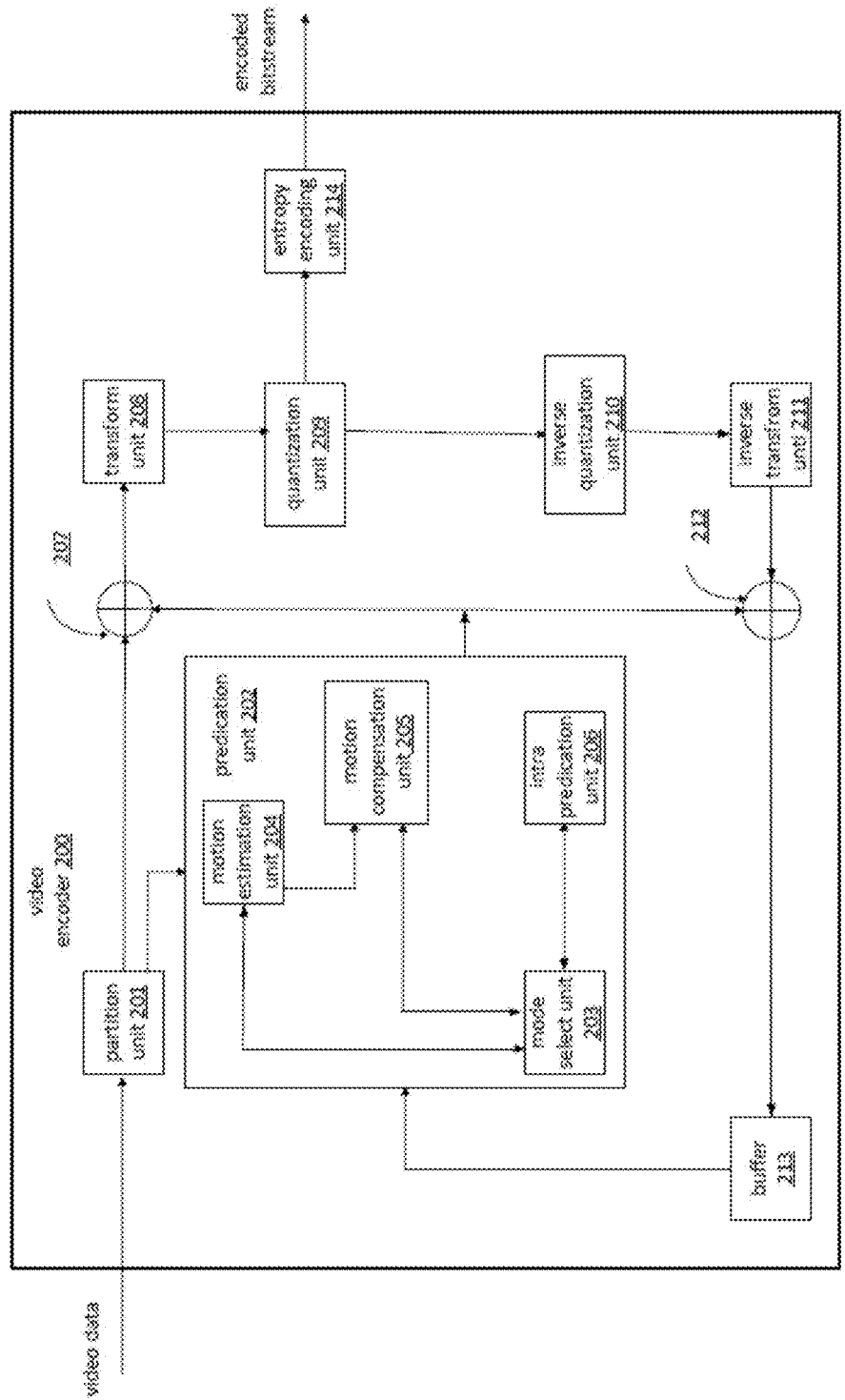
FIG. 16 is a block diagram that illustrates an encoder in accordance with some embodiments of the present disclosure.

FIG. 16 is a block diagram illustrating an example of video encoder 200, which may be video encoder 114 in the system 100 illustrated in FIG. 15.

Video encoder 200 may be configured to perform any or all of the techniques of this disclosure. In the example of FIG. 16, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 16 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g, a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 17:
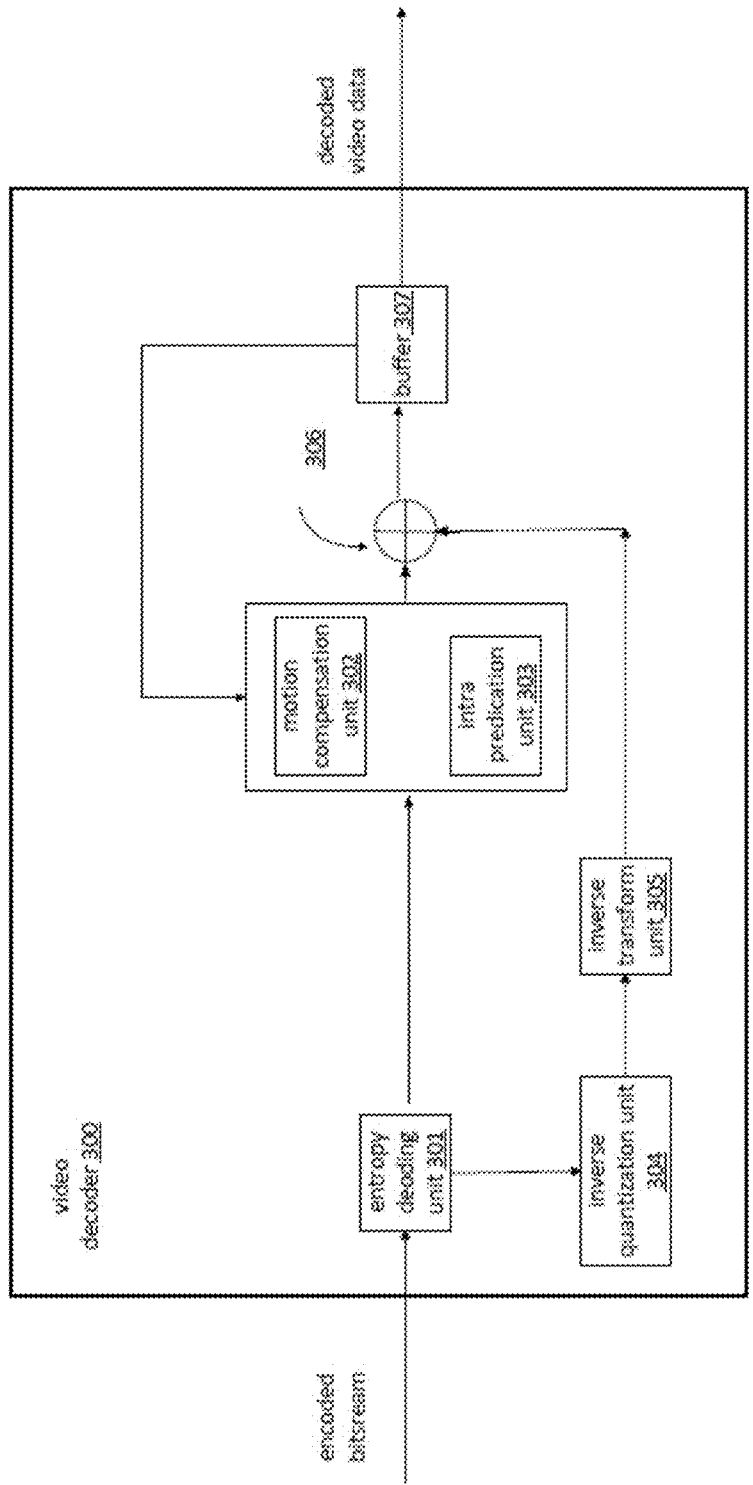
FIG. 17 is a block diagram that illustrates a decoder in accordance with some embodiments of the present disclosure.

FIG. 17 is a block diagram illustrating an example of video decoder 300 which may be video decoder 114 in the system 100 illustrated in FIG. 15.

The video decoder 300 may be configured to perform any or all of the techniques of this disclosure. In the example of FIG. 17, the video decoder 300 includes a plurality of functional components. The techniques described in this disclosure may be shared among the various components of the video decoder 300. In some examples, a processor may be configured to perform any or all of the techniques described in this disclosure.

In the example of FIG. 17, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 16).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

Some embodiments may be described using the following clause-based format. The first set of clauses show example embodiments of techniques discussed in the previous sections.

1. A method of video processing, comprising: performing a conversion between a current video block of visual media data and a bitstream representation of the visual media data, wherein, during the conversion, a use of a geometry partition mode is selectively enabled or disabled based at least in part on a determination that that one or more dimensions of the current video block and/or a mathematical function of the one or more dimensions of the current video block achieves at least one threshold condition.

2. The method of clause 1, wherein the geometry partition mode includes at least one of: a triangle prediction mode (TPM), a geometric merge mode (GEO), and/or a wedge prediction mode.

3. The method of any one or more of clauses 1-2, wherein the geometry partition mode includes splitting a video block into two or more sub-regions, wherein at least one sub-region does not include a QT, BT, and/or a partition.

4. The method of any one or more of clauses 1-3, wherein the one or more dimensions of the current video block includes a block width, a block height, and/or an aspect ratio of the current video block.

5. The method of any one or more of clauses 1-4, wherein achieving the at least one threshold condition includes the one or more dimensions of the current video block or mathematical functions thereof being greater and/or lesser than corresponding threshold values.

6. The method of clause 5, wherein the block width is denoted as W, the block height is denoted as H, wherein the threshold values are denoted as T1, T2, T3, T4, and wherein the geometry partition mode is enabled if W>=T1 and/or H>=T2 and/or W*H<T3 and/or W*H>T4.

7. The method of clause 5, wherein the block width is denoted as W, the block height is denoted as H, wherein the threshold values are denoted as T1, T2, T3, T4, and wherein the geometry partition mode is enabled if W>=T1 and/or H>=T2 and/or W*H<=T3 and/or W*H>=T4.

8. The method of clause 5, wherein the block width is denoted as W, the block height is denoted as H, wherein the threshold values are denoted as T1, T2, T3, T4, and wherein the geometry partition mode is enabled if W*H<T1|| (W*H<=T2 && W/H<=T3 && H/W<=T4).

9. The method of clause 5, wherein the block width is denoted as W, the block height is denoted as H, wherein the threshold values are denoted as T1, T2, T3, T4, and wherein the geometry partition mode is enabled if W*H<T1|| (W*H<=T2 && abs(log W−log H)<=T3).

10. The method of clause 5, wherein the block width is denoted as W, the block height is denoted as H, wherein the threshold values are denoted as T1, T2, T3, T4, and wherein the geometry partition mode is enabled if W*H<=T1 && W/H<=T2 && H/W<=T3.

11. The method of clause 5, wherein the block width is denoted as W, the block height is denoted as H, wherein the threshold values are denoted as Tx, Ty, and wherein the geometry partition mode is enabled if W>=Tx and H>=Ty.

12. The method of clause 5, wherein the block width is denoted as W, the block height is denoted as H, wherein the threshold values are denoted as N, M, and wherein the geometry partition mode is disabled if W>N and/or H>M.

13. The method of clause 5, wherein the block width is denoted as W, the block height is denoted as H, wherein the threshold values are denoted as Ti(i=1 . . . 17), and wherein the geometry partition mode is disabled if one or more below-specified threshold conditions are achieved:

W<T1 and/or W>T2 and/or W=T3
H<T4 and/or H>T5 and/or H=T6
W*H<T7 and/or W*H>T8 and/or W*H=T8
W/H>T9 and/or W/H>T10 and/or W/H=T11
H/W>T12 and/or H/W>T13 and/or H/W=T14
Abs(log W−log H)>T15 and/or Abs(log W−log H)<T16 and/or Abs(log W−log H)=T17.

14. The method of clause 5, wherein the block width is denoted as W, the block height is denoted as H, wherein the threshold values are denoted as Ti(i=1 . . . 17), and wherein the geometry partition mode is enabled if one or more below-specified threshold conditions are achieved:

W<T1 and/or W>T2 and/or W=T3
H<T4 and/or H>T5 and/or H=T6
W*H<T7 and/or W*H>T8 and/or W*H=T8
W/H>T9 and/or W/H>T10 and/or W/H=T11
H/W>T12 and/or H/W>T13 and/or H/W=T14
Abs(log W−log H)>T15 and/or Abs(log W−log H)<T16 and/or Abs(log W−log H)=T17.

15. The method of any one or more of clauses 5-14, wherein the current video block is a luma block.

16. The method of any one or more of clauses 5-14, wherein the current video block is a chroma block.

17. The method of any one or more of clauses 5-14, wherein the current video block includes a luma component and a chroma component, and wherein, upon determining from the at least one threshold condition that the geometry partition mode is disabled for the luma component, the geometry partition mode is also disabled for the chroma component.

18. The method of any one or more of clauses 5-14, wherein the current video block includes a luma component and a chroma component, and wherein, upon determining from the at least one threshold condition that the geometry partition mode is enabled forth luma component, the geometry partition mode is also enabled for the chroma component.

19. The method of any one or more of clauses 5-14, wherein the current video block includes a luma component and a chroma component, and wherein the at least one threshold condition is achieved for the luma component and not achieved for the chroma component.

20. A method of video processing, comprising: performing a conversion between a current video block of visual media data and a bitstream representation of the visual media data, wherein, during the conversion, a use of multiple sets of geometry partition modes are allowed for the current video block, wherein the multiple sets of geometry partition modes are selected based at least in part on a size of the current video block.

21. The method of clause 20, wherein an indication that the multiple sets of geometry partition modes are allowed is included in the bitstream representation.

22. The method of clause 20, wherein at least two of the multiple sets of geometry partition modes include a different number of geometry partition modes.

23. The method of clause 20, wherein at least two of the multiple sets of geometry partition modes include a same number of geometry partition modes, wherein at least one geometry partition mode included in one set is excluded in another set.

24. The method of clause 20, wherein an indication of a total count of the multiple sets of geometry partition modes selected is included in the bitstream representation.

25. The method of clause 25, wherein the total count of the multiple sets of geometry partition modes selected is less than a threshold value.

26. The method of any one or more of clauses 20-26, wherein geometry partition modes associated with the multiple sets of geometry partition modes that are allowed are identified by a geometry partition mode index, and wherein the geometry partition mode index includes a corresponding partition angle index and/or a corresponding partition distance index of a wedge in connection with the current video block.

27. The method of clause 26, wherein a mapping of the geometry partition mode index to a first geometry partition mode is based on determining which of the multiple sets of geometry partition modes is associated with the first geometry partition mode.

28. A method of video processing, comprising:
performing a conversion between video blocks of visual media data and a bitstream representation of the visual media data, wherein, during the conversion, a first count of geometry partition modes are used for computing a partition angle index and/or a partition distance index of a first video block, a second count of geometry partition modes are used in the bitstream representation of a second video block, and a third count of geometry partition modes are signaled in the bitstream representation of a third video block, wherein the first count and/or the second count and/or the third count are based at least on corresponding dimensions of the first, second, and third video blocks.

29. The method of clause 28, wherein the second count and/or and the third count are different from the first count.

30. The method of clause 28, wherein the second count equals the third count.

31. The method of clause 28, wherein the second count and/or and the third count are smaller than the first count.

32. The method of clause 28, wherein the first second, and third video blocks are associated with first, second, and third categories of video blocks.

33. The method of clause 32, wherein the first, second, and third categories of video blocks are different, and wherein the first, second, and third categories of video blocks are associated with different dimensions.

34. The method of clause 28, wherein the second count and/or the third count are smaller than the first count when the dimensions of the first block meet one or more threshold conditions.

35. A method of video processing, comprising: performing a conversion between a current video block of visual media data and a bitstream representation of the visual media data, wherein, during the conversion, a first geometry partition mode index value is signaled in the bitstream representation of the current video block and a second geometry partition mode index value is used for computing a partition angle index and/or a partition distance index of the current video block, and wherein the first geometry partition mode index value is different from the second geometry partition mode index value.

36. The method of clause 35, wherein at least one mapping table defines the relationship between the first geometry partition mode index value and the second geometry partition mode index value.

37. The method of clause 36, wherein the at least one mapping table includes a first mapping table and a second mapping table, and wherein the first mapping table is associated with a video block of a first type and a second mapping table is associated with a video block of a second type.

38. A method of video processing, comprising: performing a conversion between a current video block of visual media data and a bitstream representation of the visual media data, wherein, during the conversion, a use of a geometry partition mode is allowed for the current video block, and wherein parameters of the geometry partition mode are computed using a reduced set of angles and/or a reduced set of distances.

39. The method of clause 38, wherein a count of the reduced set of angles are less than a threshold value, and wherein the threshold value is 24.

40. The method of clause 38, wherein a count of the reduced set of distances are less than a threshold value, and wherein the threshold value is 82.

41. The method of clause 38, wherein a lookup table is used in computing the reduced set of distances, and wherein a size of the lookup table is based at least in part on the reduced set of angles.

42. A videodecodingapparatuscomprisingaprocessorconfiguredtoimplementamethod recited in one or more of clauses 1 to 41.

43. A video encoding apparatus comprising a processor configured to implement a method recited in one or more of clauses 1 to 41.

44. A computer program product having computer code stored thereon, the code, when executed by a processor, causes the processor to implement a method recited in any of clauses 1 to 41.

45. A method, apparatus or system described in the present document.

The second set of clauses describe certain features and aspects of the disclosed techniques in the previous section.

Figure 18A:
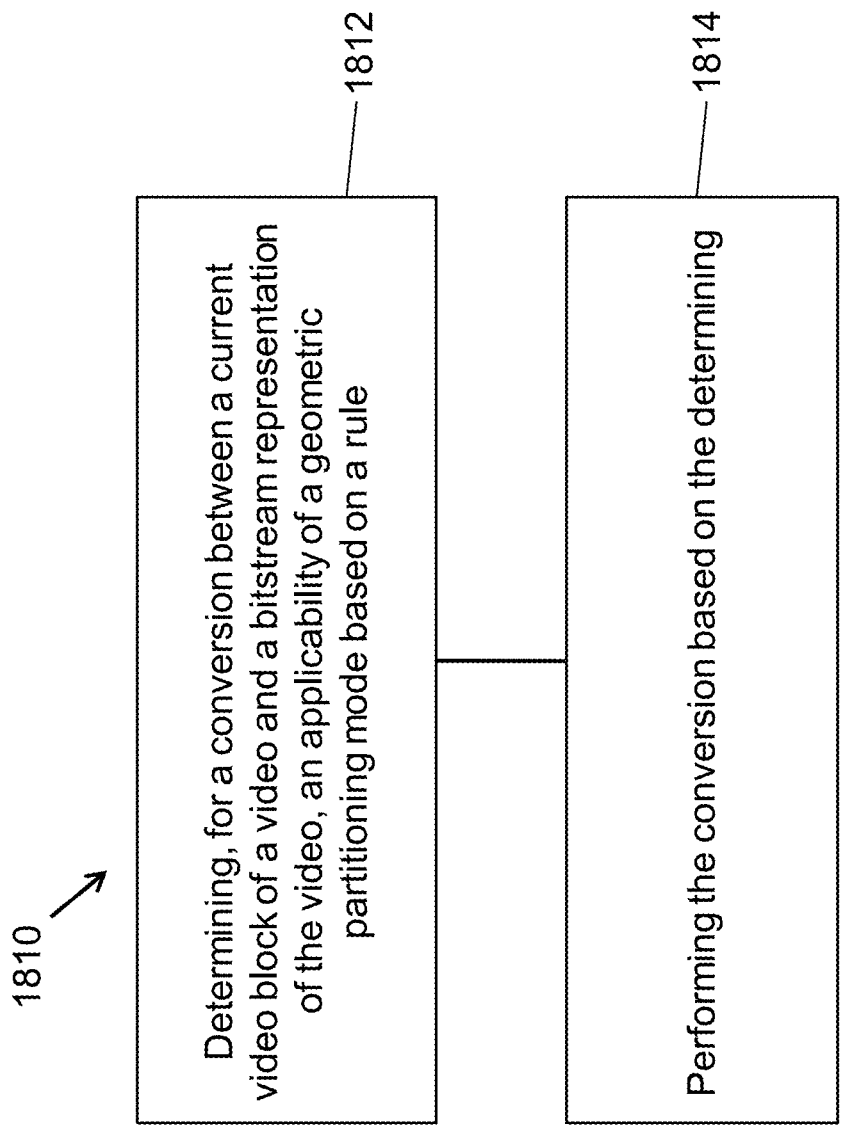
FIG. 18A to 18C are flowcharts for example methods for video processing based on some implementations of the disclosed technology.

1. A method of video processing (e.g., method 1810 as shown in FIG. 18A), comprising: determining 1812, for a conversion between a current video block of a video and a bitstream representation of the video, an applicability of a geometric partitioning mode based on a rule; and performing 1814 the conversion based on the determining, and wherein the rule depends on a block width, a block height, and/or an aspect ratio of the current video block.

2. The method of clause 1, wherein the geometric partitioning mode includes at least one of: a triangle prediction mode (TPM), a geometric merge mode (GEO), and/or a wedge prediction mode.

3. The method of any one or more of clauses 1-2, wherein the geometric partitioning mode includes splitting a video block into two or more sub-regions, wherein at least one sub-region does not include a QT, BT, and/or a partition.

4. The method of any one or more of clauses 1-3, wherein the rule specifies that the geometric partitioning mode is allowed for the current video block having a width (W) and a height (H) in a case that W>=T1 and H>=T2 and W<=T3 and H<=T4 and W/H<=T5 and H/W<=T6.

5. The method of any one or more of clauses 1-3, wherein the rule specifies that the geometric partitioning mode is allowed for the current video block having a width (W) and a height (H) in a case that W>=T1 and H>=T2 and W<=T3 and H<=T4.

6. The method of any one or more of clauses 1-3, wherein the rule specifies that the geometric partitioning mode is disallowed for the current video block having a width (W) and a height (H) in a case that W<T1 or H<T2 or W>T3 or H>T4 or W/H>T5 or H/W>T6.

7. The method of any of clauses 4-6, wherein T1=T2=8, T3=T4=32 or 64, T5=2 or 4, or T6=4.

Figure 18B:
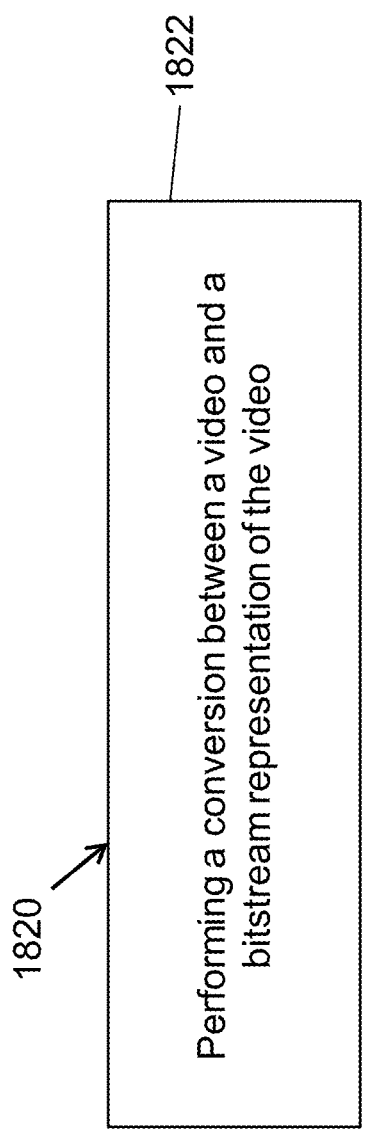

8. A method of video processing (e.g., method 1820 as shown in FIG. 18B), comprising: performing 1822 a conversion between a video unit of a video and a bitstream representation of the video, wherein the bitstream representation conforms to a format rule, wherein the format rule specifies whether to include one or more syntax elements indicative of a number of geometric partitioning modes allowed for representing the video unit in the bitstream representation.

9. The method of clause 8, wherein the video unit corresponds to a sequence, a group of pictures, a picture, a subpicture, a slice, a tile, a virtual pipeline data unit (VPDU), a coding tree unit (CTU), a CTU row, a coding unit, a prediction unit, or a transform unit.

10. The method of clause 8 or 9, wherein the one or more syntax elements are signaled in a sequence parameter set (SPS), a video parameter set (VPS), an adaptation parameter set (APS), a picture parameter set (PPS), a picture header, a slice header, a picture, a subpicture, a slice, or a tile.

11. The method of any of clauses 8-10, wherein the format rule specifies that the one or more syntax elements are conditionally signaled based on whether a geometric partitioning mode is enabled for the video unit, whether a current picture type is non-Intra or B picture, and/or whether a current slice type is B slice.

12. The method of any of clauses 8-10, wherein a syntax element of the one or more syntax elements indicates whether the number of geometric partitioning modes for the video unit is equal to X or not, whereby X is a positive integer.

13. The method of any of clauses 8-10, wherein a syntax element of the one or more syntax elements indicates whether X geometric partitioning modes are allowed for all blocks in the video unit, whereby X is a positive integer.

14. The method of any of clauses 8-10, wherein a syntax element of the one or more syntax elements indicates whether X geometric partitioning modes are allowed for certain blocks in the video unit, whereby X is a positive integer and the certain blocks satisfy conditions related to aspect ratios of the certain blocks.

15. The method of any of clauses 8-10, wherein multiple syntax elements of the one or more syntax elements indicate geometric partitioning modes allowed for each category of blocks in the video unit, and wherein the blocks are classified to categories based on dimensions of the blocks.

16. The method of clause 15, wherein the multiple syntax elements include a first syntax element indicating whether X geometric partitioning modes are allowed for some blocks and a second syntax element indicating whether Y geometric partitioning modes are allowed for other blocks.

17. The method of clause 16, wherein the some blocks satisfy a condition that H/W<=T, and the other blocks satisfy another condition that H/W>T, whereby W and H respectively indicate a width and a height of a block and T is a positive integer.

18. The method of any of clauses 12-14 or 16, wherein X or Y is 16, 30, or 32.

19. The method of any of clauses 8-10, wherein how to signal a geometric partitioning mode index for a block is dependent on the one or more syntax elements and/or a block dimension.

20. The method of clause 19, wherein a binarization and/or an entropy coding of the geometric partitioning mode index for the block is dependent on the one or more syntax elements and/or a block dimension.

21. The method of clause 20, wherein a value of an input parameter for the geometric partitioning mode index is equal to X in a case that a number of the geometric partitioning mode for a block derived by the one or more syntax elements is equal to X.

22. The method of clause 20, wherein a value of an input parameter for the geometric partitioning mode index is equal to X in a case that a number of the geometric partitioning mode for a block derived by the one or more syntax elements is equal to X and that the block dimension satisfies a certain condition.

23. The method of any of clauses 8-10, wherein a maximum value of a geometric partitioning mode index is dependent on the one or more syntax elements and/or a block dimension.

24. The method of clause 23, wherein a bitstream constraint is added to constrain the maximum value to be less than the number of the geometric partitioning modes.

25. The method of clause 23, wherein a bitstream constraint is added to constrain the maximum value to be less than a number of the geometric partitioning modes allowed for blocks with block dimensions that satisfy a certain condition.

26. The method of any of clauses 8-10, wherein one or more constraint flags are signaled in a video processing unit level to specify whether to constrain usage of X geometric partitioning modes for the video unit, whereby X is a positive integer.

27. The method of clause 26, wherein a constraint flag is signaled to constrain whether the X geometric partitioning modes are used for all blocks in a sequence.

28. The method of clause 26, wherein how to constrain the X geometric partitioning modes is dependent on block dimensions.

29. The method of any of clauses 8-10, wherein which geometric partitioning mode is allowed for a block in the video unit is dependent on the one or more syntax elements.

30. The method of clause 29, wherein whether a subset or a full set of the geometric partitioning modes is allowed for the block, whether a subset or a full set of geometry partition angles is allowed for the block, and/or whether a subset or a full set of geometry partition displacements is allowed for the block is dependent on the one or more syntax elements.

31. A method of video processing, comprising: performing a conversion between a video unit including one or more video blocks of a video and a bitstream representation of the video according to a rule, wherein the one or more video blocks are coded using one or more geometric partitioning modes, and wherein the rule specifies that the one or more geometry partitioning modes are from two sets of geometric partitioning modes are allowed for processing the one or more video blocks.

32. The method of clause 31, wherein the two sets of geometric partitioning modes include a first set and a second set and at least one geometric partitioning mode in the first set is not included in the second set.

33. The method of clause 31, wherein the two sets of geometric partitioning modes include a same number of geometric partitioning modes.

34. The method of clause 31, wherein the two sets of geometric partitioning modes include different numbers of geometric partitioning modes, respectively.

35. The method of clause 1, wherein from which set a video block uses a geometric partitioning mode, angles, and/or distances is dependent on a dimension of the video block.

36. The method of clause 31, wherein how to signal a geometric partitioning mode index for a video block is dependent on a dimension of the video block.

37. A method of video processing, comprising: performing a conversion between a video unit including one or more video blocks of a video and a bitstream representation of the video according to a rule, wherein the one or more video blocks are classified into multiple block categories according to decoded information, and wherein the rule specifies that multiple sets of geometric partitioning modes are allowed for processing the one or more video blocks.

38. The method of clause 37, wherein the rule further specifies which set is used for a video block is dependent on a block category and/or one or more syntax elements related to geometric partitioning modes.

39. The method of clause 37, wherein the rule further specifies that a number of geometric partitioning modes allowed for a video block is dependent on a block category and/or one or more syntax elements related to geometric partitioning modes.

40. The method of clause 37, wherein a number of geometric partitioning modes allowed for a video block is less than or equal to a length ($L_i$) of $Set_i$ that denotes a corresponding set of geometric partitioning modes for the video block.

41. The method of clause 37, wherein all or a part of geometric partitioning modes allowed for a video block is from $Set_i$ that denotes a corresponding set of geometric partitioning modes for the video block.

42. The method of clause 37, wherein geometric partitioning modes allowed for a video block includes at least N modes in $Set_i$ that denotes a corresponding set of geometric partitioning modes for the video block, whereby N is an integer less than a length of $Set_i$.

43. The method of clause 37, wherein geometric partitioning modes allowed for a video block includes some modes in $Set_i$ that denotes a corresponding set of geometric partitioning modes for the video block and some other predefined geometric partitioning modes.

44. A method of video processing, comprising: performing a conversion between a current video block of a video and a bitstream representation of the video according to a rule, wherein the rule specifies that a mapping between a geometric partitioning mode index for the current video block and an angle index and/or a distance index for determining partitions of the current video block is dependent on decoded information of the current video block.

45. The method of clause 44, wherein the decoded information includes a dimension of the current video block and/or a category of the current video block.

46. The method of clause 44 or 45, wherein the rule specifies that the mapping is dependent on whether a block dimension satisfies a certain condition.

47. The method of clause 44 or 45, wherein the rule specifies that angle indices ($A_j$) corresponding to multiple consecutive geometric partitioning mode indices ($M_j$) are out of order such that the angle indices are not consecutive, not in a descending order, and/or not in an ascending order.

48. The method of clause 44 or 45, wherein the rule specifies that angle indices ($A_j$) corresponding to multiple consecutive geometric partitioning mode indices ($M_j$) are in an order such that the angle indices are consecutive, in a descending order, and/or in an ascending order.

49. The method of clause 44 or 45, wherein the rule specifies that distance indices ($D_k$) corresponding to multiple consecutive geometric partitioning mode indices ($M_j$) are out of order such that the distance indices ($D_k$) are not consecutive, not in a descending order, and/or not in an ascending order.

50. The method of clause 44 or 45, wherein the rule specifies that distance indices ($D_k$) corresponding to multiple consecutive geometric partitioning mode indices ($M_j$) are in an order such that the distance indices ($D_k$) are consecutive, in a descending order, and/or in an ascending order.

51. The method of clause 44 or 45, wherein the rule specifies that geometric partitioning mode indices corresponding to multiple consecutive coded or signaled geometric partitioning mode indices are out of order such that the geometric partitioning mode indices are not consecutive, not in a descending order, and/or not in an ascending order.

52. The method of clause 44 or 45, wherein the rule specifies that geometric partitioning mode indices corresponding to multiple consecutive coded or signaled geometric partitioning mode indices are in an order such that the geometric partitioning mode indices are consecutive, in a descending order, and/or in an ascending order.

53. A method of video processing, comprising: performing a conversion between a current video block of a video unit of a video and a bitstream representation of the video according to a rule, wherein the rule specifies that a first number indicating a number of geometric partitioning modes, geometry partition angles, and/or geometry partition distances that are allowed for the current video block is different from a second number indicating a number of geometric partitioning modes, geometry partition angles, and/or geometry partition distances that are available for the video unit.

54. The method of clause 53, wherein the rule further specifies that a maximum geometric partitioning mode index signaled for the current video block is smaller than the second number that corresponds to a total number of geometric partitioning modes allowed for a sequence of the video.

55. The method of clause 53, wherein the rule further specifies that the first number indicatingthe number ofgeometry partition angles allowed forthe currentvideo blockis smallerthan the second number that corresponds to a total number of geometry partition angles allowed for a sequence of the video.

56. The method of clause 53, wherein the first number is dependent on a dimension of the current video block.

57. A method of video processing, comprising: performing a conversion between a current video block of a video and a bitstream representation of the video, wherein a geometric partitioning mode index of the current video block is coded in the bitstream representation such that a binarization of the geometric partitioning mode index is performed according to a rule, wherein the rule specifies that a value of a maximum value during the binarization of the geometric partitioning mode index is equal to X in a case that a dimension of the current video block satisfies a certain condition, whereby X is a positive integer.

58. The method of clause 57, wherein X is 16, 30 or 32.

59. The method of clause 57, wherein the certain condition is H/W<=T or H/W>T, whereby H and W indicate a height and a width of the current video block, respectively, and T is a positive integer.

60. The method of clause 59, wherein T is 1, 2, 4 or 8.

61. The method of any of clauses 1 to 60, wherein an index of the geometric partitioning mode is coded with truncated rice, or truncated binary, or truncated unary, or fixed-length, or k-th order Exp-Golomb, or limited k-th order Exp-Golomb binarization.

Figure 18C:
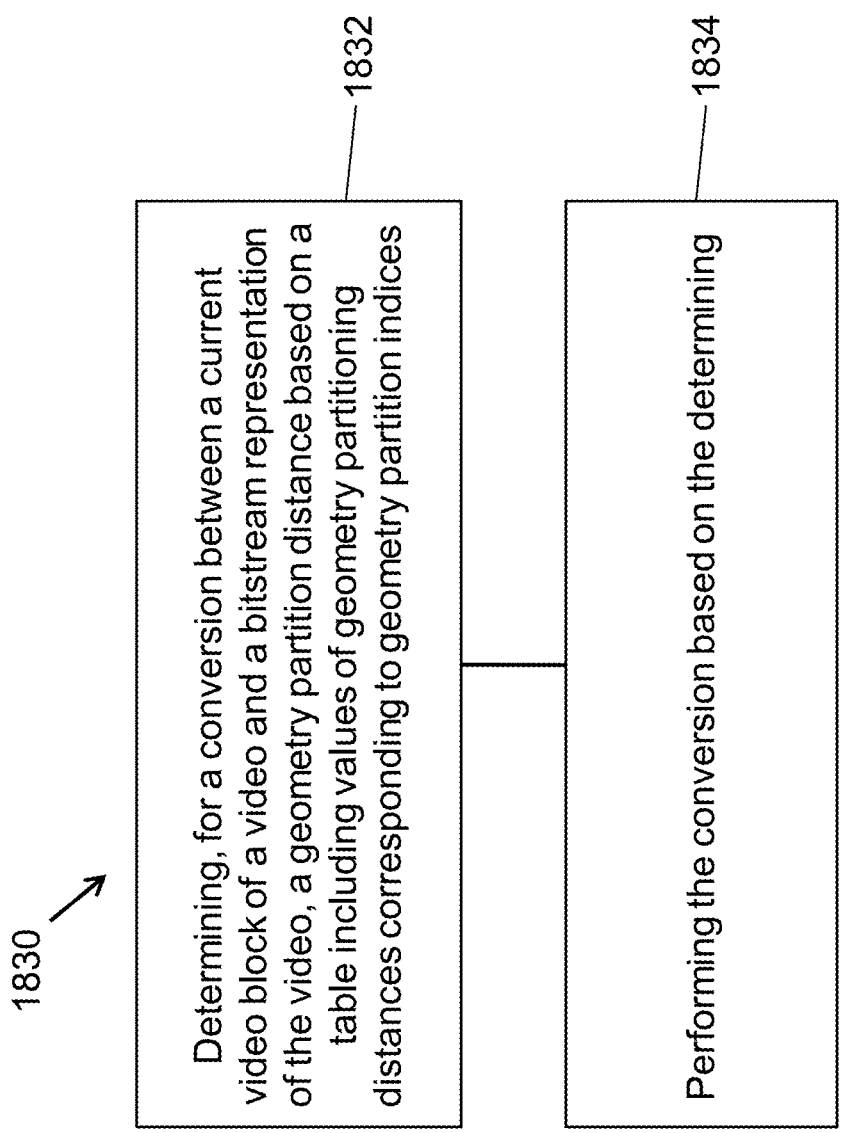

62. A method of video processing (e.g., method 1830 as shown in FIG. 18C), comprising: determining 1832, for a conversion between a current video block of a video and a bitstream representation of the video, a geometry partition distance based on a table including values of geometry partitioning distances corresponding to geometry partition indices; and performing the conversion based on the determining.

63. The method of clause 62, wherein the geometry partition distance is determined based on a subset of the table.

64. The method of clause 62, wherein the table indicates a value of 4 as a geometry partitioning distance corresponding to an geometry partition angle index equal to 3 or 21.

65. The method of clause 62, wherein the table indicates a value of −4 as a geometry partitioning distance corresponding to an geometry partition angle index equal to 9 and/or 15.

66. A method of video processing, comprising: performing a conversion between a current video block of a video and a bitstream representation of the video according to a rule, wherein the rule specifies that the conversion allows using a coding tool for the current video block coded using a geometric partitioning mode, and wherein the bitstream representation includes an indication and information of the coding tool and the geometric partitioning mode.

67. The method of clause 66, wherein the coding tool is a sub-block transform (SBT) tool that comprises applying a transform process or an inverse transform process on a sub-part of a prediction residual block.

68. The method of clause 66, wherein the coding tool is a combined inter and intra prediction (CIIP) tool that includes combining an intra prediction signal and a inter prediction signal using weighted coefficients.

69. The method of clause 66, wherein the coding tool is a merge mode with motion vector difference (MMVD) tool that includes a motion vector expression including a distance table specifying a distance between two motion candidates.

70. The method of clause 66, wherein parameters of the geometric partitioning mode are based on use of the coding tool.

71. A method of video processing, comprising: performing a conversion between a current video block of a video and a bitstream representation of the video according to a rule, wherein the rule specifies whether to or how to apply a filtering process to the current video block depends on a usage of a geometric partitioning mode in coding the current video block.

72. The method of clause 71, wherein the rule further specifies that a value of a boundary filtering strength during a deblocking process is dependent on whether the current video block is coded using the geometric partitioning mode.

73. The method of clause 71, wherein the rule further specifies that a value of a boundary filtering strength during a deblocking process is equal to T in a case that an edge of the current video block is a transform block edge and a sample is in the current video block with a flag related to the geometric partitioning mode and set to 1.

74. The method of clause 71, wherein the rule further specifies that a value of deblocking edges within the current video block coded using the geometric partitioning mode is different from 2.

75. The method of clause 71, wherein the rule further specifies that a value of deblocking edges within the current video block coded using the geometric partitioning mode is 2.

76. The method of any of clauses 1 to 75, wherein the geometric partitioning mode is selected from a set of geometric partitioning modes, and wherein the set of geometric partitioning modes includes one or more geometric partitioning modes to divide a block into two or more partitions, at least one of the two or more partitions is non-square and non-rectangular.

77. The method of any of clauses 1 to 76, wherein the conversion includes encoding the video into the bitstream representation.

78. The method of any of clauses 1 to 76, wherein the conversion includes decoding the video from the bitstream representation.

79. A video processing apparatus comprising a processor configured to implement a method recited in any one or more of clauses 1 to 78.

80. A computer readable medium storing program instructions that, when executed, causes a processor to implement a method recited in any one or more of clauses 1 to 78.

81. A computer readable medium that stores a coded representation or a bitstream representation generated according to any of the above described methods.

82. A video processing apparatus for storing a bitstream representation, wherein the video processing apparatus is configured to implement a method recited in any one or more of clauses 1 to 78.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located atone site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks.

However, a computer need not have such devices. Computer readable media suitable for storing computer program instructions and data include all forms of non-volatile memory, media and memoy devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order

What is claimed is:

1. A method of processing video data, comprising:
    determining whether to enable a geometric partitioning mode for a current video block at least based on a first syntax element indicative of an application of a combined inter-picture merge and intra-picture prediction mode and a second syntax element indicative of an application of a regular merge mode; and
    performing a conversion between the current video block of a video and a bitstream of the video,
    wherein a geometric partitioning mode index for the current video block is coded in the bitstream and a binarization of the geometric partitioning mode index is performed according to a rule,
    wherein the geometric partitioning mode index specifies a geometric splitting shape of the geometric partitioning mode applied to the current video block,
    wherein the rule specifies that the geometric partitioning mode index is coded with a fixed-length binarization.

2. The method of claim 1, wherein a splitting angle variable and a splitting distance variable are derived according to a value of the geometric partitioning mode index, which are used in a weighted sample prediction process in the geometric partitioning mode of the current video block.

3. The method of claim 2, wherein in the geometric partitioning mode, a first motion information and a second motion information are determined, the weighted sample prediction process is performed to generate a final prediction for the current video block based on a weighted sum of prediction samples derived from the first motion information and the second motion information, and values of weights are derived based on the splitting angle variable and the splitting distance variable.

4. The method of claim 2, wherein the geometric partitioning mode applied to the current video block is selected from a set of geometric partitioning modes,
    wherein the geometric partitioning modes are computed using a set of splitting angles and a set of splitting distances for the set of splitting angles, and
    wherein a number of splitting distances for a vertical splitting angle or a horizontal splitting angle in the set of splitting angles is equal to 2.

5. The method of claim 1, wherein when a geometric partitioning mode index for a video block is not present in the bitstream, it is inferred to be equal to 0.

6. The method of claim 1, wherein the geometric partitioning mode is disabled if the first syntax element indicates that the combined inter-picture merge and intra-picture prediction mode is applied or if the second syntax element indicates that the regular merge mode is applied.

7. The method of claim 3, wherein the first motion information and the second motion information are determined as following:
    constructing a merge candidate list that has L0 motion vectors and L1 motion vectors; and
    determining the first motion information and the second motion information based on the merge candidate list, a parity of a first merge index and a parity of a second merge index,
    wherein the first motion information and the second motion information are uni-prediction motion information.

8. The method of claim 1, wherein the conversion includes encoding the video into the bitstream.

9. The method of claim 1, wherein the conversion includes decoding the video from the bitstream.

10. An apparatus for processing video data comprising a processor and a non-transitory memory with instructions thereon, wherein the instructions upon execution by the processor, cause the processor to:
    determine whether to enable a geometric partitioning mode for a current video block at least based on a first syntax element indicative of an application of a combined inter-picture merge and intra-picture prediction mode and a second syntax element indicative of an application of a regular merge mode; and
    perform a conversion between the current video block of a video and a bitstream of the video,
    wherein a geometric partitioning mode index for the current video block is coded in the bitstream and a binarization of the geometric partitioning mode index is performed according to a rule,
    wherein the geometric partitioning mode index specifies a geometric splitting shape of the geometric partitioning mode applied to the current video block,
    wherein the rule specifies that the geometric partitioning mode index is coded with a fixed-length binarization.

11. The apparatus of claim 10, wherein a splitting angle variable and a splitting distance variable are derived according to a value of the geometric partitioning mode index, which are used in a weighted sample prediction process in the geometric partitioning mode of the current video block;
    wherein in the geometric partitioning mode, a first motion information and a second motion information are determined, the weighted sample prediction process is performed to generate a final prediction for the current video block based on a weighted sum of prediction samples derived from the first motion information and the second motion information, and values of weights are derived based on the splitting angle variable and the splitting distance variable;
    wherein the first motion information and the second motion information are determined as following:
        constructing a merge candidate list that has L0 motion vectors and L1 motion vectors; and
        determining the first motion information and the second motion information based on the merge candidate list, a parity of a first merge index and a parity of a second merge index,
        wherein the first motion information and the second motion information are uni-prediction motion information;
    wherein the geometric partitioning mode applied to the current video block is selected from a set of geometric partitioning modes,
    wherein the geometric partitioning modes are computed using a set of splitting angles and a set of splitting distances for the set of splitting angles, and
    wherein a number of splitting distances for a vertical splitting angle or a horizontal splitting angle in the set of splitting angles is equal to 2.

12. The apparatus of claim 10, wherein when a geometric partitioning mode index for a video block is not present in the bitstream, it is inferred to be equal to 0.

13. The apparatus of claim 10,
    wherein the geometric partitioning mode is disabled if the first syntax element indicates that the combined inter-picture merge and intra-picture prediction mode is applied or if the second syntax element indicates that the regular merge mode is applied.

14. A non-transitory computer-readable storage medium storing instructions that cause a processor to:
determine whether to enable a geometric partitioning mode for a current video block at least based on a first syntax element indicative of application of a combined inter-picture merge and intra-picture prediction mode and a second syntax element indicative of application of a regular merge mode; and
perform a conversion between the current video block of a video and a bitstream of the video,
wherein a geometric partitioning mode index for the current video block is coded in the bitstream and a binarization of the geometric partitioning mode index is performed according to a rule,
wherein the geometric partitioning mode index specifies a geometric splitting shape of the geometric partitioning mode applied to the current video block,
wherein the rule specifies that the geometric partitioning mode index is coded with a fixed-length binarization.

15. The non-transitory computer-readable storage medium of claim 14, wherein a splitting angle variable and a splitting distance variable are derived according to a value of the geometric partitioning mode index, which are used in a weighted sample prediction process in the geometric partitioning mode of the current video block;
wherein in the geometric partitioning mode, a first motion information and a second motion information are determined, the weighted sample prediction process is performed to generate a final prediction for the current video block based on a weighted sum of prediction samples derived from the first motion information and the second motion information, and values of weights are derived based on the splitting angle variable and the splitting distance variable;
wherein the first motion information and the second motion information are determined as following:
constructing a merge candidate list that has L0 motion vectors and L1 motion vectors; and
determining the first motion information and the second motion information based on the merge candidate list, a parity of a first merge index and a parity of a second merge index,
wherein the first motion information and the second motion information are uni-prediction motion information;
wherein the geometric partitioning mode applied to the current video block is selected from a set of geometric partitioning modes,
wherein the geometric partitioning modes are computed using a set of splitting angles and a set of splitting distances for the set of splitting angles, and
wherein a number of splitting distances for a vertical splitting angle or a horizontal splitting angle in the set of splitting angles is equal to 2.

16. The non-transitory computer-readable storage medium of claim 14, wherein when a geometric partitioning mode index for a video block is not present in the bitstream, it is inferred to be equal to 0; and
wherein the geometric partitioning mode is disabled if the first syntax element indicates that the combined inter-picture merge and intra-picture prediction mode is applied or if the second syntax element indicates that the regular merge mode is applied.

17. A non-transitory computer-readable recording medium storing a bitstream of a video which is generated by a method performed by a video processing apparatus, wherein the method comprises:
determining whether to enable a geometric partitioning mode for a current video block at least based on a first syntax element indicative of application of a combined inter-picture merge and intra-picture prediction mode and a second syntax element indicative of application of a regular merge mode; and
generating the bitstream for the current video block of the video,
wherein a geometric partitioning mode index for the current video block is coded in the bitstream and a binarization of the geometric partitioning mode index is performed according to a rule,
wherein the geometric partitioning mode index specifies a geometric splitting shape of the geometric partitioning mode applied to the current video block,
wherein the rule specifies that the geometric partitioning mode index is coded with a fixed-length binarization.

18. The non-transitory computer-readable recording medium of claim 17, wherein a splitting angle variable and a splitting distance variable are derived according to a value of the geometric partitioning mode index, which are used in a weighted sample prediction process in the geometric partitioning mode of the current video block;
wherein in the geometric partitioning mode, a first motion information and a second motion information are determined, the weighted sample prediction process is performed to generate a final prediction for the current video block based on a weighted sum of prediction samples derived from the first motion information and the second motion information, and values of weights are derived based on the splitting angle variable and the splitting distance variable;
wherein the first motion information and the second motion information are determined as following:
constructing a merge candidate list that has L0 motion vectors and L1 motion vectors; and
determining the first motion information and the second motion information based on the merge candidate list, a parity of a first merge index and a parity of a second merge index,
wherein the first motion information and the second motion information are uni-prediction motion information;
wherein the geometric partitioning mode applied to the current video block is selected from a set of geometric partitioning modes,
wherein the geometric partitioning modes are computed using a set of splitting angles and a set of splitting distances for the set of splitting angles, and
wherein a number of splitting distances for a vertical splitting angle or a horizontal splitting angle in the set of splitting angles is equal to 2.

19. The non-transitory computer-readable recording medium of claim 17, wherein when a geometric partitioning mode index for a video block is not present in the bitstream, it is inferred to be equal to 0; and
wherein the geometric partitioning mode is disabled if the first syntax element indicates that the combined inter-picture merge and intra-picture prediction mode is applied or if the second syntax element indicates that the regular merge mode is applied.

* * * * *